US006991362B1

(12) United States Patent
Seaman

(10) Patent No.: US 6,991,362 B1
(45) Date of Patent: *Jan. 31, 2006

(54) AGITATORS FOR WAVE-MAKING OR MIXING AS FOR TANKS, AND PUMPS AND FILTERS

(76) Inventor: Anthony E. Seaman, P.O. Box 1593, Redondo Beach, CA (US) 90728

( * ) Notice: Subject to any disclaimer, the term of this patent is extended or adjusted under 35 U.S.C. 154(b) by 97 days.

This patent is subject to a terminal disclaimer.

(21) Appl. No.: 10/725,187

(22) Filed: Dec. 1, 2003

Related U.S. Application Data

(63) Continuation of application No. 10/307,252, filed on Nov. 30, 2002, now Pat. No. 6,655,830, which is a continuation of application No. 09/575,103, filed on May 19, 2000, now Pat. No. 6,488,401, which is a continuation of application No. 09/283,591, filed on Apr. 1, 1999, now abandoned.

(60) Provisional application No. 60/080,467, filed on Apr. 2, 1998.

(51) Int. Cl.
*B05B 3/04* (2006.01)
*B01F 15/02* (2006.01)

(52) U.S. Cl. .............................. 366/168.2; 366/169.1; 366/262; 366/342; 239/240; 239/381

(58) Field of Classification Search ............ 366/168.2, 366/169.1, 262, 342; 239/240, 381, DIG. 1
See application file for complete search history.

(56) References Cited

U.S. PATENT DOCUMENTS

| 996,480 A | 6/1911 | Glaser ......................... 239/240 |
| 1,073,878 A | 9/1913 | Trent .......................... 366/137 |
| 1,753,841 A | 4/1930 | Thompson ................... 239/240 |
| 1,823,315 A | 9/1931 | Buelna et al. ................. 239/97 |
| 2,503,228 A | 4/1950 | Wanner .................... 366/168.1 |

(Continued)

OTHER PUBLICATIONS

Technical Manual of the BETE Fog Nozzle, Inc., Greenfield, MA. for product entitled the "TurboMix Eductor Mixing Nozzle," Manual No. 105TM (4 sheets). copyrighted 1988.

(Continued)

*Primary Examiner*—Tony G. Soohoo
(74) *Attorney, Agent, or Firm*—Jonathan A. Bay

(57) ABSTRACT

A tank agitator connects to a low head feed and causes agitation by discharging through a port that might rotate, oscillate, or otherwise issue a pulsing stream. This agitator has a housing with a turbine plenum and an exhaust plenum. A turbine in the turbine plenum spins by the flowthrough of the feedwater and exhausts to the exhaust plenum. A hollow drive shaft is spun by the turbine and extends through the exhaust plenum and to terminate outside the housing. It has an aperture that allows water in the exhaust plenum to flow into its lumen. A nozzle caps the shaft and is bent such that the discharge issuing therefrom sweeps in circles with the spinning of the drive shaft. A variant form of the agitator includes a drive train that incorporates a drag link to convert the spinning input of the turbine into an oscillating output in the drive shaft. In another variant form, the discharge is pulsed. To do this, the exhaust plenum lies between an opening to the turbine plenum and a port in the housing wall to the outside. A blocker door is coupled to and driven by the spinning turbine to cycle between uncovering and covering one of the exhaust opening and the discharge port. Given the foregoing, the discharge stream issuing from the discharge port will pulse between alternating phases of flow and quiescence.

9 Claims, 45 Drawing Sheets

U.S. PATENT DOCUMENTS

| | | | |
|---|---|---|---|
| 2,509,576 A | 5/1950 | Morgan | 239/240 |
| 2,600,987 A | 6/1952 | Gallice | 239/97 |
| 2,661,241 A | 12/1953 | Vaneziano | 239/240 |
| 3,092,073 A | 6/1963 | Conde | 137/624.13 |
| 3,096,787 A | 7/1963 | Kayler | 137/624.13 |
| 3,117,724 A | 1/1964 | Ray | 239/97 |
| 3,131,867 A | 5/1964 | Miller et al. | 239/97 |
| 3,275,241 A | 9/1966 | Sadd | 239/227 |
| 3,306,541 A | 2/1967 | Lord, Jr. | 239/97 |
| 3,362,641 A | 1/1968 | Barnes | 239/97 |
| 3,464,628 A | 9/1969 | Chow | 239/97 |
| 3,521,822 A | 7/1970 | Friedman et al. | 239/206 |
| 3,523,647 A | 8/1970 | Tadecki | 239/206 |
| 3,580,508 A | 5/1971 | Marandi et al. | 239/241 |
| 3,608,828 A | 9/1971 | Tokar | 239/240 |
| 3,623,667 A | 11/1971 | Costa | 239/237 |
| 3,712,545 A | 1/1973 | Felix | 239/240 |
| 3,873,026 A | 3/1975 | Ochs | 239/240 |
| 4,058,960 A | 11/1977 | Movshovich et al. | 57/293 |
| 4,068,801 A | 1/1978 | Leutheuser | 239/381 |
| 4,081,135 A | 3/1978 | Tomaro | 239/381 |
| 4,201,344 A | 5/1980 | Lichte | 239/242 |
| 4,204,646 A | 5/1980 | Shames et al. | 239/381 |
| 4,254,914 A | 3/1981 | Shames et al. | 239/383 |
| 4,272,025 A | 6/1981 | Mazzotti | 239/240 |
| 4,281,793 A | 8/1981 | DeWitt | 239/97 |
| 4,298,015 A | 11/1981 | Garza | 239/240 |
| 4,332,484 A | 6/1982 | Peters | 366/137 |
| 4,398,669 A | 8/1983 | Fienhold | 239/447 |
| 4,405,087 A | 9/1983 | Mata-Garza | 239/226 |
| 4,440,345 A | 4/1984 | Figwer et al. | 239/237 |
| 4,512,724 A | 4/1985 | Horvath | 417/319 |
| 4,613,077 A | 9/1986 | Aronson | 239/97 |
| 4,893,937 A | 1/1990 | Braun | 366/263 |
| 5,070,864 A | 12/1991 | Lemons | 239/383 |
| 5,100,543 A | 3/1992 | Stauffer et al. | 210/169 |
| 5,201,468 A | 4/1993 | Freier et al. | 239/383 |
| 5,226,747 A | 7/1993 | Wang et al. | 4/491 |
| 5,285,536 A | 2/1994 | Long | 4/491 |
| 5,445,740 A | 8/1995 | Malone | 210/618 |
| 5,458,414 A | 10/1995 | Crump et al. | 366/263 |
| 5,467,739 A | 11/1995 | Boschert | 119/247 |
| 5,535,702 A | 7/1996 | Idbeis | 4/491 |
| 5,542,451 A | 8/1996 | Foster | 137/625.11 |
| 5,560,318 A | 10/1996 | Yoshida et al. | 119/248 |
| 5,658,076 A | 8/1997 | Crump et al. | 366/270 |
| 5,679,038 A | 10/1997 | Neisen et al. | 440/88 R |
| 5,718,380 A | 2/1998 | Schorn et al. | 239/381 |
| 5,899,560 A | 5/1999 | Byers | 239/263 |
| 5,984,205 A | 11/1999 | Rosenberg | 239/240 |
| 6,085,995 A | 7/2000 | Kah et al. | 239/240 |
| 6,164,562 A | 12/2000 | Wu | 239/240 |
| 6,193,169 B1 | 2/2001 | Steinhilber et al. | 239/240 |
| 6,193,171 B1 | 2/2001 | Albertson | 239/281 |
| 6,488,401 B1 * | 12/2002 | Seaman | 366/168.2 |
| 6,655,830 B1 * | 12/2003 | Seaman | 366/168.2 |

OTHER PUBLICATIONS

Product Literature of the TAAM, Inc., Camarillo, CA. U.S.A., and Tapei, Taiwan, for product entitled "Rio Motion 360° Rotator" (2 sheets). no date given.

* cited by examiner

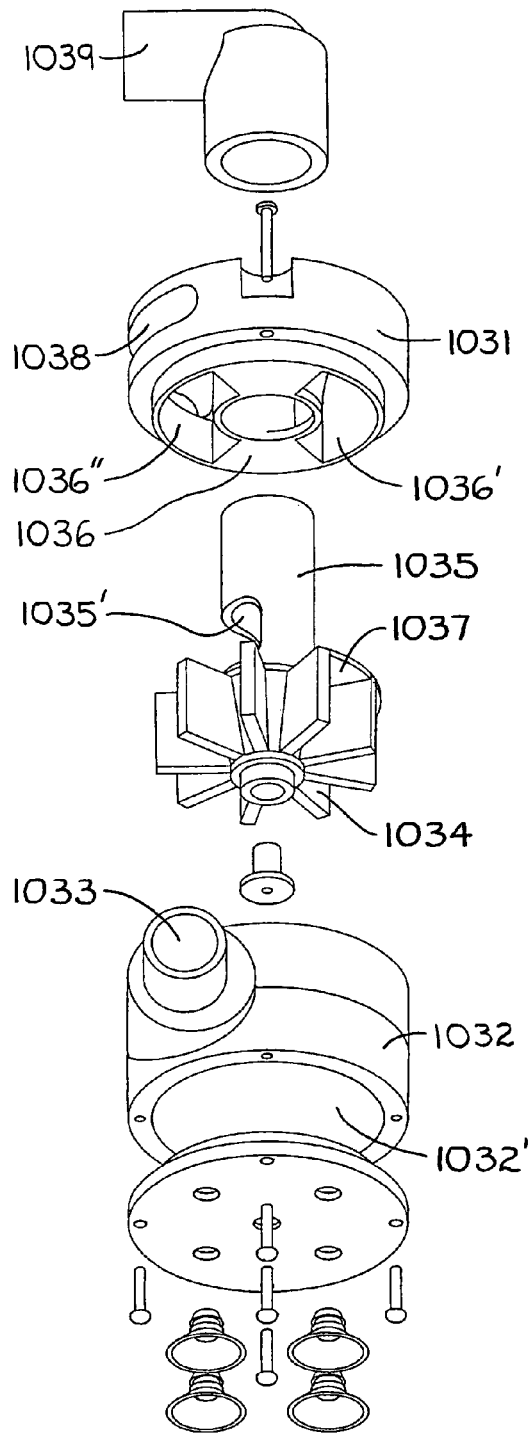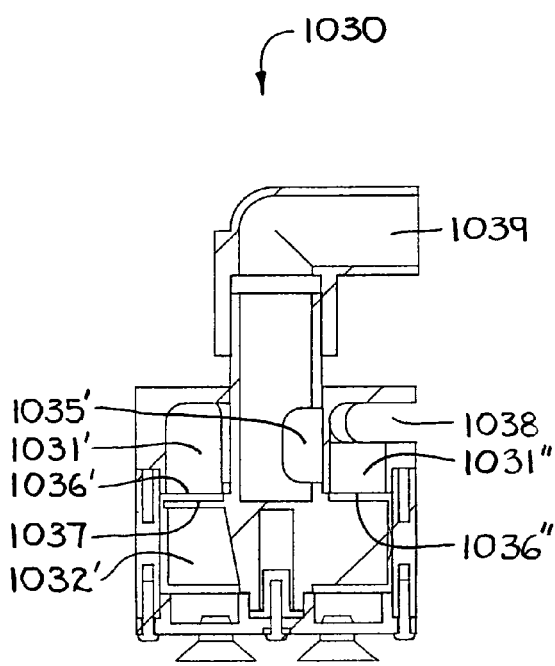
Fig. 3a
Fig. 3b

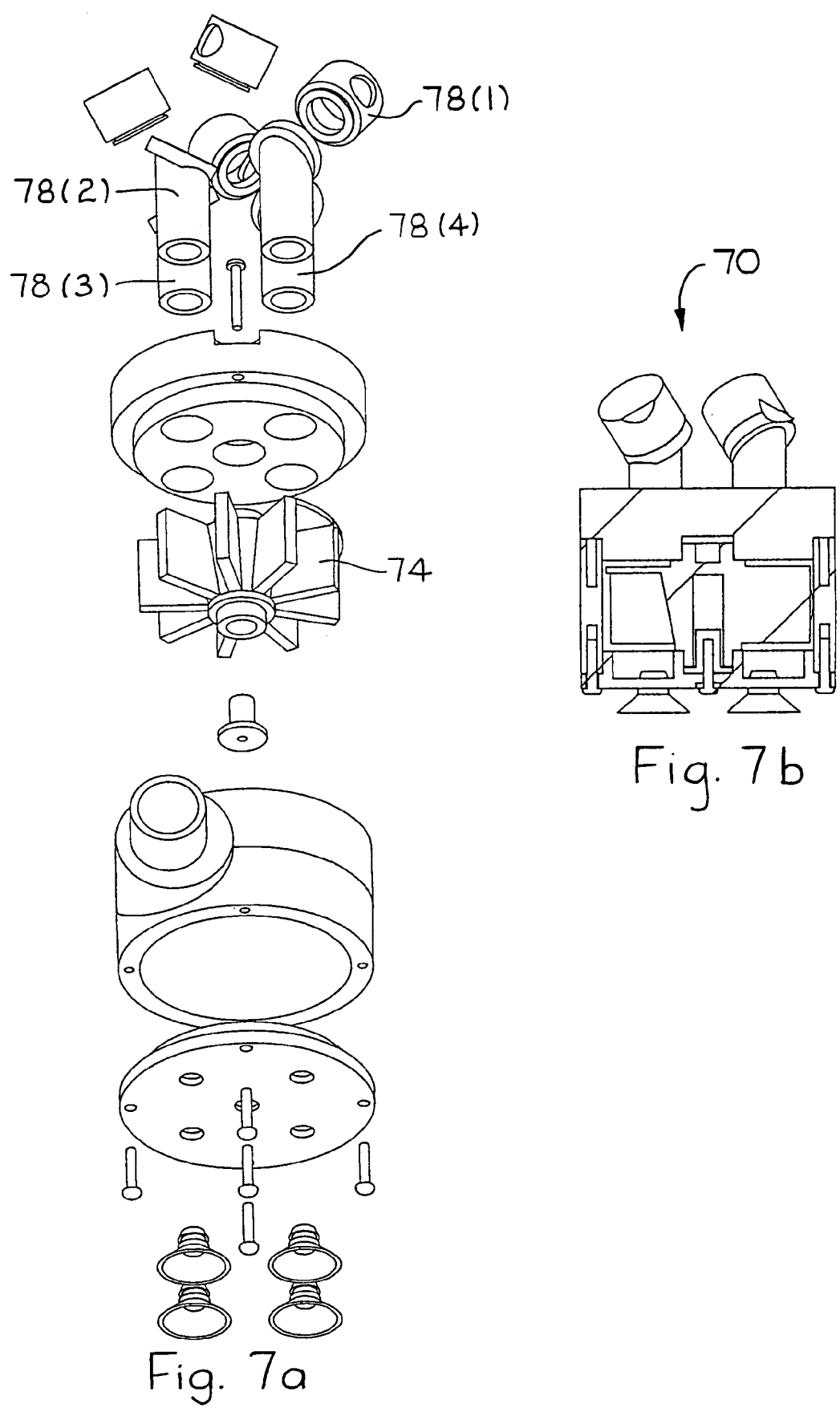

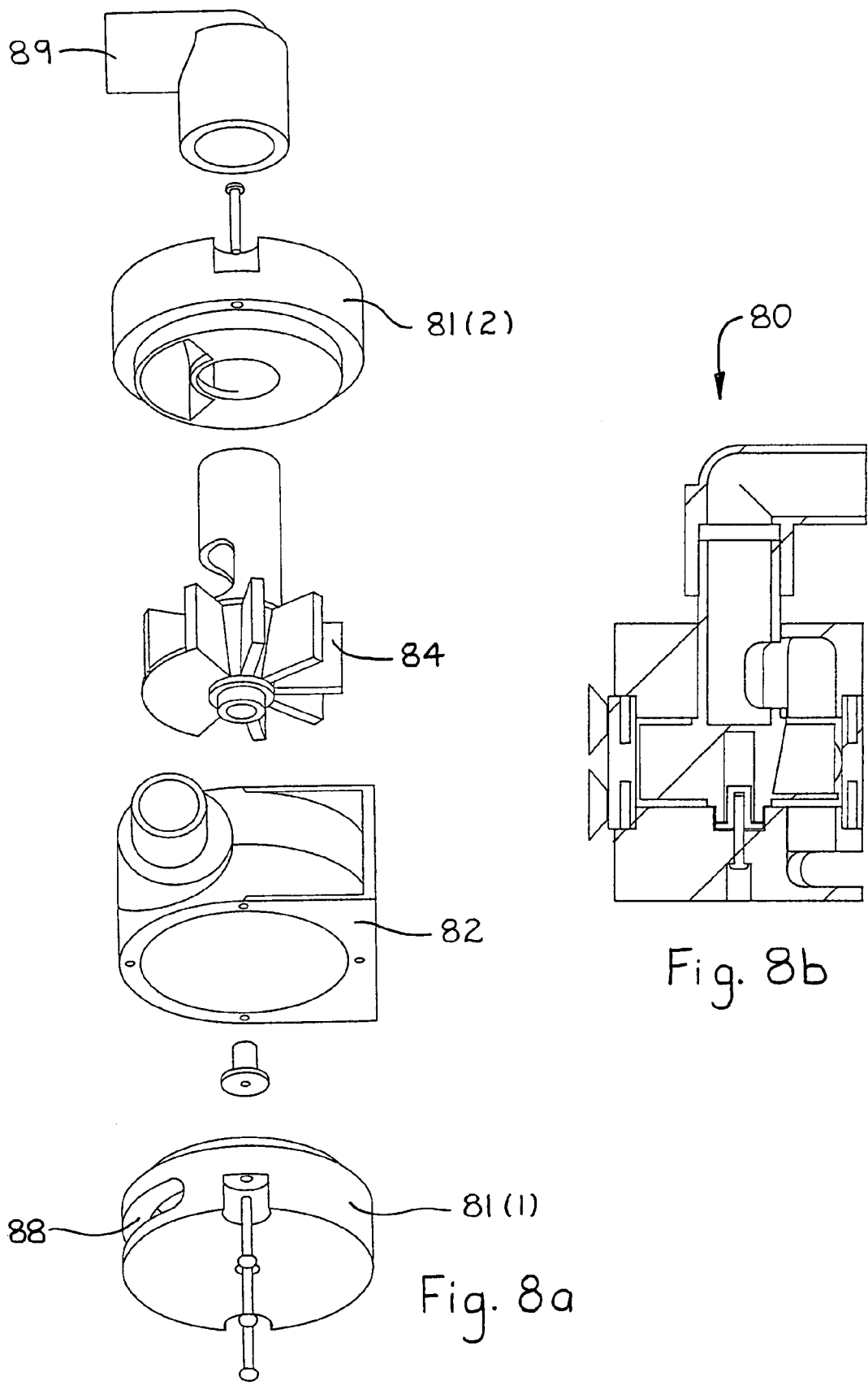

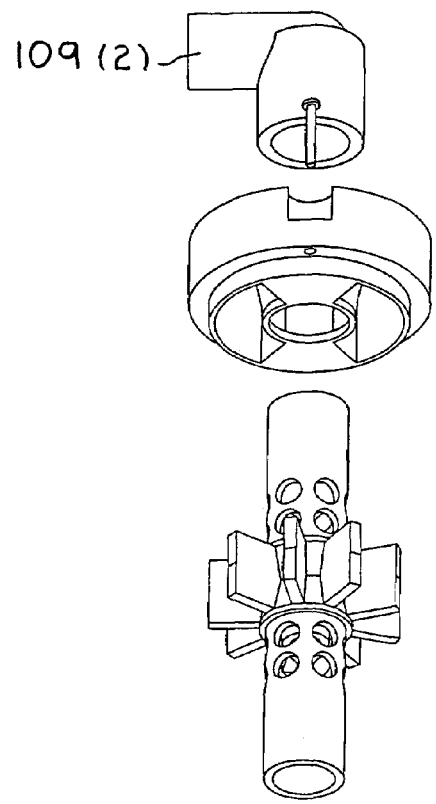
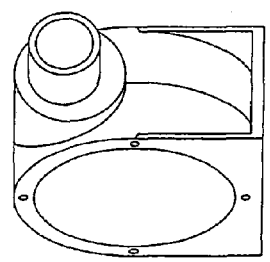
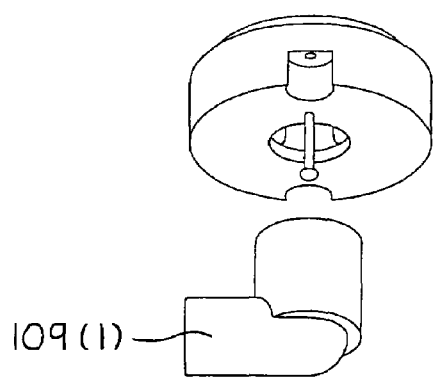
Fig. 10a
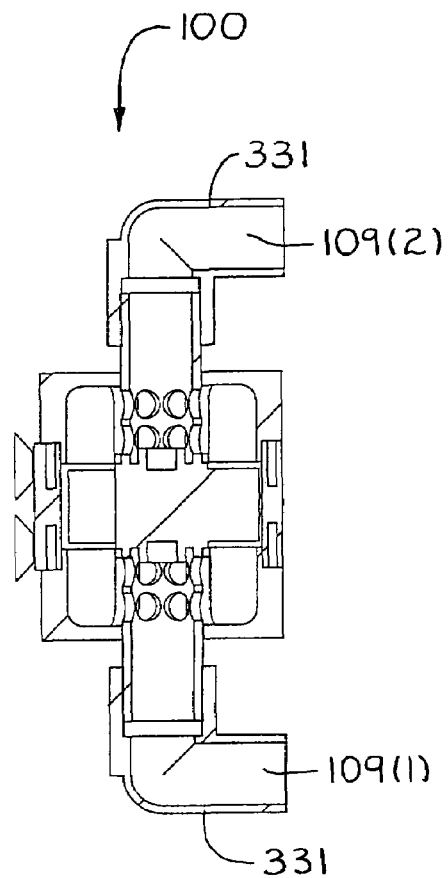
Fig. 10b

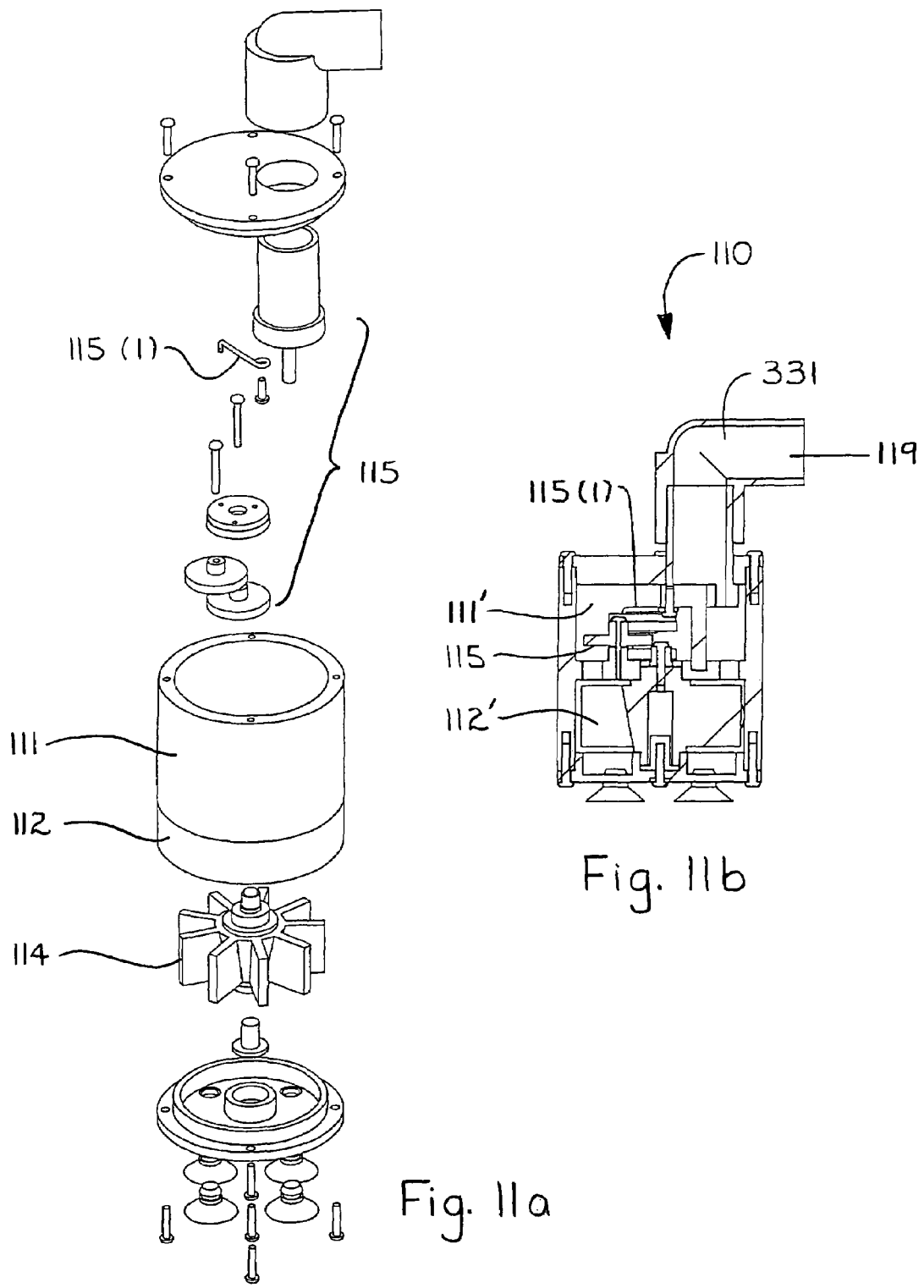

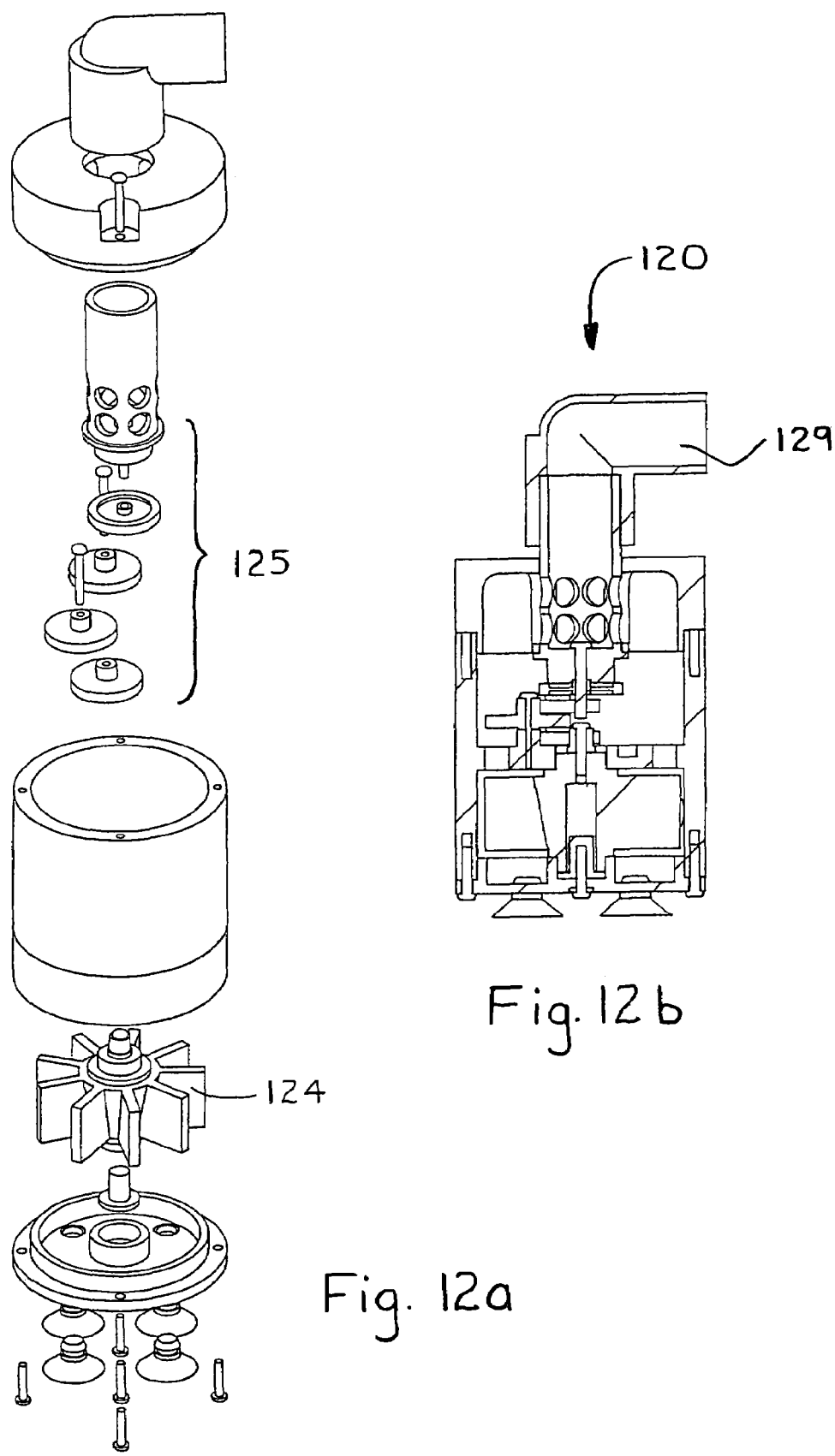

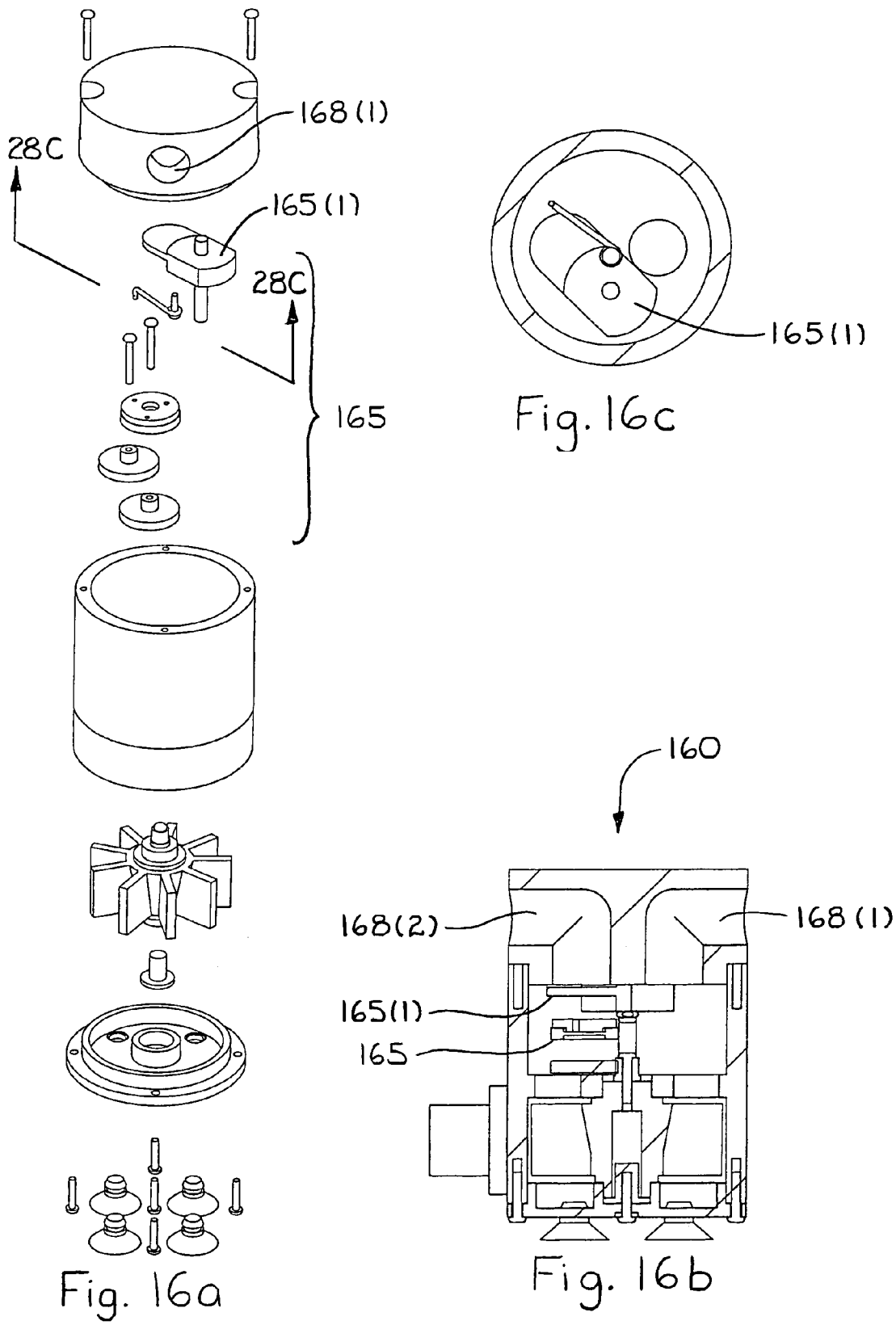

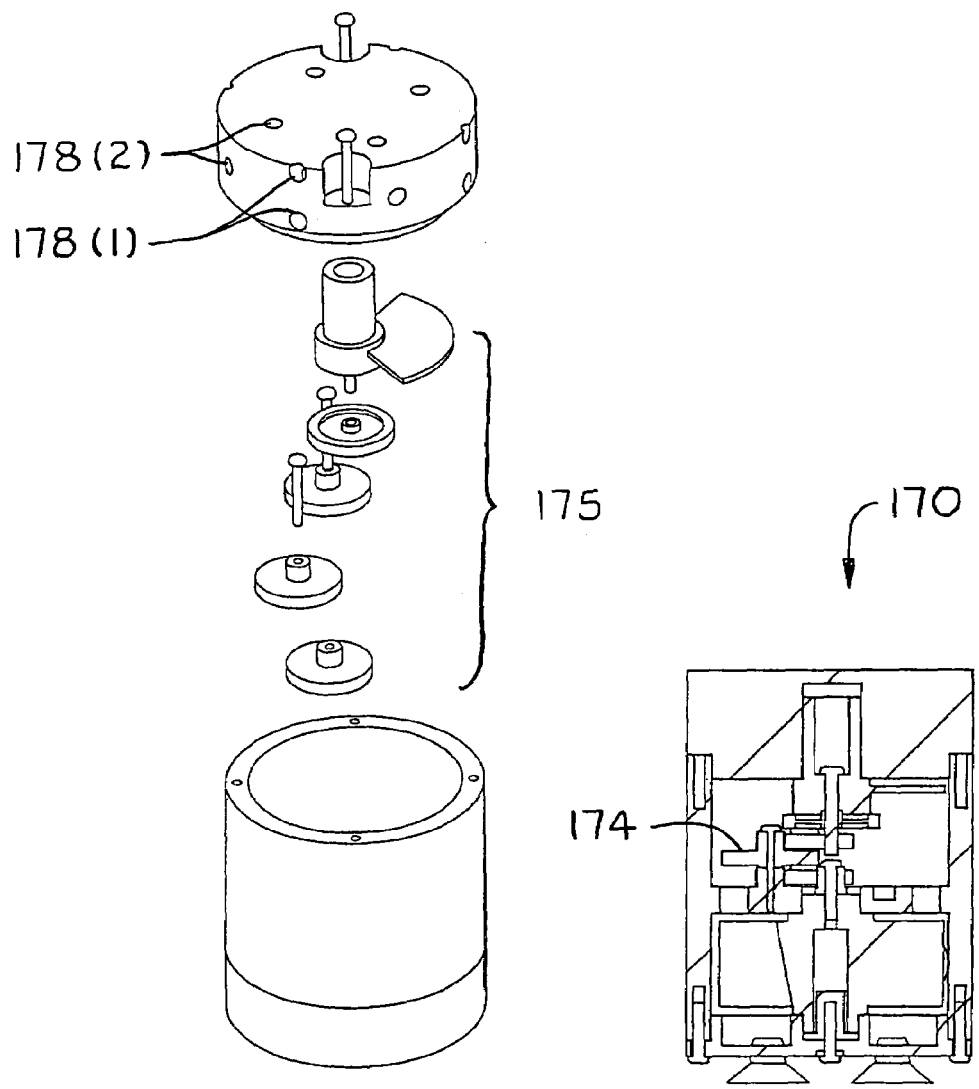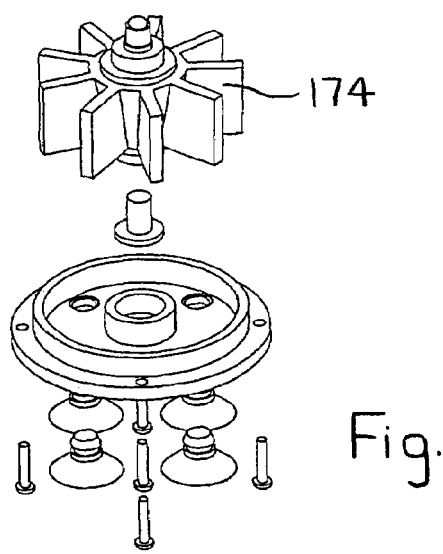
Fig. 17a
Fig. 17b

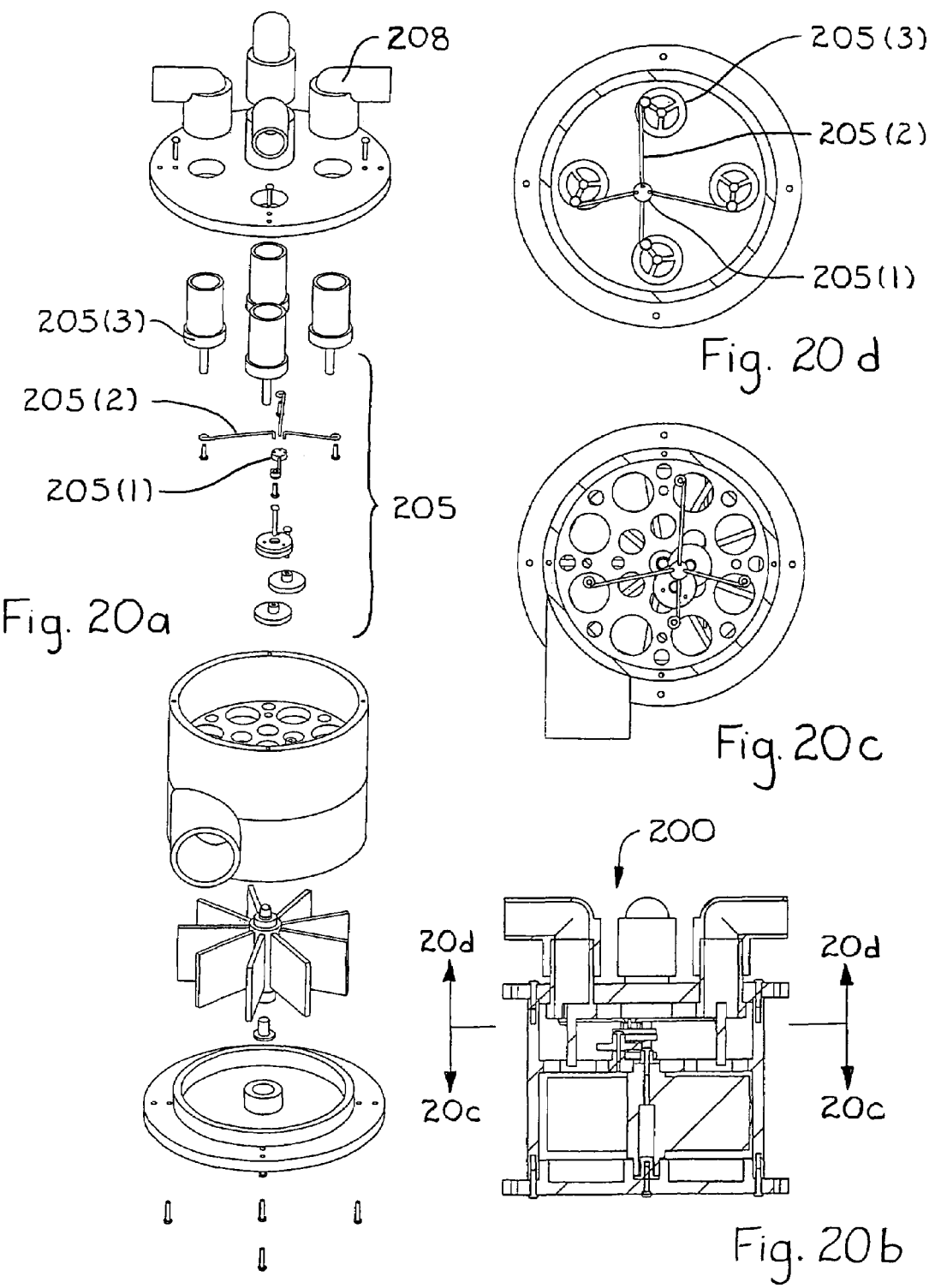

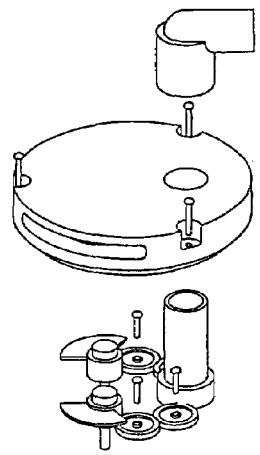
Fig. 22a
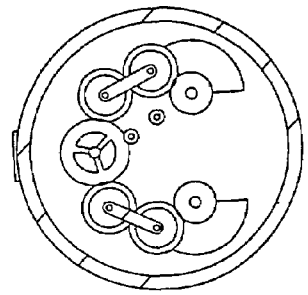
Fig. 22d
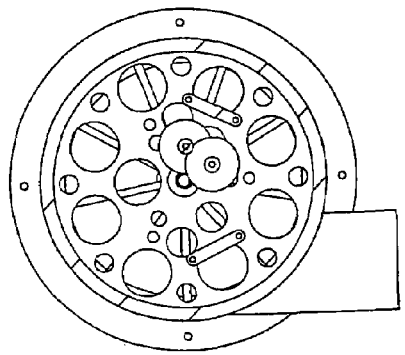
Fig 22c
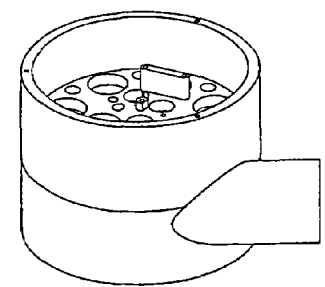
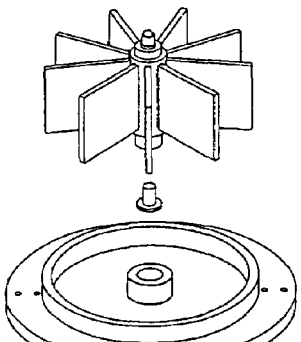
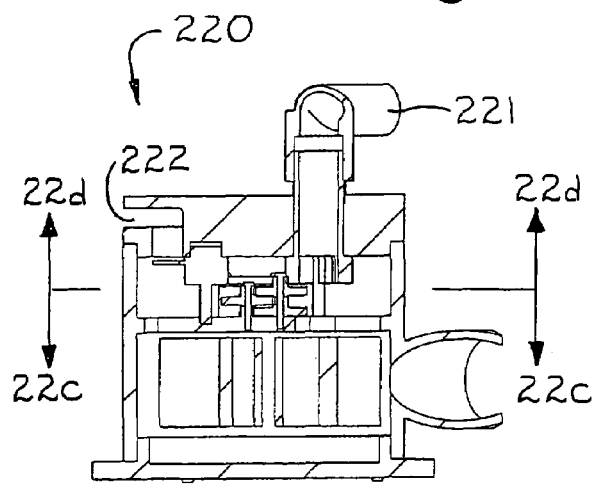
Fig. 22b

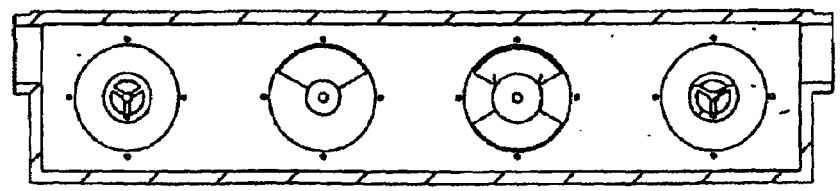
Fig. 23a
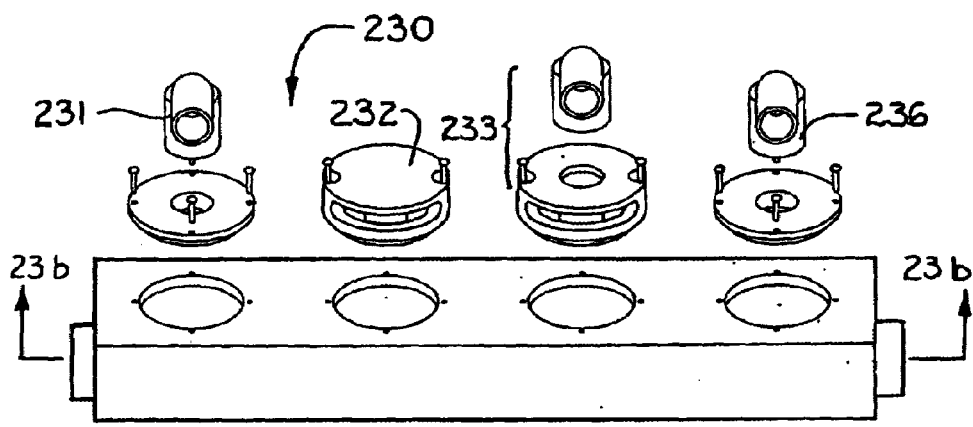
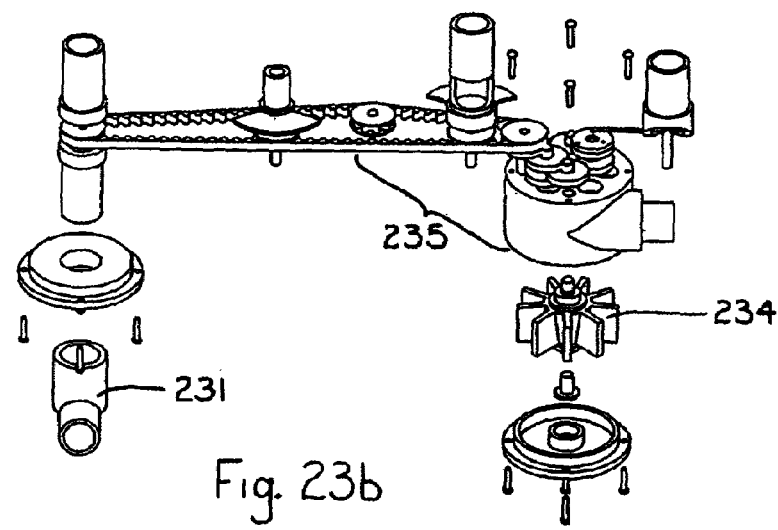
Fig. 23b

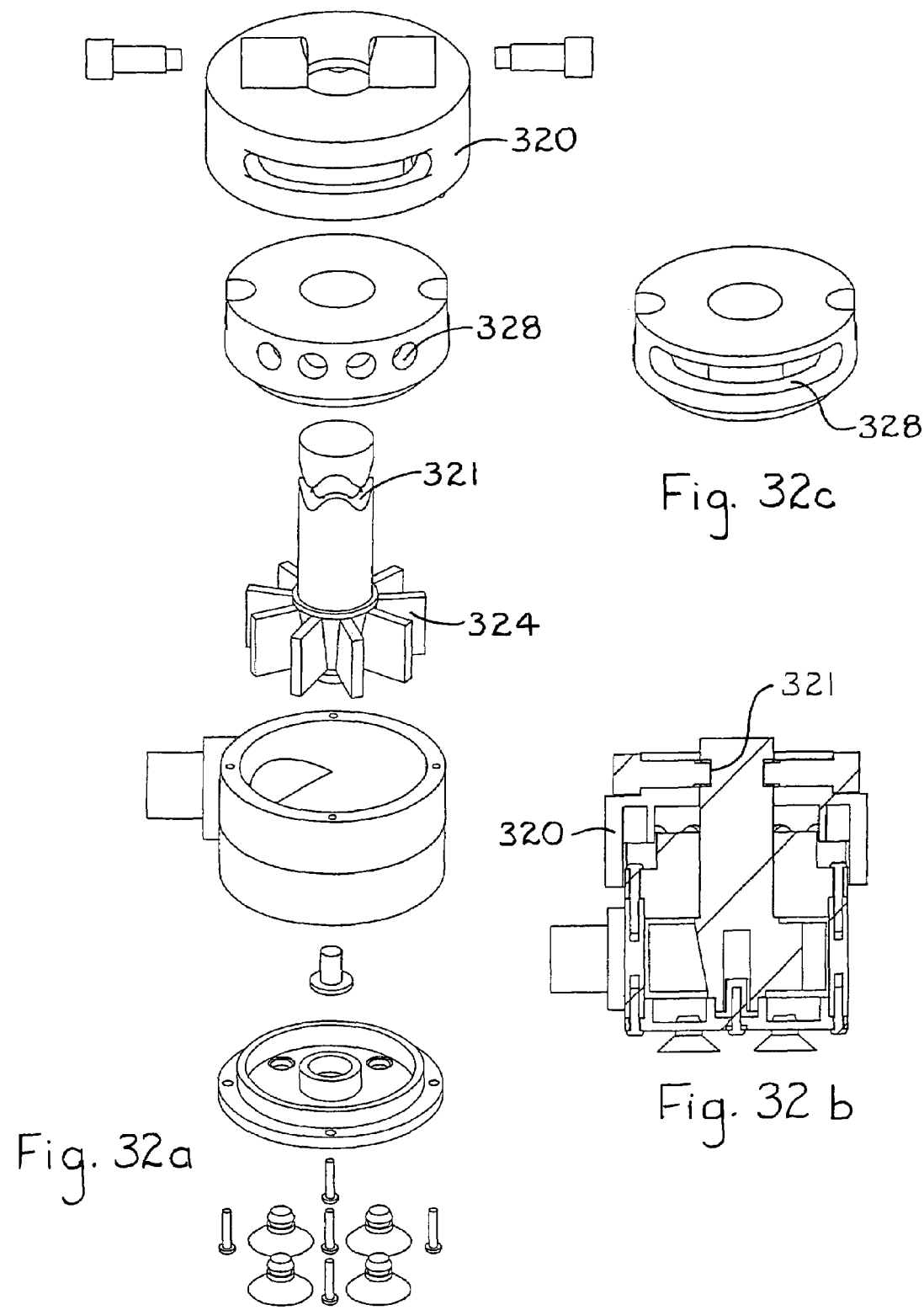

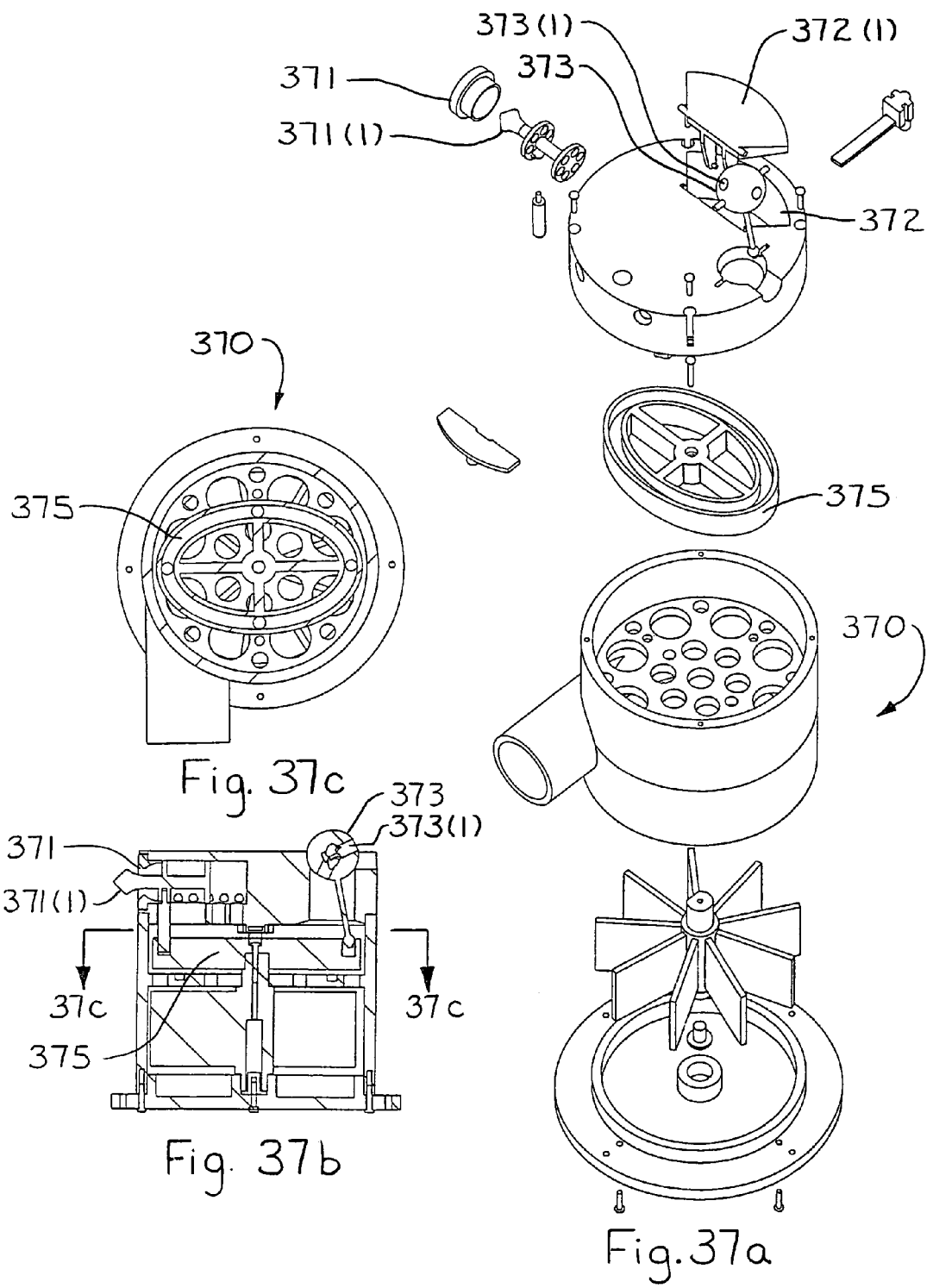

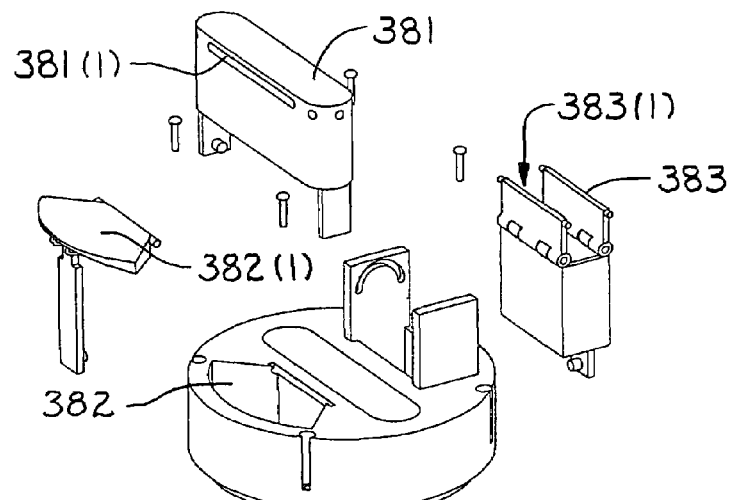
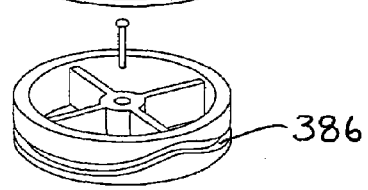
Fig. 38a
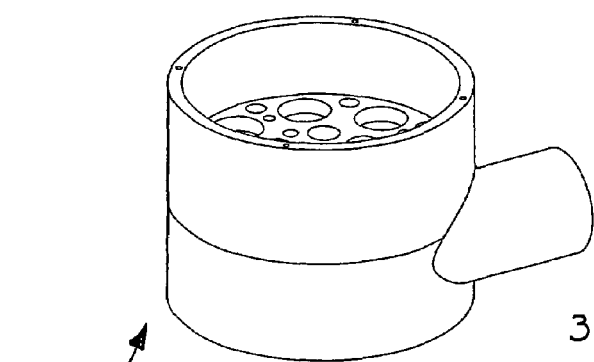
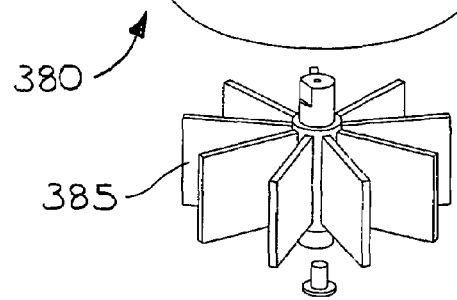
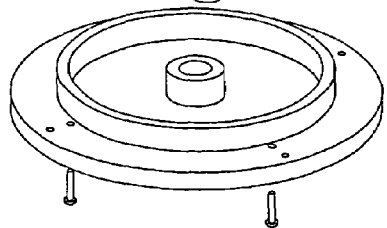
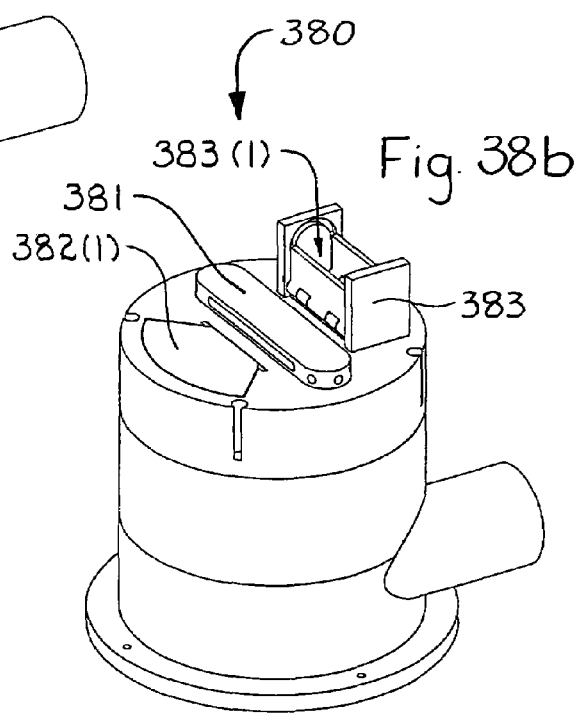
Fig. 38b

AGITATORS FOR WAVE-MAKING OR MIXING AS FOR TANKS, AND PUMPS AND FILTERS

CROSS-REFERENCE TO RELATED APPLICATION(S)

This application is a continuation of U.S. patent application Ser. No. 10/307,252, filed Nov. 30, 2002, U.S. Pat. No. 6,655,830 [patent data not certain], which is a continuation of U.S. patent application Ser. No. 09/575,103, filed May 19, 2000, U.S. Pat. No. 6,488,401, which is a continuation of U.S. patent application Ser. No. 09/283,591, filed Apr. 1, 1999, abandoned, which claims the benefit of U.S. Provisional Application No. 60/080,467, filed Apr. 2, 1998.

BACKGROUND OF THE INVENTION

1. Field of the Invention

The invention relates to agitators or circulators for inducing currents—or waves if that is preferred—in a given tank. One example illustrative use environment for the invention involves salt water aquariums in which it is desirable to generate a wave and/or current environment similar to an actual reef so that filter-feeding organisms like coral are given plenty of plankton circulated by them to feed on. Other example use environments include without limitation process industries like the chemical, food, or water treatment industries and so on, for use in mixing tanks to mix dissolving chemicals or blend fluids or the like, including suspending or dispersing particles, bubbles, droplets, fluid clumps and so on.

Additional aspects and objects of the invention will be apparent in connection with the discussion further below of preferred embodiments and examples.

2. Prior Art

Waves at the surface of fluids appear as a variation of the familiar sine curve in mathematics. The amplitude and frequency of the wave are analogous to its mathematical counterpart. The amplitude of a surface wave can be best described as the height of the crest of the wave. The period of the wave is the time in seconds for successive crests to pass a fixed point. The frequency of the wave is the inverse of the period. The amplitude of the wave (height of the crests) is directly proportional to the force with which the water/fluid hits stationary objects. Waves with large crests (amplitude) carry a large volume of water which, when decelerated by stationary objects, produce large forces. Correspondingly, waves with small amplitudes produce small forces.

Surface waves in nature, aquariums and tanks vary from the sine analogy in that they are three dimensional. Surface waves in nature have eddy currents, back pressure from the previous wave meeting the shore or reef, undercurrents, etc., which change the shape, amplitude and frequency of the wave.

Waves below the surface can be described as an increasing and a decreasing of the mass flow rate through a given volume of fluid. This increasing and decreasing of flow requires a corresponding increasing and decreasing of pressure. The amplitude of the wave can be described as the flow rate over a given volume. The period is the time needed for the flow to switch from ON to OFF and back ON. The flow can also be pulsed from high to low. As previously stated, the frequency is the inverse of the period.

For surface and below surface waves, the fluid carries energy which can be dissipated in many ways. Two of the more prominent are:—(i) the energy is dissipated in the fluid by shear, and (ii) the energy is dissipated in the fluid by contact with a stationary object. In the ocean, stationary objects include irregular terrain, ocean floor, boulders, vegetation, shoreline, and so on. In a tank, stationary objects include the sides, bottom, bulkheads, fixtures, and so on. Steady streams also loose energy by shear or by contact with stationary objects. Most of the energy losses in a steady stream occur at the boundaries of the flow.

The dissipation of energy in large volumes of fluid, whether from a wave or a stream, causes turbulence. Turbulence along with a substantial flow rate are the desired components for a thriving aquarium or for an efficient fluid mixer.

In tank environments, pumping operations, engines, fuel systems, hydraulic systems or any fluidized system, filters are generally used to remove sediment, waste, debris, impurities, and so on. Most filters use a meshed media to trap particles of a certain size. The smaller the opening or pore, the smaller the particle it can retain. As filters trap particles, the available area to pass fluid is reduced. When this happens, the flow rate and pressure down stream from the filter are substantially reduced. This, in turn, causes a decrease in system performance and an increase in operating costs.

Pumps used in aquariums are generally magnetic drive pumps. Submersible magnetic drive pumps (e.g., as available from Horvath) are used extensively inside the aquarium. The Horvath-type pump and the submersible pumps commercially available today differ only in the following:—the submersible pump has a sealed stator assembly and the 90° exit for the pressurized stream is straight. Pumps used outside of the tank or in chemical/food processing have a permanent magnet embedded in the impeller. The impeller is encased, on bushings, in its housing and it is driven by coupling the encased magnet with a motor driven magnet. The motor driven magnet is outside the housing so there are no seals. This type of pump is used to prevent fluid from leaking out of the drive shaft seals or to prevent contamination of the fluid from bearing grease, and so on. The magnetic drive pumps are quiet, reliable and almost never leak. The main drawback to these pumps is the weak coupling between the magnets. The magnetic coupling cannot transfer motor torque to the impeller efficiently. These pumps rely on impeller speed to transfer energy to the fluid and they generally have a high flow, low pressure (3 to 30 psi) discharge. Small changes in motor speed, from minor voltage fluctuations, causes significant changes in the pump output. While this type of pump recirculates water and low viscosity fluids without any problem, it has little value for high viscosity fluids. For the work they perform, magnetic drive pumps consume more power than direct drive pumps.

As mentioned above, the dissipation of energy stored in the fluid stream causes turbulence in the tank. Because energy stored in a fluid stream is proportional to pressure, pumps with a low pressure discharge generally store little energy. While the flow from magnetic drive pumps may seem substantial, the energy is dissipated rapidly, through shear, into the stationary fluid and its effect over the entire tank is minimal. Most of the turbulence occurs near the pump discharge or at the boundaries of the fluid stream.

Since fluid at a high flow rate and high pressure creates the most amount of turbulence, high-pressure/high-volume pumps are the drivers for fast and efficient mixing and processing of fluids. High-pressure/high-volume pumps are also the drivers for creating high amplitude waves in aquariums or cleaning the pores of media used in filters.

Mixers for a slurry or solids, such as beaters, food processors, blenders and so on, all rely on a rotating impeller(s) (e.g., beaters, chopping blades, whisks and the like) to perform mixing, blending, chopping, and so on. Some devices rotate the mixing bowls under the mixing head. The mixers operate by spinning the impeller at a high speed and relying on gravity, centrifugal force and pressure from the impeller to mix the ingredients. The larger the impeller diameter, the more torque is required to mix the ingredients. Most commercial and industrial mixers are scaled such that container size, bowl size, tank size and so on, are chosen after the impeller and motor size has been determined. Most mixers use a bowl that is slightly larger than the impeller diameter so the mixing head will be close to the boundaries of the bowl and the mixing will be automatic. If the user needs to mix a large volume, a larger bowl or container is needed or multiple batches must be prepared. With the larger container, the user is forced to move the container around on the stationary impeller, move the mixer or stop the motor and move the unmixed ingredients toward the impeller. With multiple batches, more mixers or an increased preparation time is required.

SUMMARY OF THE INVENTION

It is an object of the invention to provide agitators or circulators for inducing currents or stirring in a given tank, given a feedwater stream having a relatively low head but perhaps relatively substantial flowrate.

It is an alternate object of the invention to provide such agitators or circulators for salt water aquariums where it is desirable to slosh the water around real thoroughly, which allows reef organisms like filter-feeding coral to get plenty of chance at catching and feeding on plankton that drifts at the whim of the currents set up in the tank.

It is an additional object of the invention to configure such agitators so that they operate passively on the return line of the filter water drawn off from the tank, which return line might indeed be very low head. Configuring the agitators for this kind of use environment affords them to be submersible, to plug-in on the terminus of the return line, and operate worry free.

These and other objects and aspects in accordance with the invention are provided by tank agitators which are connected onto the terminus of a generally steady flow, low head feedwater line and causing agitation in the tank by the discharge of the feedwater through a given discharge port.

In one basic form of the invention, the discharge port rotates. To achieve this, the tank agitator comprises some of the following aspects. That is, the tank agitator has a housing having an inlet for connection to the feedwater line and defining a turbine plenum and an exhaust plenum. It also has a turbine mounted in the turbine plenum and driven to spin by the flowthrough of the feedwater. The turbine exhausts to the exhaust plenum. There is also a hollow drive shaft driven to spin by the turbine and extending partially within the exhaust plenum and through a seal in the housing to terminate outside the housing. The hollow drive shaft is formed with an aperture that allows water in the exhaust plenum to flow into the lumen of the shaft. Given the foregoing, a nozzle is attached on the end of the shaft and defines a discharge port angled off the axis of the lumen such that the discharge stream issuing therefrom sweeps in circles with the spinning of the drive shaft.

In a variant form of tank agitator in accordance with the invention, the agitator causes agitation in the tank by pulsing the discharge through the discharge port between alternating phases of flow and quiescence. This form of the agitator comprises a housing having an inlet for connection to the feedwater line and defining a turbine plenum and an exhaust conduit extending between an opening to the turbine plenum and a port in the housing to the outside. A turbine is mounted in the turbine plenum and driven to spin by the flowthrough of the feedwater. The turbine exhausts to the exhaust plenum. A blocker door is coupled to and driven by the spinning turbine to cycle between uncovering and covering one of the exhaust opening and the discharge port. Given the foregoing, the discharge stream issuing from the discharge port pulses between alternating phases of flow and quiescence.

In still another variant form of the tank agitator in accordance with the invention, it causes agitation in the tank by the discharge of the feedwater through a discharge port that oscillates back and forth between angular extremes. This other variant form comprises a housing having an inlet for connection to the feedwater line and defining a turbine plenum and an exhaust plenum. A turbine is mounted in the turbine plenum and driven to spin by the flowthrough of the feedwater. The turbine exhausts to the exhaust plenum. A hollow drive shaft is mounted to oscillate and extends partially within the exhaust plenum and through a seal in the housing to terminate outside the housing. The hollow drive shaft is formed with an aperture that allows water in the exhaust plenum to flow into the lumen of the shaft. A nozzle is placed on the end of the shaft and it defines a discharge port angled off the axis of the lumen such that the discharge stream issuing therefrom sweeps in back and forth arcs with the oscillation of the drive shaft. To complete the foregoing there is included a drive train that incorporates a drag link interconnecting the spinning turbine with the oscillating drive shaft such that the spinning input of the turbine is converted into an oscillating output in the drive shaft.

The above-sketched basic forms can be combined, modified and permutated in numerous respects and aspects as will be apparent in connection with the discussion further below of preferred embodiments and examples of the invention.

More general remarks are provided next in the succeeding extended passage.

The devices in accordance with the invention allow for the following. They allow the varying, making, positioning and control of waves, both amplitude and frequency, and of steady stream flows in an aquarium, tank, pool, vat, any fluid storage/mixing container or in a filter for the express purpose of creating turbulence in the fluid contained in an aquarium, tank, pool, vat, any fluid storage/mixing container or filter. They allow the movement, including velocity and positioning, of wave-makers/mixers, impellers, pump heads, and so on, or any combination of the above in the aquarium, tank, pool, vat, filter box and so on, for the purpose of creating turbulence, or mixing fluids or a slurry. They allow for the movement, including velocity and positioning, of impellers, beaters, chopping blades, whisks, and so on or any combination of the above in a tank, bowl, container and so on, for the purpose of mixing, chopping, blending, and so on, solids or a slurry.

The devices in accordance with the invention break down into eight basic categories. In one category, there are devices which pulse flow from a pump, ON and OFF, and distribute it through an exit port or ports which control the volume and shape of the pulsing flow. These devices control the amplitude, frequency and location of the pulse. A controller can be used to vary the amplitude, frequency and location of the pulse with respect to time. The controller can be manual, preset or programmable.

In a second category, there are devices which rotate or sweep fluid from a pump thru an arc or an arc segment and distribute it through an exit port or ports which control the volume and shape of the rotating flow. These devices control the amplitude, frequency, and location of the sweep. A controller can be used to vary the amplitude, frequency and location of the sweep with respect to time. The controller can be manual, preset or programmable.

In a third category, there are included pumps or mixing impellers (i.e., a mixing impeller in this case is simply a pump without a housing) which, through use of a controller attached to the motor thereof, increase and decrease flow rate to create a pulsing effect. For pumps, the flow is exited through a port or ports which control the volume and shape of the flow. The controller can be manual, preset or programmable.

In a fourth category, there are pumps which, through use of a controller attached to an automatic valve, divert the flow from one exit port to another, causing a pulsing effect in the discharge of each exit port. The controller can be manual, preset or programmable.

In a fifth category, there can be any combination of the above.

In a sixth category, there can be any of the above devices or a pump which are additionally mounted on tracks or similar guides which move the devices to various locations in the tank. The position and velocity of the devices (as they move in the tank) can be fixed along a set track with a set velocity or the movement can be set by a controller. The movement can be along one axis or multiple axes. The controller can be manual, preset or programmable.

In a seventh category, any of the above devices, used individually or in combination, can be situated inside a filter, filter canister or filter box to keep the filtered particles suspended in the fluid and away from the meshed filter media pores.

Any of the above devices use in any combination and packaged separately or as a unit.

The pulsing devices in accordance with the invention create turbulence by turning flow ON and OFF or alternating the flow from high to low and distributing it over the desired volume. When the pulsing wave-maker/mixer or pump is pulsed ON, it allows fluid to flow over a volume for a set period of time. During this time, the flow is a steady stream with most of the turbulence at the boundaries of the stream. When the device is pulsed OFF, the energy from the fluid stream is dissipated into the stationary fluid. This creates turbulence across the entire volume and not just at the boundaries of the flow. Low frequency pulsing gives the fluid more time to dissipate its energy, whereas higher frequency pulsing gives the fluid less time.

The sweeping devices in accordance with the invention create turbulence by sweeping the flow over a large volume. As the devices sweep or oscillate, the flow is turned ON and OFF at any fixed location along the flow path. This creates a pulsing effect over any fixed volume that is encompassed by the fluid path from the sweeping or oscillating discharge. As the fluid stream enters and exits the fixed volume, the energy from the fluid is dissipated into the stationary fluid. This creates turbulence across the entire volume and not just at the boundaries of the flow. Low frequency rotating or oscillating gives the fluid more time to dissipate its energy: higher frequency rotating or oscillating gives the fluid less time.

The sweeping devices that discharge fluid in a 360° circle have an additional use. If this device is placed vertically in a tank near an edge or corner of the tank with the discharge near the surface of the fluid, the device makes an exceptional surface wave in the tank. The device works as follows. As the discharge sweeps toward the side or corner of the tank, the pressure holds fluid up against the side of the tank. As the discharge rotates back toward the center of the tank, the fluid that was pushed up against the side is released and gravity pushes it down and back toward the center of the tank with the fluid that is continuing to discharge from the wave-maker/mixer. The result is an excellent surface wave. A large discharge area combined with a high discharge flow and pressure produce a large amplitude wave. The faster the device rotates, the higher the frequency and the slower the device rotates, the lower the frequency of the waves. Other factors that affect the amplitude, frequency and shape of the wave are:—size, shape and volume of tank; fill factor; position, attitude and depth of wave-maker/mixer; density of fluid; and location, size, and relative placement of fixtures in tank. Pulsing devices also create a surface wave when the discharge is placed near or at the surface but the rotating device has more impact at the surface of the tank for the same discharge flow and pressure.

The devices that (i) both sweep and pulse (ii) pumps or pump heads that pulse ON and OFF (with or without built in wave-makers/mixers), (iii) pumps or pump heads with automatic valves that switch flow between two or more exit ports or wave-makers/mixers, (iv) or any of the moving or stationary devices outlined above that work in fluids or a slurry, operate on a combination of previously outlined principles. In aquariums, where a high pressure, steady stream flow can affect the livestock (e.g., fish), the pulsing, sweeping, oscillating, or moving wave-makers/mixers allow for the use of a high pressure pump. The pulsing, sweeping, oscillating or moving breaks up a high pressure stream so it can still reach a greater distance into the aquarium from the discharge but not injure the livestock. The turbulence helps create a more natural marine ecosystem. The moving systems have the added benefit of ensuring water movement over an exact volume of the tank. These devices also ensure rapid, thorough and cost effective mixing of chemicals, foods, and so on.

Any of the sweeping or pulsing devices, or any combination of devices mentioned above when placed inside a filter, filter canister or filter box, work by creating turbulence in, and a washing down of the filtering media from inside. The result is the suspension of particles in a slurry inside the filter or a washing of the particles to a holding area which keeps them from clogging up the pores of the filter media. The particles still cannot pass the filter media, but their suspension inside or placement away from the filter will keep the pores open and allow for greater flow and pressure. This, in turn will increase system performance, reduce filter changes and save energy.

The devices that depend on movement, including velocity and positioning, of rotating impellers, beaters, chopping blades, whisks, and so on. in a tank, bowl, container and so on, work by moving the rotating impeller to various positions in the tank to ensure thorough mixing, chopping, blending, and so on, of the solids or the slurry. By moving the impeller and motor on a track in a programmable routine, significant improvements are made to the process. The motor can be optimized for power use, for the diameter of the impeller and for the intended use. Various container sizes can be used. The mixing will be thorough. And the process will require minimal operator attention. In short, the process will be efficient, less time consuming and cost effective.

Now what follows is a discussion of various applications for the devices in accordance with the invention and various aspects relating thereto.

A major application of the invention involves making waves or currents in or effecting filtering in aquariums.

Another application includes use for aeration and pumps. In this regard, various objects include making surface waves, creating currents and turbulence in tank, aeration, sweeping debris and waste and sediment off bottom of tank and transport it to the suction side of pump for removal by filter, and also, keeping canister filters from clogging up and reducing flow to tank.

There are current-producing applications to generate waves/turbulence. These include switch boxes which incorporate several outlets to switch multiple pumps ON and OFF at preset intervals (the pumps can be set at various locations in tank); a motor driven oscillating platform to mount a submersible pump to; a non-submersible motor driven oscillating outlet (only outlet is in water) which requires a separate pump (e.g., an "aquagate"), dump buckets and siphon buckets.

In chemical mixing and filtering applications, various purposes therefor are to facilitate chemical reactions by mixing and agitating components, aid in dissolving of solids, prevent solutions from separating, and so on. Another application includes making waves in swimming and wading pools.

Additionally, applications for devices in accordance with the invention include industries such as waste and sewage treatment, food and beverage processing, photo processing, machining (e.g, wire EDM, grinding, honing or lapping), any hydraulic machinery or hydraulic system which uses a filter or sump, any process where a sump or filter is used cool or lubricate or carry away debris from a process, any filter which uses meshed media to remove particulate matter from a stream or container or open or closed fluid system (e.g., engine oil filter and fuel filters), and the like.

The drawings show embodiments which are direct drive wave-makers and mixers. In these, the turbine or motor turns at same speed as the operative wave-making/mixing components which may be the rotor(s) rotator, pulser, rotating pulser, two port pulser, omni pulsers, any multiple port pulsing or rotating wave-maker or mixer and any dual combination of the above; as well as any multiple discharge, multiple inlet or manifold grouping of the above; and/or any modular housing or assembly into which any of the above devices can be grouped.

In the embodiments shown by the drawings, the pump is separate from the operative wave-maker/mixer. That is, the wave-maker/mixer can be driven by a turbine or by an electric motor. The turbine housing can be integral to wave-making/mixing plenum or separate from wave-making/mixing plenum and connected to wave-making/mixing rotor by a shaft. The shaft can be solid, hollow or flexible. The two chambers can be separate or the hollow shaft can be utilized to transfer fluid Between the two chambers.

A high-pressure/high-volume pump can be used to power multiple wave-makers/mixers. A metering orifice can be inserted to limit the flow to each wave-maker/mixer. This eliminates the need for multiple pumps to drive each wave-maker.

If the two plenums are separate from each other (e.g., no fluid passes between the plenums), then a different pump and or fluid can be used to drive the turbine (e.g., an air-driven turbine mixing salt water). Using a different pump to drive the turbine separates the wave-making/mixing rotor speed and torque, from the discharge pressure and flow rate of the fluid being mixed.

The turbines can be radial, axial or mixed flow, it being preferred that they are radial flow as shown by the drawings. The turbines can be designed to be used with a variety of pumps or can be customized to meet pump, speed and torque requirements for a specific application. A reaction-type turbine (e.g., think of a common lawn sprinkler) can be used to propel the wave-making/mixing rotor or can be used alone as a rotator. This type of rotator is less effective than what has generally been shown by the drawings because, opposite and equal are the (i) velocity of the wave-making/mixing rotor at the discharge and (ii) the fluid velocity. This minimizes the amplitude of the wave.

The agitators in accordance with the invention also allow incorporation of a motor controller, which is added to the pump to vary the speed of the pump impeller. This, in turn, will vary the volume and pressure output from the pump with respect to time. By varying the flow into the wave-maker/mixer from the pump, a user can vary the wave-maker/mixing rotor speed and the discharge volume and pressure with respect to time. If separate pumps are used to drive the turbine and feed the wave-maker/mixer, then the controller can be used to vary the speed of both pump heads independently. This allows the speed and torque of the wave-making/mixing rotor to vary with respect to time and separately from the discharge flow rate and pressure of the wave-maker/mixer. This results in an additional pulsing effect in the tank.

A motor can be used to drive the wave-maker/turbine rotor. The motor can be submersible, magnetic drive, or can be out of the tank and connected to the wave-maker/mixer rotor by a shaft. The shaft can be solid, hollow or flexible a controller can be added to the motor to enable the operator to vary the wave-maker/mixer rotor speed with respect to time.

A motor controller allows the operator to pre-program a wave making/mixing profile with respect to time or to manually select motor-speeds/pump-flow rates as desired. Manual controllers (rheostats and so on) can be used in lieu of a controller.

Flow from pumps can be controlled by automatic valves. These valves can be manually operated or regulated by a controller and used to limit flow from a pump or switch between multiple wave-makers/mixers. Use of a valve to control flow from a pump would eliminate the need to vary the speed of the pump motor. A controller-operated automatic valve can switch between wave-makers and cause a pulsing between two wave-makers.

One or more ports can be added to the body of the wave-maker/mixer (see, eg., FIG. 29a) to allow for the injection of a second chemical, gas or air. This injection port (eg., shown in FIG. 29a) can be fed fluid from another pump (e.g., a mixing or dosing pump), compressed gas, air from a compressor and so on. If the additional, injection port is placed near the fluid discharge, it can take advantage of the venturi effect and naturally draw air or fluid into the stream for mixing.

For pulsing models with discharge ports integrated in the sidewall of the upper housing, port width and height can be adjusted by use of a ring with a slot in it (see, e.g., FIG. 29). The ring fits around the exit port and can be adjusted to modify exit shape and area. Various other types of constrictors, such as a cover with adjustment slots that is screwed into upper Housing, can be used to modify the shape and area of the discharge.

For pulsing models with threaded exit ports, special fan shaped, variable orifice, or fixed orifice fittings can be screwed into port to modify discharge shape, flow and area.

For turbine driven pulsing models with connected plenums, the partition ports can be of any shape or size and the blocker doors can be any length or width as long as the flow is sufficient to keep the turbine turning. If the blocker doors are too big or the partition port(s)'s area too small, the turbine will stop. For motor-driven or turbine-driven versions with separate plenums for the turbine and wave-making/mixing rotor, the blocker door(s) and the partition ports can be of any size or shape to give the desired pulsing effect. A wide blocking door(s) or narrow partition port(s) cause a low frequency pulse and a narrow blocking door(s) with a wide partition port(s) cause a high frequency pulse.

The blocker doors can function axially, with respect to the turbine's main axle, so that the partition ports are located at the ends of hollow main axle and the blocker doors are positioned to open and close off the partition ports, as shown in the drawings. Alternatively, the partition ports can be positioned radially along the turbine's hollow main axle and the blocker doors positioned radially to open and close off the partition ports. Any combination of radial and axial partition ports and corresponding blocker doors can be used. As previously stated, a "partition port" allows flow between the lower and upper plenum.

As shown by the drawings, the inlet of any agitator can be right- or left-handed by disassembling the upper and lower housing, flipping the lower housing, and reassembling the housings. The housings can be designed with threaded inlets on both sides and the inlet fitting can be threaded into either side wherein the other side would be plugged. Housings can be manufactured with multiple inlets to allow several fluids to be pumped simultaneously into the wave-maker/mixer. This allows for better mixing of two fluids.

For outlets in the top or bottom (pulser, rotary pulser, omni pulser and so on) the exit port can be rotated with respect to the inlet by removing screws, rotating inlet, and reinserting screws. For models that are snapped together the inlet can be rotated at will. Pulser models with blank exit ports can be fabricated to allow a user to customize the exits to meet his or her needs.

All wave-makers/mixers allow use submerged in fluid, requiring no seals between housings, or tops and bottoms or partition walls and the rotor. But if housings or turbines are not submerged, O-ring seals, gaskets or any conventional sealing method can be used to seal the plenum or plenums. If seals are used on the wave-making/mixing shaft, the turbine or motor should supply enough torque to overcome the friction between the rotor and the seal.

Extensions (eg., one such extension or riser is indicated as 293 in FIG. 29a) can be added to the rotator or the rotating pulser wave-making/mixing rotor to allow the rotating exit port to operate away from the turbine/pulsing housing. While this has its advantages for wave-making/mixing there are practical limits to how high the extension can get. The extension reduces flow to the rotating exit port (friction), increases wear on the bearing and requires more torque from the turbine or motor.

Inlets can be threaded, or allow a "slip fit" for hoses and clamps, or grooved for a coupling, and so on, as required for application.

The rotary pulser can sweep in any direction with respect to the inlet by tightening the exit fitting on the wave-making/mixing rotor.

All models work in any position.

All models scale up or down in size with adjustments for friction, pump pressure, pump volume, and so on. The large diameter housings can accept more exit ports. With a large diameter feed pipe, the user must decide to use one large model or break up the feed into several smaller feeds and use several smaller units.

The various models can be supported in many ways, including as follows:—suspended from the pump outlet, pipe or manifold; suspended from tank sides, bottom, bulkhead or top using suction cups or angle brackets with suction cups; screwed, clipped, snapped, bolted, bonded (etc.) to tank sides, bottom, bulkhead or top; manufactured integral to tank; given supports to straddle side of tank; and so on.

It is presently preferred that the units are specially designed to be used on low pressure/high volume magnetic drive pumps. These pumps dominate the chemical processing and aquarium fields. The unique design uses energy stored in the fluid to turn the turbine, thereby creating the pulsing or rotating effect, but it returns most of the energy back into the fluid stream as it exits the wave-maker/mixer thru centrifugal force. This action ensures the fluid stream will still have enough energy to have an effect in the tank.

The wave-makers/mixers in accordance with the invention can be designed to handle suspended solids of various sizes. The turbine or motor must generate more torque and the port and discharge sizes must be increased to allow for the solid to pass.

Gear trains are generally includable in the wave-makers and mixers rotator, pulser, rotating pulser, two port pulser, omni pulsers, oscillator, any multiple port pulsing, rotating or oscillating wave-maker or mixer and any two sided combination of the above, any multiple discharge, multiple inlet or manifolded grouping of the above, and/or any modular housing or assembly into which any of the above devices can be grouped.

Gear trains allow for more control over wave-making/mixing rotor or oscillating rotor speed. Gears trains allow for greater torque for the rotating/oscillating rotor while minimizing the turbine or motor size. Motors can be optimized for power consumption, noise and so on, or turbines can be optimized for a particular pump and the desired rotating/oscillating rotor speed can be obtained through the use of gears. (On single pump systems, gears enable high discharge volume and pressure while keeping rotor speed slow.) Gear reductions can vary depending on turbine or motor speed versus desired wave-making/mixing rotor speed.

Oscillating rotors can be used for pulsing by alternately blocking and opening exit ports with blocker doors.

Multiple gear drives can be used off of the same turbine to drive different wave-making/mixing rotors at different speeds, or drive oscillating and rotating rotors from the same turbine.

The degree of rotation for oscillating rotors can vary by changing the distance from the drag link pivot to the center of the oscillating rotor or the distance from the center of the driven gear to the other end of the drag link.

Generally, the amplitude and frequency for the wave-makers/mixers listed are affected by the following factors:—flow rate and pressure at discharge; discharge shape and area; viscosity of fluid or slurry; speed of wave-making/mixing rotor; shape and size of tank, bulkheads or fixtures; and location and attitude of wave-maker/mixer in tank.

Motor- or turbine-driven pumps or mixing impellers where the pump head (impeller and housing) or mixing impeller are submersed in tank and motor or turbine are hidden under, on side of or on top of tank and connected to the pump head or mixing impeller through shafts, gears, and so on. Pump head, shaft bearings, housings and motor mounts/vibration isolators can be built integral to the tank or manufactured to add on to any tank. Multiple pump heads or mixing impellers can be run off of the same Shaft.

Motor controllers can be added to control the speed of the mixing impeller or the pump impeller. By controlling the speed of the pump impeller, the operator can vary the output pressure and volume of the pump with respect to time. This creates a pulsing effect in the tank.

Impeller-type pumps can be axial, radial or mixed flow. Piston pumps, diaphragm pumps, gear pumps, peristaltic pumps (n.b., peristaltic pumps naturally create a pulsing action), progressive cavity, rotary vane, rotary lobe, flexible liner, flexible impeller or any type of similar pump head can be used. Pumps can also contain multiple stages if required.

Wave-makers and mixers built integral to pump head (impeller and housing) and driven directly or through gears off of the impeller shaft, or driven by pressure from the pump. The pump can be submersible.

Mixing impeller(s), pump head(s), submersible pump(s), or any of the above wave-makers/mixers fed from a separate pump or manufactured integral to a pump or pump head can be fixed to tracks which allow motion along a single or multiple axes. Rectangular or square tanks could use x, y, z coordinate axis or circular tanks a r,Φ,z axis, but any coordinate axis system could be used. (Systems could use as few as one axis or as many as practically possible.)

The coordinate axes can be driven off of the pump impeller shaft, mixing impeller shaft, wave-maker/mixer rotor or wave-maker/mixer turbine shaft or they can be separately driven by one or more motors (servo or stepper motors), turbines or hydraulic cylinders (one motor, turbine or hydraulic cylinder can be used for each axis). Gears, shafts, flexible shafts, timing belts or chains and sprockets, "Geneva" mechanisms, belts or cables and pulleys, ratchets, eccentrics, cams and followers, crank arms, drag links or any common motion transfer or speed reduction components can be used to effect the design. Guides for each axis can be rack and pinion, V- or square- grooved slides, rods with bearing followers, or any commercially available or custom designed linear or circular motion guide system, and so on. The guides can be submersed in liquid or installed out of tank. Guides can be an add-on device or manufactured integral to the tank.

In addition, a motion controller can be added to the drive system for the coordinate axes to vary the speed and position with respect to time of the mixing impeller(s), pump head(s), submersible pump(s), or any of the above wave-makers/ mixers fed from a separate pump or manufactured integral to a pump or pump head. Having all components connected to a controller allows a user to pre-program a wave-making/ mixing profile which controls wave-making/mixing rotor speed, discharge pump flow rate and pressure, mixing impeller speed and position and velocity of all wave-making/ mixing or pumping components in the tank with respect to time.

Any of the above devices, used individually or in combination, situated inside a filter, filter canister or filter box to keep the filtered particles suspended in the fluid and/or away from the meshed filter media pores.

In regards to construction and materials, the wave-makers/mixers and pumps can be manufactured from a wide variety of plastics, metals and ceramics. Factors in selection of materials are:—reactivity of materials with chemicals, affect of materials on living organisms (toxicity), corrosion resistance and friction and so on. Covers and parts shown as assembled with screws can be snapped, welded, press-fit, screwed, bonded or held together using other common assembly techniques.

Motors can be of any numerous types, including AC (single or 3 phase), DC, permanent magnet, servo, stepper and so on, depending on the application, power and efficiency requirements, torque, speed, control requirements, and so on. Motors can have built-in or added-on gear drive units.

As shown in the drawings, gears, planetary gear sets, shafts, flexible shafts, timing belts or chains and sprockets, "Geneva" mechanisms, belts or cables and pulleys, ratchets, eccentrics, cams and followers, crank arms, drag links or any common motion transfer or speed reduction unit and so on, can be used to transfer motion or to create the desired movement. Gear shafts are shown as screws for ease of assembly and replacement, but shafts can be molded integral to the shelf (plastic or casting) or attached using standard machine assembly techniques. The spirals of the screw threads helps lubricate the gears. If solid shafts are used, grooves or splines can be molded in the gears to help the operating fluid lubricate the gears. Gears that are shown as screwed to rotors or turbine can be molded integral to the rotor or turbine (screws are used to facilitate gear replacement).

Radial and thrust bearings are shown as molded integral to the housings shelves and end caps. The bearings can be manufactured from a different materials and inserted in housings, shelves and end caps using standard machine assembly techniques. Thrust washers can be added to decrease friction and wear on the rotors, turbines and housings.

Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 3a is an exploded perspective view of a rotating pulser in accordance with the invention;

FIG. 3b is a sectional view of the assembly thereof, as taken through a vertical plane of symmetry;

FIG. 7a is an exploded perspective view of an alternate embodiment of an omni pulser in accordance with the invention;

FIG. 7b is a sectional view of the assembly thereof, as taken through a vertical plane of symmetry;

FIG. 8a is an exploded perspective view of an alternate embodiment of a rotating pulser in accordance with the invention;

FIG. 8b is a sectional view of the assembly thereof, as taken through a vertical plane of symmetry;

FIG. 10a is an exploded perspective view of an alternate embodiment of a rotator in accordance with the invention;

FIG. 10b is a sectional view of the assembly thereof, as taken through a vertical plane of symmetry;

FIG. 11a is an exploded perspective view of an oscillator in accordance with the invention;

FIG. 11b is a sectional view of the assembly thereof, as taken through a vertical plane of symmetry;

FIG. 12a is an exploded perspective view of a gear driven rotator in accordance with the invention;

FIG. 12b is a sectional view of the assembly thereof, as taken through a vertical plane of symmetry;

FIG. 16a is an exploded perspective view of a two-port pulser with oscillating blocker doors in accordance with the invention;

FIG. 16b is a sectional view of the assembly thereof, as taken through a vertical plane of symmetry;

FIG. 16c is a sectional view taken through line 16c—16c in FIG. 16a;

FIG. 17a is an exploded perspective view of a gear driven omni pulser in accordance with the invention;

FIG. 17b is a sectional view of the assembly thereof, as taken through a vertical plane of symmetry;

FIG. 20a is an exploded perspective view of a gear driven four-oscillator arrangement in accordance with the invention;

FIG. 20b is a sectional view of the assembly thereof, as taken through a vertical plane of symmetry;

FIG. 20c is a sectional view taken through line 20c—20c in FIG. 20b;

FIG. 20d is a sectional view taken through line 20d—20d in FIG. 20b;

FIG. 22a is an exploded perspective view of a gear driven arrangement of two pulsers and one rotator in accordance with the invention;

FIG. 22b is a sectional view of the assembly thereof, as taken through a vertical plane of symmetry;

FIG. 22c is a sectional view taken through line 22c—22c in FIG. 22b;

FIG. 22d is a sectional view taken through line 22d—22d in FIG. 22b;

FIG. 23a is an exploded perspective view of a modular manifold in accordance with the invention, having two rotators, one oscillator, one pulser, and one rotator-pulser;

FIG. 23b is a sectional view taken through line 23b—23b in FIG. 23a;

FIG. 25b is a sectional view of the assembly thereof, as taken through line 25b—25b in FIG. 25a;

FIG. 30a is an exploded perspective view of a pulser and ring blocker-door arrangement in accordance with the invention;

FIG. 30b is a perspective view of the opposite side of the ring blocker-door of FIG. 30a;

FIG. 32a is an exploded perspective view of a multi-port pulser with an axially moving external ring used as a radial blocker-door in accordance with the invention;

FIG. 32b is a sectional view of the assembly thereof, as taken through a vertical plane of symmetry;

FIG. 32c is a perspective view of the opposite side of the upper housing FIG. 32a in which is formed the pulser's multiple ports;

FIG. 37a is an exploded perspective view of an agitator in accordance with the invention, using the oscillating output from a rotating radial-acting cam and its followers to manipulate four different exit ports;

FIG. 37b is a sectional view of the assembly thereof, as taken through a vertical plane of symmetry;

FIG. 37c is a sectional view taken through line 37c—37c in FIG. 37b;

FIG. 38a is an exploded perspective view of an agitator in accordance with the invention, using the oscillating output from a rotating axial-acting cam and its followers to manipulate three different exit ports;

FIG. 38b is a perspective view of the assembly thereof;

DETAILED DESCRIPTION OF THE PREFERRED EMBODIMENTS

1. Preliminary Statement

A major operative use environment for the various embodiments of agitators in accordance with the invention is the saltwater aquarium. Raising plankton-feeding corals in such an aquarium requires a vigorous stirring of the water in order to sufficiently circulate the plankton past the coral so that the coral may filter feed thereon (other uses are disclosed further below as well). To do this the various embodiments in accordance with the invention have a fluid discharge port (or ports), the stream issuing from which is conditioned to induce agitation in a multi-form variety of ways.

Briefly, the embodiments disclosed herein can be arranged in accordance with the following classification scheme, as shown in the following the table and described after that.

Table. Classification of the Embodiments by Series of Views

Figures 1A, 1B:
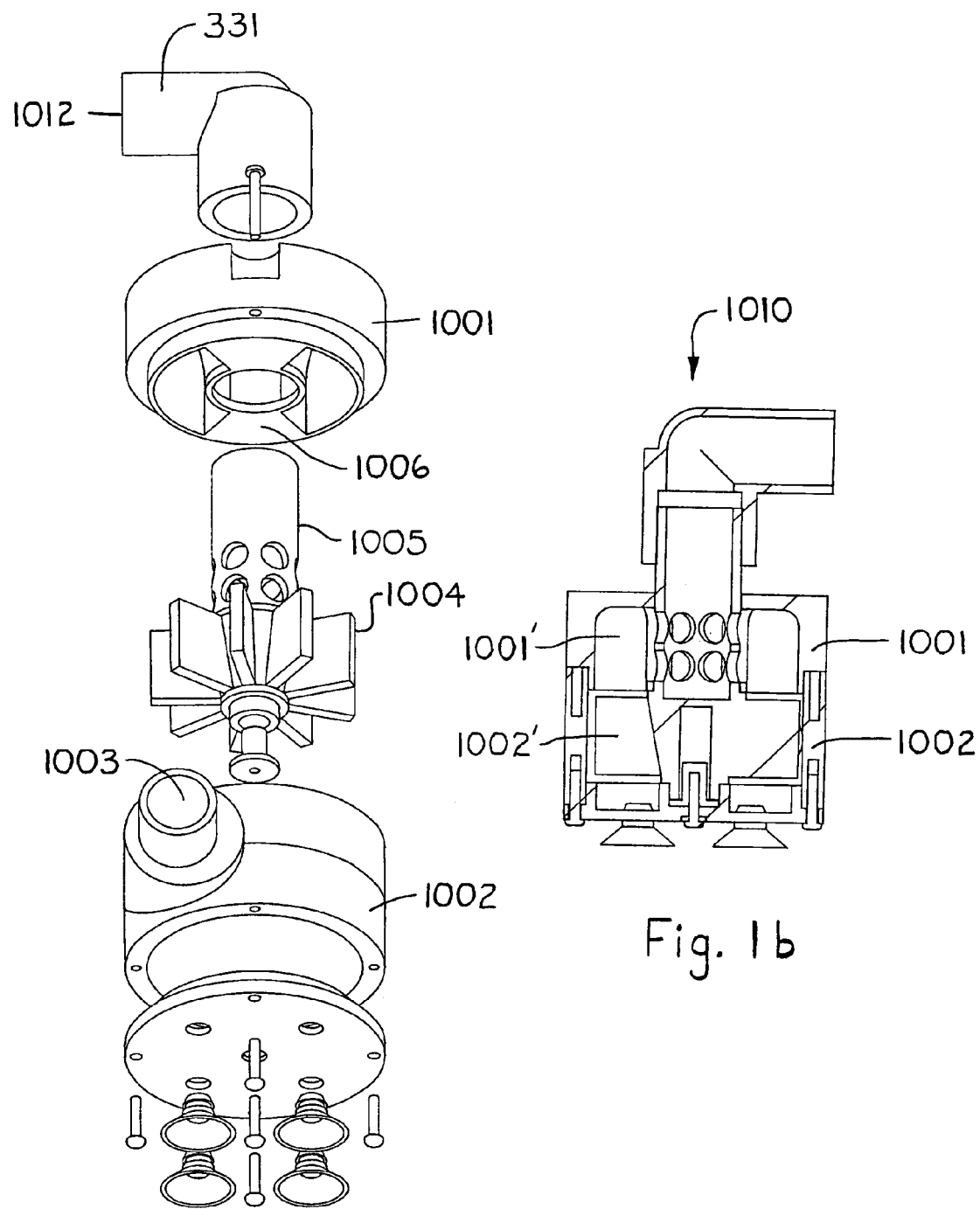
FIG. 1a is an exploded perspective view of a rotator in accordance with the invention.
FIG. 1b is a sectional view of the assembly thereof, as taken through a vertical plane of symmetry.
Figures 2A, 2B:
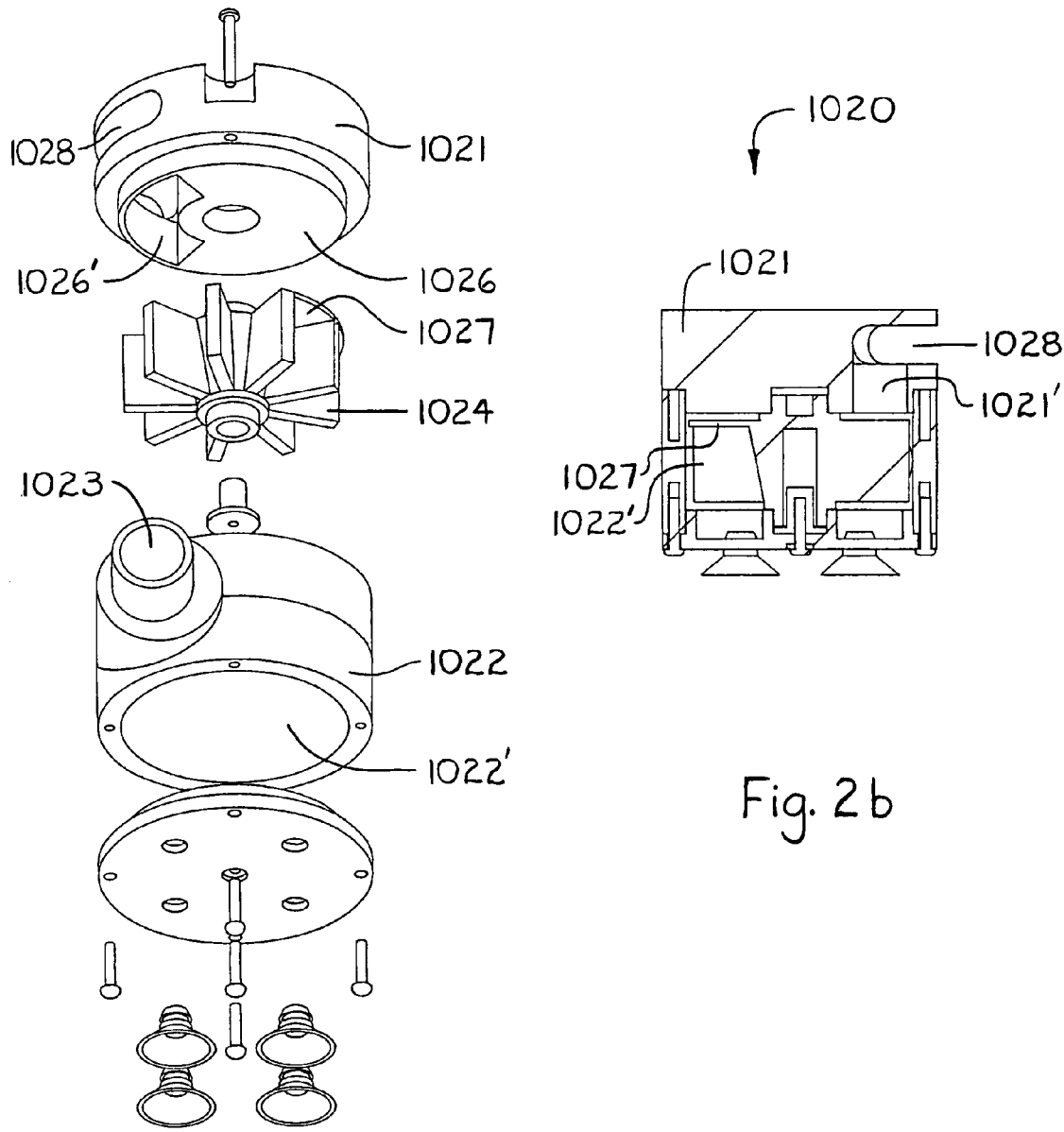
FIG. 2a is an exploded perspective view of a pulser in accordance with the invention.
FIG. 2b is a sectional view of the assembly thereof, as taken through a vertical plane of symmetry.
Figure 24:
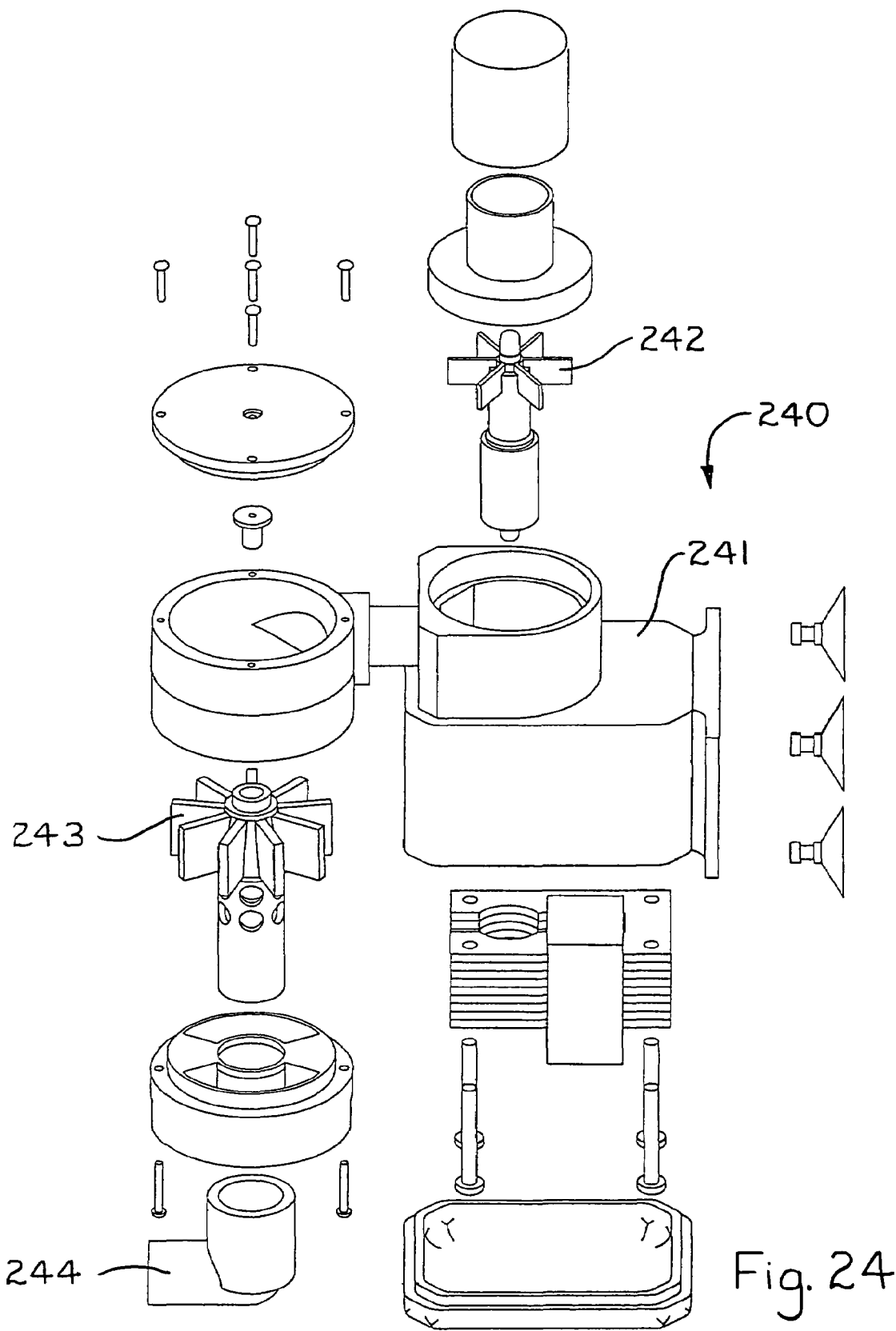
FIG. 24 is an exploded perspective view of a submersible magnetic-drive pump with a built-in turbine-driven rotator in accordance with the invention.
Figure 25B:
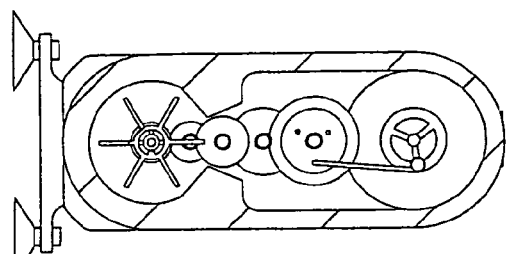

FIGS. 1 thru 10 Series:—the basic passive devices;
  eg., FIG. 1a—the basic rotator,
  eg., FIG. 2a—the basic pulser, and,
  FIGS. 3a thru 10b—combinations/embellishments thereon,
FIG. 11a (a transition):—ie., the basic oscillator,
FIGS. 11 thru 23 Series:—including speed-reduction trains;
  eg., FIG. 11a—the basic oscillator (ie., gear-driven),
  eg., FIG. 12a—the basic geared-down rotator,
  and so on, comprising FIGS. 13a thru 23b.
FIGS. 24 thru 26 Series:—passive devices coupled to active devices.
FIGS. 27 and 28 Series:—passive devices incorporating reactor turbines.

FIGS. 29 thru 39 Series:—controls and control devices for the discharge port(s).

FIGS. 40 thru 45 (ie., the end) Series:—track-mounted traversing heads.

More particularly, FIGS. 1a/1b show a basic device having a rotating discharge port. FIGS. 2a/2b show a basic device having a stationary discharge port providing a pulsing discharge having cycles of alternating flow and quiescent phases (eg., ON and OFF phases). Each of these devices is passive. That is, these devices accept a presumptively steady, high flowrate and low head infeed stream. The infeed stream spins an internal rotor which in turn provides the motive power to condition the ultimate agitation-inducing discharge. It is this the ultimate agitation-inducing discharge which varies in accordance with each embodiment. Hence, the FIGS. 1 through 10 series of views comprises the basic series of devices, including embellishments on or multiform combinations of the FIG. 1 "rotator" and the FIG. 2 "pulser." (Eg., rotator-pulser, or pulser-pulser and so on).

FIGS. 11a/11b represent a transition. FIGS. 11a/11b show a passive device having a mobile discharge port like shown in FIGS. 1a/1b, except that an epicyclic gear and linkage system drives such a discharge port to "oscillate" between angular extremes of about 120° apart. Indeed this device is denominated such:—ie., "oscillator."

The next series of views comprising the FIGS. 12 through 23 series show much of the same devices shown by the FIGS. 1 through 10 series and FIG. 11a except including speed-reduction drive trains to slow down the discharge cycle rate from the rotator spinning rate.

The succeeding series of views comprise the FIGS. 24 through 26 series, and these show active devices, having magnetically-coupled drive systems receiving motive power from motors outside the tank.

The following series of views comprise the FIGS. 27 and 28 series, which show passive devices incorporating reactor turbines rather than the rotors of the previous views.

After that, the FIGS. 29 through 39 series show a series of port controls which allow complimentary shaping of the discharge stream. FIGS. 40 through 45 (eg., through the end) series show various applications involving track-mounted traversing heads.

2. Detailed Description

FIGS. 1a and 1b show a rotator 1010 in accordance with the invention. The rotator 1010 includes upper and lower housings 1001 and 1002 which respectively define upper and lower plenums 1001' and 1002'. The lower housing encloses the turbine 1004, which is driven at constant speed by the steady infeed flow entering through the inlet 1003. The turbine 1004 has appended to it a hollow apertured shaft 1005 which extends through the partition wall 1006 between the upper and lower plenums, to couple to a 90°-nozzle forming the discharge port 1012 for this rotator 1010. The 90° discharge port 1012 protrudes out above a top wall of the upper housing 1001. The flowthrough of the infeed stream in the inlet 1003 causes the turbine 1004 to spin. The spinning turbine 1004 spins the directly coupled 900 discharge port 1012 through complete rotations. The infeed stream flows up out of the vanes of the turbine 1004, into the upper plenum 1001', into the lumen of the hollow shaft 1005 by the apertures therein, and then exits the rotator 1010 by the 90° discharge port 1012. The spinning of the 90° discharge port 1012 thus sprays the discharge stream in one circular sweep for each turn of the turbine 1004. The nozzle 331 can be given various shapes, including without limitation what is shown by FIGS. 33a through 33f. The fan-shaped nozzles 332–335 give a flat rooster-tail type discharge. The fan-shaped nozzles 332–335 can include single or dual port versions, which ports can be bent off the main axis at about any angle (e.g., only 90° shown), and twisted clockwise or counterclockwise relative thereto, to induced currents in the tank as desired. FIG. 33e shows a bubble-introducing accessory 336. FIG. 33f shows a nozzle 337 having a circular exit orifice which is adjustable between constricted and dilated extremes to perhaps dial up the back pressure in the upper plenum 1001. Aside from the circular sweeping of the discharge port 1012, the discharge stream issuing from this embodiment of a rotator 1010 discharge port 1012 is relatively steady (ie., relatively absent of pulsing).

FIGS. 2a and 2b show a pulser 1020 in accordance with the invention. Unlike the rotator 1010, the pulser 1020 has a stationary discharge port. Nevertheless the pulser 1020 converts a steady infeed flow into a pulsating discharge (ie., a discharge having alternate phases of flow and quiescence, or ON and OFF). The pulser 1020 has a two-piece outer case featuring a lower housing 1022 defining a lower plenum 1022' and an upper housing 1021 defining an upper plenum 1021'. The upper and lower plenums 1021 and 1022 are partitioned apart by a partition wall 1026, which in the drawing is the bottom wall of the upper housing 1021. The lower housing 1022 encloses a turbine 1024 within the cavity of the lower plenum 1022'. The turbine 1024 is driven at generally a constant speed by the infeed flow entering through an inlet 1023. The infeed flow moves through the vanes of the turbine 1024 and exits the lower plenum 1022' into the upper plenum 1021' via an opening 1026' in the partition 1026. This opening 1026' is given the form of a 100° arc-segment of an annulus. The turbine 1025 has nine vanes having (naturally enough) top edges, and the top edges of four of those vanes are spanned by webs 1027 which are used as blocker doors 1027 (only one blocker door is clearly in view, e.g., on the right in the view of FIG. 2a). The rotation of the webs or blocker doors 1027 past the 1000 arc-wide opening 1026' causes discontinuity in the supply of flow between the lower and upper plenums 1022' and 1021', and hence creates a "pulsing" effect in the discharge flow that exits out the upper plenum 1021 through the discharge port 1028 (or slit) in the side of the upper housing 1021. The discharge port 1028 is a 1000 arc-wide slit in the cylindrical sidewall of the upper housing 1021. The discharge flow which exits the discharge port 1028 fans out in rooster-tail fashion, in repetitive cycles of discrete phases of flow or ON, as delimited by intervening quiescent or OFF phases. In this arrangement, one cycle corresponds with one rotation of the turbine 1024.

FIGS. 3a and 3b show essentially the foregoing rotator 1010 of FIGS. 1a/1b combined with or stacked on the pulser 1020 of FIGS. 2a/2b. More accurately, this device in accordance with the invention as shown by FIGS. 3a/3b is denominated a rotating pulser-pulser 1030. It combines together the basic operative components of both the rotator 1010 (but which pulses too) and the pulser 1020. More particularly, the rotator-pulser 1030 includes upper and lower housings 1031 and 1032 defining a partitioned upper plenum 1031' and 1031", and a lower plenum 1032'. The lower housing 1032 encloses the turbine 1034, which is driven at constant speed by the steady infeed flow entering through the inlet 1033. The turbine 1034 has appended to it a hollow shaft 1035 which extends through the partition wall 1036 between the upper and lower plenums, to couple to a 90°-nozzle forming a rotating discharge port 1039. The turbine 1034 is driven at generally constant speed by the infeed through the inlet 1033. The infeed flow moves through the vanes of the turbine 1034 and exits the lower plenum 1032' into one of the two upper plenums 1031' or 1031" via one or two openings 1036' and 1036" in the partition 1036. The one opening 1036" communicates with the upper plenum 1031" and thence the stationary or pulsing discharge port 1038, which again is a 100° arc-wide slit in the cylindrical sidewall of the upper housing 1031. The other opening 1036' communicates with the lumen of hollow shaft 1035 vis-a-vis the other plenum 1031' and a window 1035' in the hollow shaft 1035. The turbine 1035's blocker doors 1037 alternate the feed of discharge water between the two upper plenums 1031' and 1031" such that one is in a flow or ON phase as the other is in a quiescence or OFF phase. As shown in FIG. 3*b*, the upper plenum 1036" communicating with the pulser port 1038 is in flow or ON. The other plenum 1031' in communication with window 1035' of the hollow shaft is blocked by the blocker doors 1037 and hence is quiescent or OFF. That way, the discharge from the rotating port 1039 likewise pulses in addition to sweeps in circles. The ON-OFF phases for the rotating port 1039 are exactly opposite to or 180° out of phase with the cycle of the pulser port 1039. In this arrangement, one cycle for either port 1038 or 1039 corresponds with one rotation of the turbine 1034.

Figures 4A, 4B:
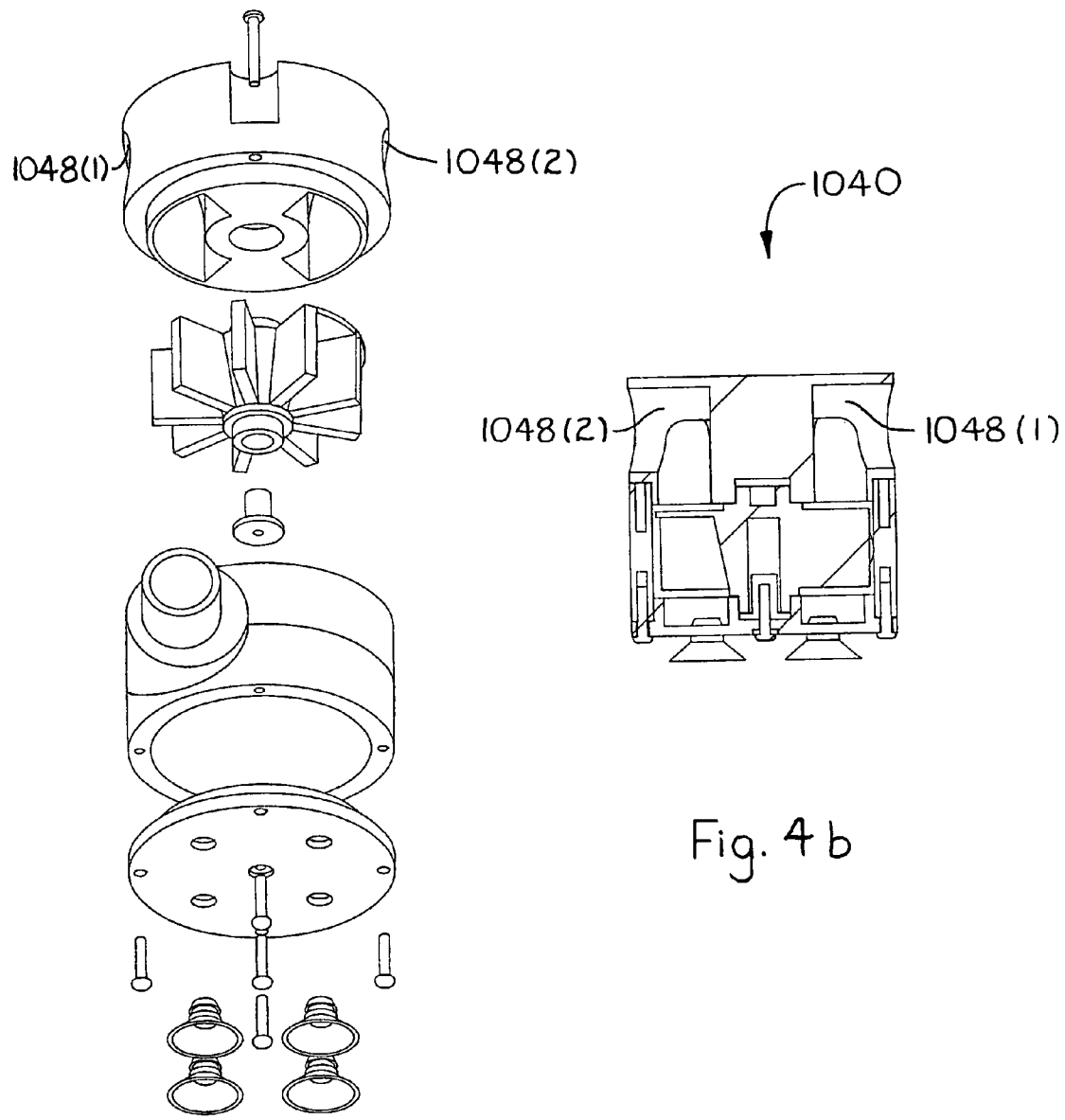
FIG. 4a is an exploded perspective view of a two-port pulser in accordance with the invention.
FIG. 4b is a sectional view of the assembly thereof, as taken through a vertical plane of symmetry.

In many ways what is shown in the succeeding series of views from FIG. 4*a* up through FIG. 10*b*, are merely permutations of what has been disclosed to date in connection with FIGS. 1*a* through 3*b*. Hence FIGS. 4*a* through 10*a* will be given relatively brief treatment.

FIG. 4*a* shows a two-port pulser 1040 in accordance with the invention. It creates a pressure wave by pulsing infeed water through two opposing stationary discharge ports 1048(1) and 1048(2). These dual diametrically opposite ports 1048(1) and 1048(2) pulse discharge streams in 180° out-of-phase timing with respect to each other.

Figures 5A, 5B:
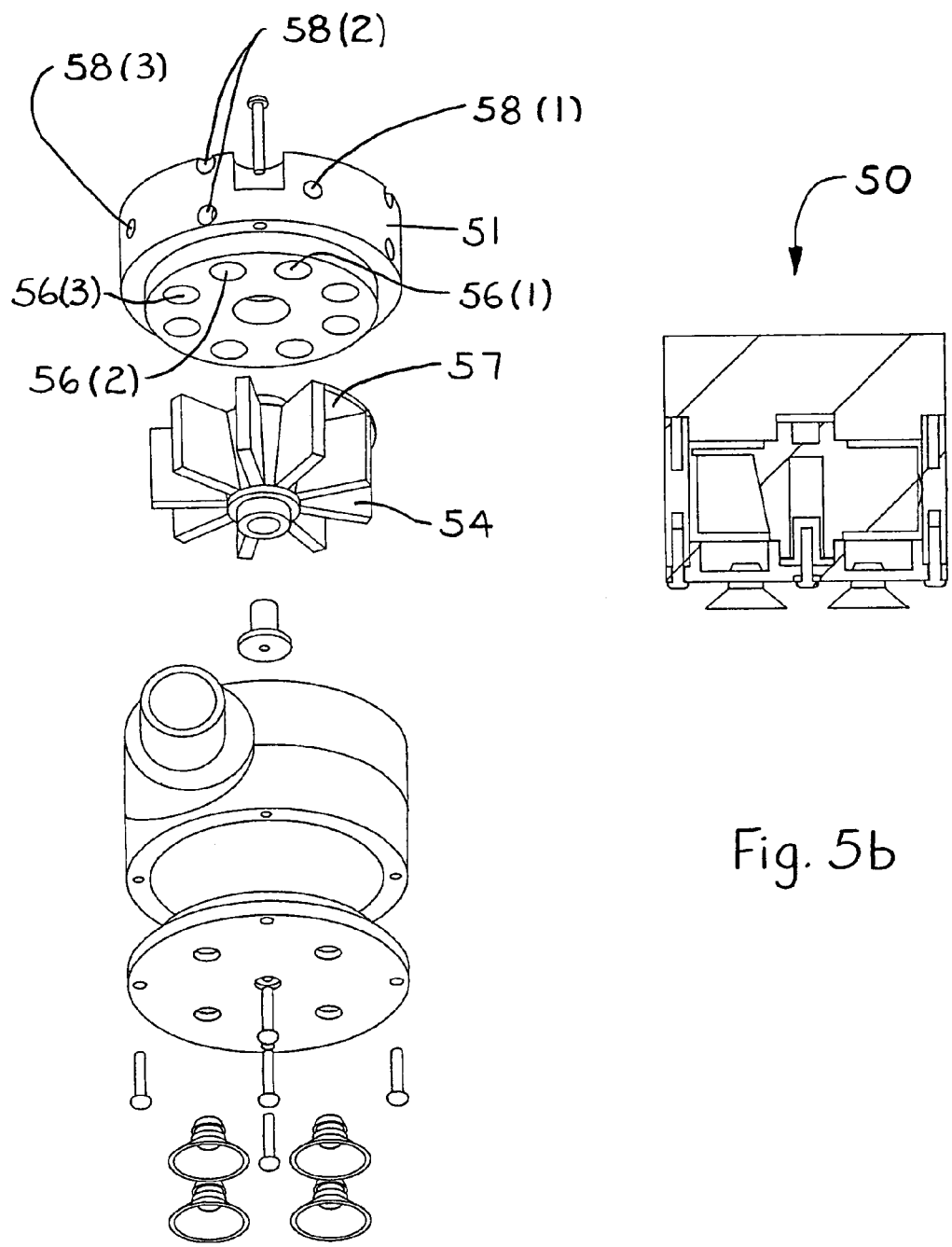
FIG. 5a is an exploded perspective view of an omni pulser in accordance with the invention.
FIG. 5b is a sectional view of the assembly thereof, as taken through a vertical plane of symmetry.

FIG. 5*a* shows an omni pulser 50 in accordance with the invention. It has a multi-ported upper housing or header 51 having multiple ports 58(1), 58(2), 58(3) &c., communicating with header apertures 56(1), 56(2), 56(3) and so on, respectively. As the turbine 54 spins its blocker door(s) 57 progressively cover and uncover the header apertures 56(1), 56(2), 56(3) and so on, causing a pulsing flow discharge through the ports 58(1), 58(2), 58(3) &c. The ports 58(1) et seq. are aimed omni-directionally, as that term is used in this description. The pulsing discharge issuing through the ports 58(1) et seq. pulse stream in sequencing ebb and flow cycle timed on a 360° cycle of the spinning of the turbine 54.

Figures 6A, 6B:
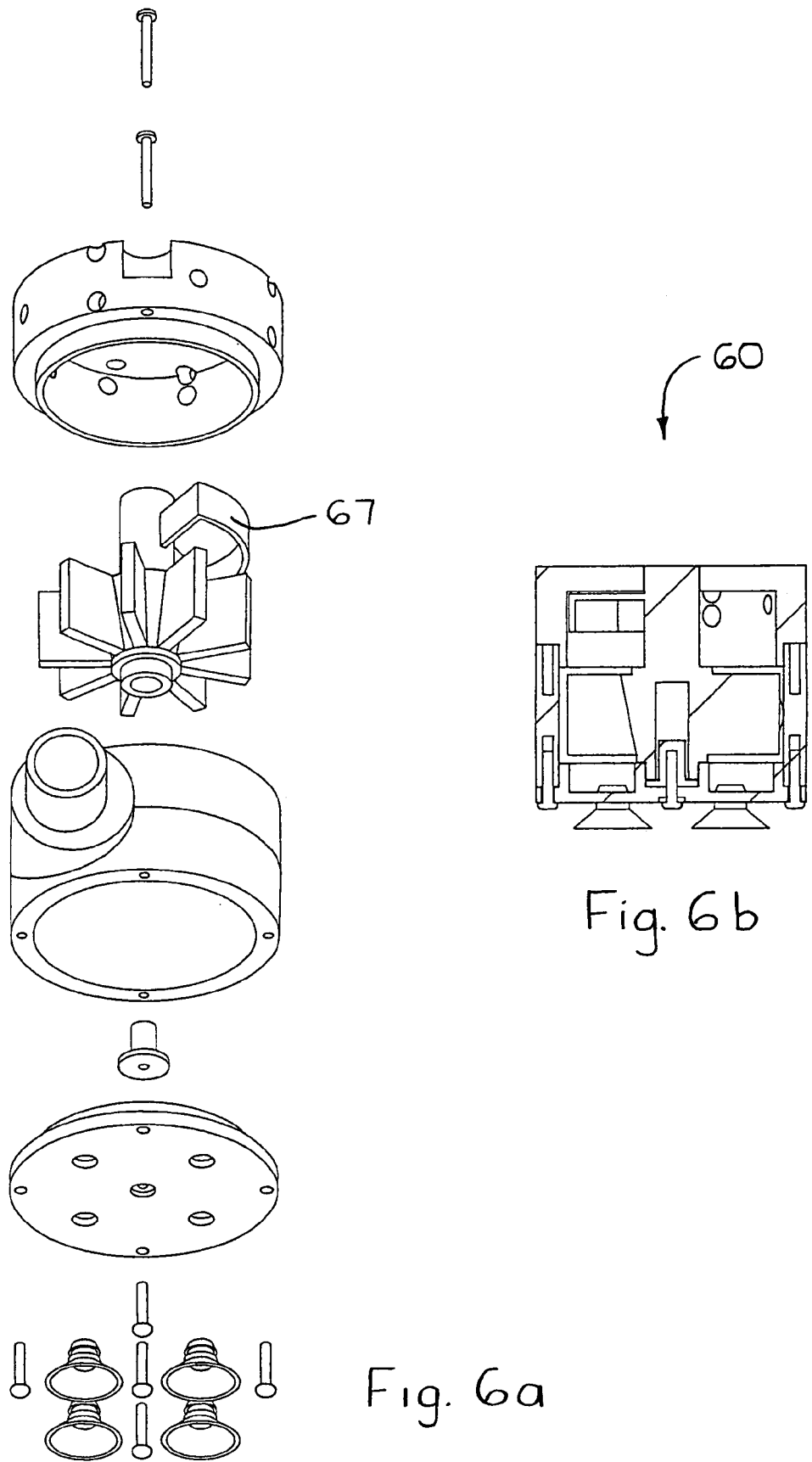
FIG. 6a is an exploded perspective view of an omni pulser arrangement in accordance with the invention, having both radial and axial blocking doors.
FIG. 6b is a sectional view of the assembly thereof, as taken through a vertical plane of symmetry.

FIG. 6*a* shows an omni pulser 60 arrangement in accordance with the invention, having both radial and axial blocking doors 67.

FIG. 7*a* shows an omni pulser embodiment 70 having four stationary and directionalized ports 78(1), 78(2), 78(3) and 78(4), each which issues a pulsing discharge stream on a timing sequence where each is 90° out-of-phase with its neighbors, and timed on a 360° cycle of the spinning of the turbine 74.

FIG. 8*a* shows an alternate embodiment of a rotating pulser-pulser 80 and comparable to that of FIGS. 3*a*/3*b*, except that the rotating pulsing port 89 and the stationary discharge port 88 sandwich the turbine 84 (ie., the term "sandwich" is used often in this description for convenience to designate this configuration of ports, and distinguish this configuration from stacking). The ports 88 and 89 have opposite or 180° out-of-phase timing. Hence the ports 88 and 89 are formatted in a pair of respective outer housings 81(1) and 81(2) which sandwich a sandwiched housing 82. The sandwiched housing contains the turbine 84.

Figures 9A, 9B:
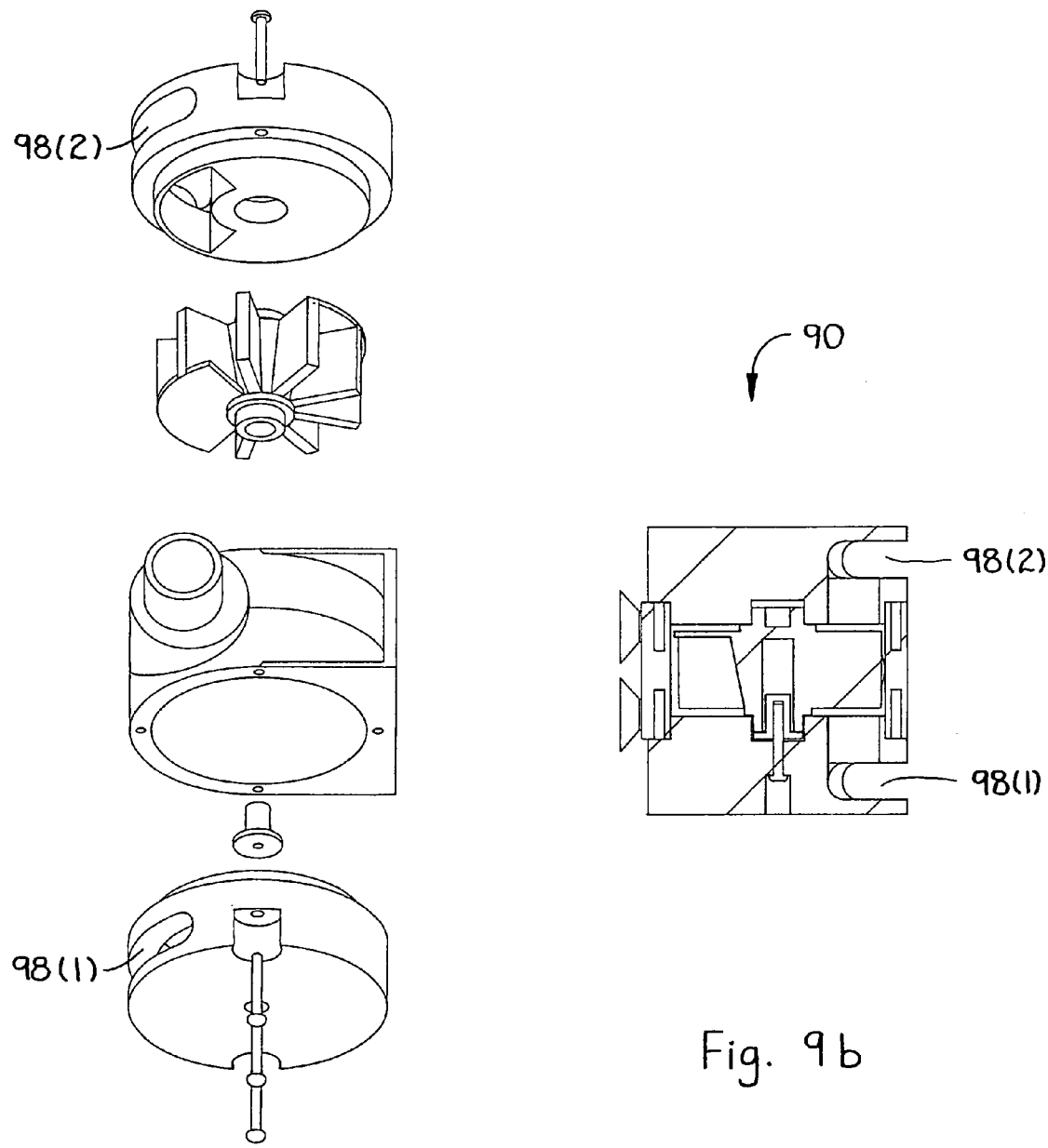
FIG. 9a is an exploded perspective view of a pulser-pulser in accordance with the invention.
FIG. 9b is a sectional view of the assembly thereof, as taken through a vertical plane of symmetry.

FIG. 9*a* shows a pulser-pulser 90 in accordance with the invention. It has dual stationary ports 98(1) and 98(2) arranged in a sandwich configuration, each pulsing discharge streams having opposite ebb and flow (or OFF and ON) timing.

FIG. 10*a* shows a rotator-rotator 100 in accordance with the invention. It has dual rotating discharge ports 109(1) and 109(2) arranged in a sandwich configuration. Each port 109(1) and 109(2) issues a relatively steady discharge stream. The 90° nozzles 331 can be twisted relative each other to sweep pointing in about the same compass direction relative to each other (as shown) or in varying set positions pointing in different compass directions (not shown).

To turn now to FIGS. 11*a*/11*b*, these views show an oscillator 110 in accordance with the invention. The oscillator 110 represents a transition between the embodiment shown by the previous series of views, and the succeeding series right through the end.

The oscillator 110 can be likened to the rotator 1010 shown by FIGS. 1*a*/1*b* except that instead of the discharge port 119 sweeping repetitively in full circles, the discharge port 119 sweeps back and forth between angular extremes about 120° apart. To achieve this the oscillator incorporates a drive train 115 interconnecting the spinning turbine 114 with the oscillating port 119. More particularly, the oscillator 110 has upper and lower housings 111 and 112 respectively defining upper and lower plenums 111' and 112". The lower housing 112 encloses the turbine 114 which is driven at constant speed by the steady infeed flow entering in the inlet 113. The upper plenum 111 houses a gear train 115 which couples the turbine 114 with the oscillating port 119. The gear train 115 concurrently @ reduces the speed ratio of the spin rate of the turbine 114 to a scaled back cycle rate for the oscillation of the discharge port 119, and ●● converts the spinning input of the turbine 114 into an oscillating output for the discharge port 115(1) vis-a-vis a drag link 115(1) connection. Hence, given the arrangement shown, the discharge port 119 sweeps back and forth clockwise and counterclockwise between about a 120° wide arc. The view shows that discharge port 119 includes a 90° nozzle 331 to deflect the discharge stream 90°. Needless to say, this nozzle 331 can be substituted for by the fan-shaped nozzles 332–335 shown by FIGS. 33*a* through 33*d*. The discharge flow is thus re-directed horizontally by the "E11" nozzle. Whereas the "E11" nozzle discharges the outflow at a steady flow rate, the outflow is swept back and forth clockwise and counterclockwise between a 120° wide arc. This oscillator 110 consequently induces currents and/or circulation especially if submerged deep, and/or waves (if not submerged deep) within a given tank.

The next series of views comprising especially FIGS. 11*a* through 23*b* show the incorporation of speed-reducing gear trains within many of the embodiments shown previously, included to allow speed reduction between the spin rate of the turbine and the cycle rate of the pulsing, rotating, pulsing-rotating and/or oscillating output (or what have you). This is briefly discussed as follows.

For example, FIGS. 12*a*/12*b* show gear-reduction version of a rotator 120 in accordance with the invention. This gear-reduction version of the rotator 120 closely resembles the basic rotator 1010 shown by FIGS. 1*a*/1*b* except that an epicyclic train 125 is incorporated to reduce the spin rate of the turbine 124 down to a relatively slower spin rate for the spinning discharge port 129.

Figure 13B:
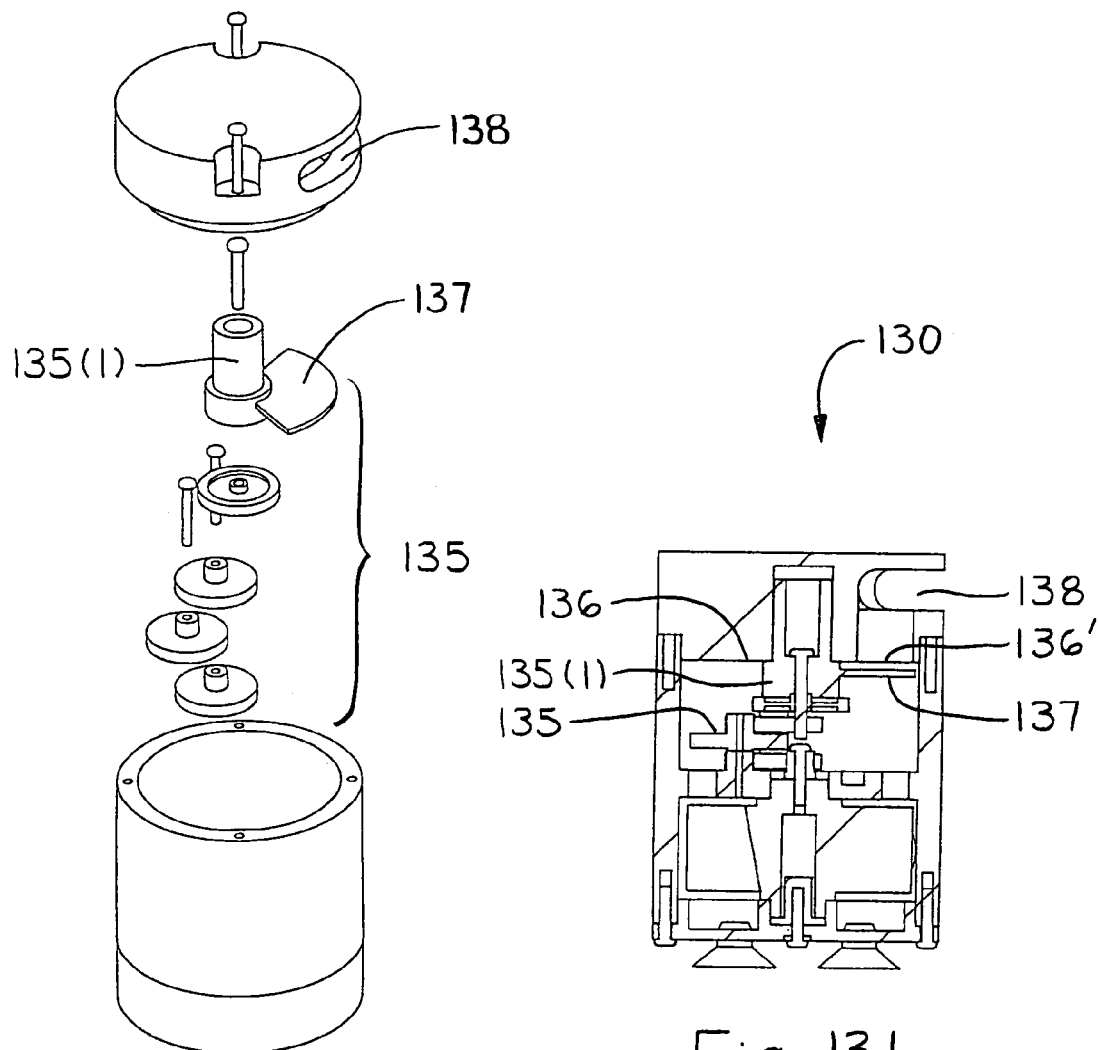
FIG. 13b is a sectional view of the assembly thereof, as taken through a vertical plane of symmetry.
Figure 13A:
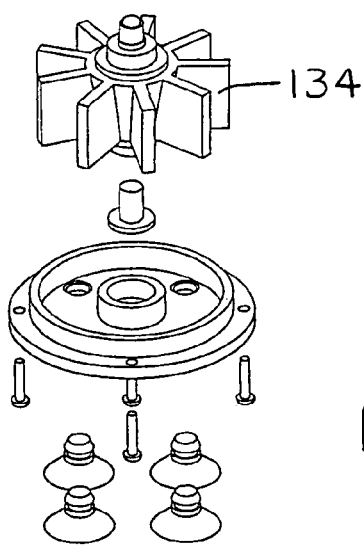
FIG. 13a is an exploded perspective view of a gear driven pulser in accordance with the invention.

Similarly, FIGS. 13*a*/13*b* show a gear-reduction version of a single-port pulser 130 in accordance with the invention. It closely resembles the single-port pulser 1020 of FIGS.

2a/2b, except that an epicyclic train 135 is incorporated to reduce the spin rate of the turbine 124 down to a relatively slower ON-OFF pulse rate for the pulsing discharge port 138. Minor ones aside, other notable differences include that the turbine 134 no longer carries the blocker door(s) 137. Instead, there is a separate rotating axle 135(1) which carries a blocker door 137. The rotation of the blocker door 135(1) is driven off the spinning turbine by the interposed gear train 135, which gear train 135 allows a substantial speed reduction between the spin rate of the turbine 134 and the spin rate of the blocker door 137. Otherwise, the passing of the blocker door 137 across an opening 136' in the partition wall 136 causes the pulsing effect seen at the discharge port 138 through the exit slit.

Figure 14B:
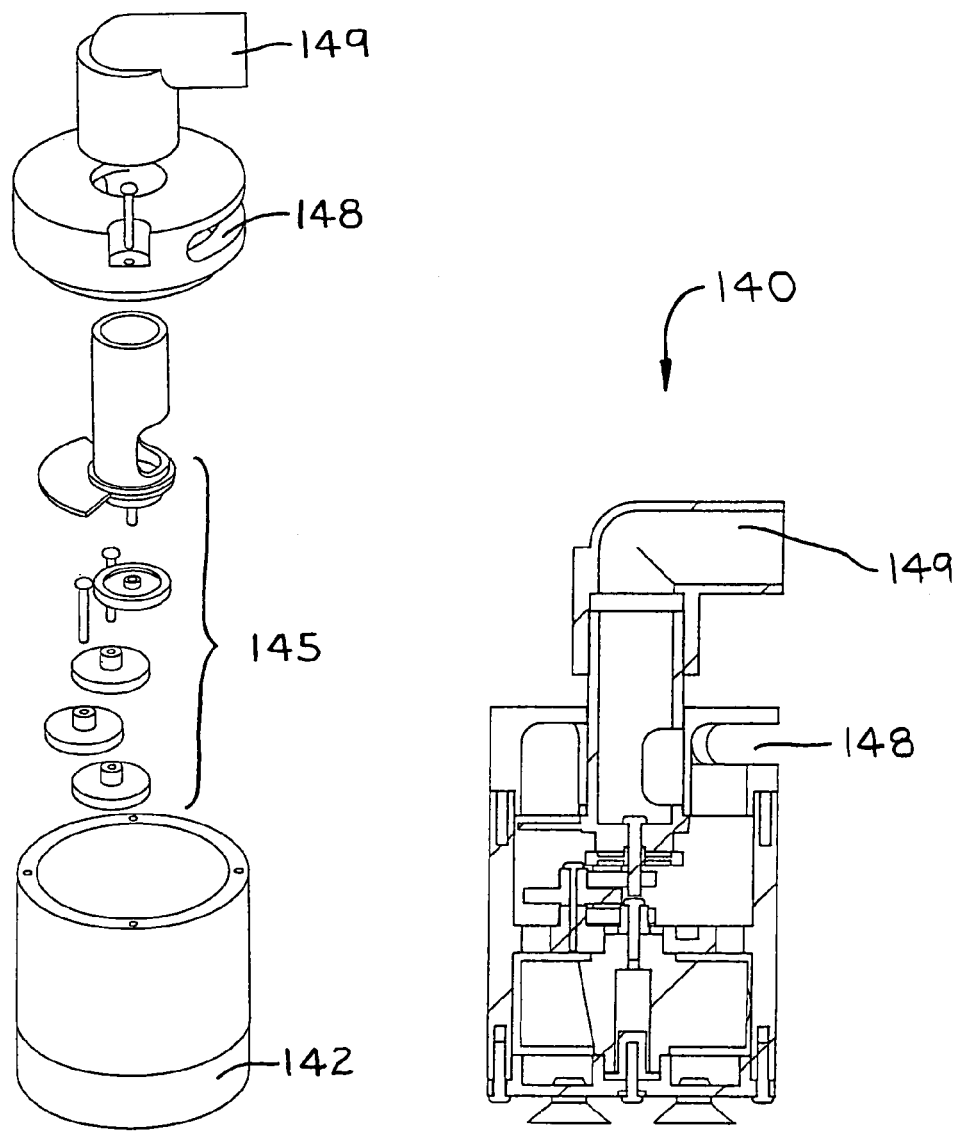
FIG. 14b is a sectional view of the assembly thereof, as taken through a vertical plane of symmetry.
Figure 14A:
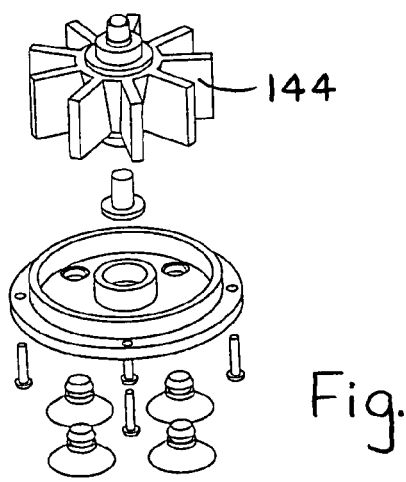
FIG. 14a is an exploded perspective view of a gear driven rotating pulser in accordance with the invention.

FIG. 14a shows a gear-reduced version of a rotating pulser-pulser 140 in accordance with the invention. This is similar to the direct-drive rotating pulser-pulser 1030 shown by FIGS. 3a/3b, except incorporating a gear-reduction drive train 145. This rotating pulser-pulser 140 combines a rotating-pulsing discharge port 149 which issues a pulsing discharge stream, with a stationary pulsing discharge port 148 also issuing a pulsing discharge stream. The ports 148 and 149 are stacked on turbine 144's housing 142 and presumptively having opposite ebb and flow timing.

Figures 15A, 15B:
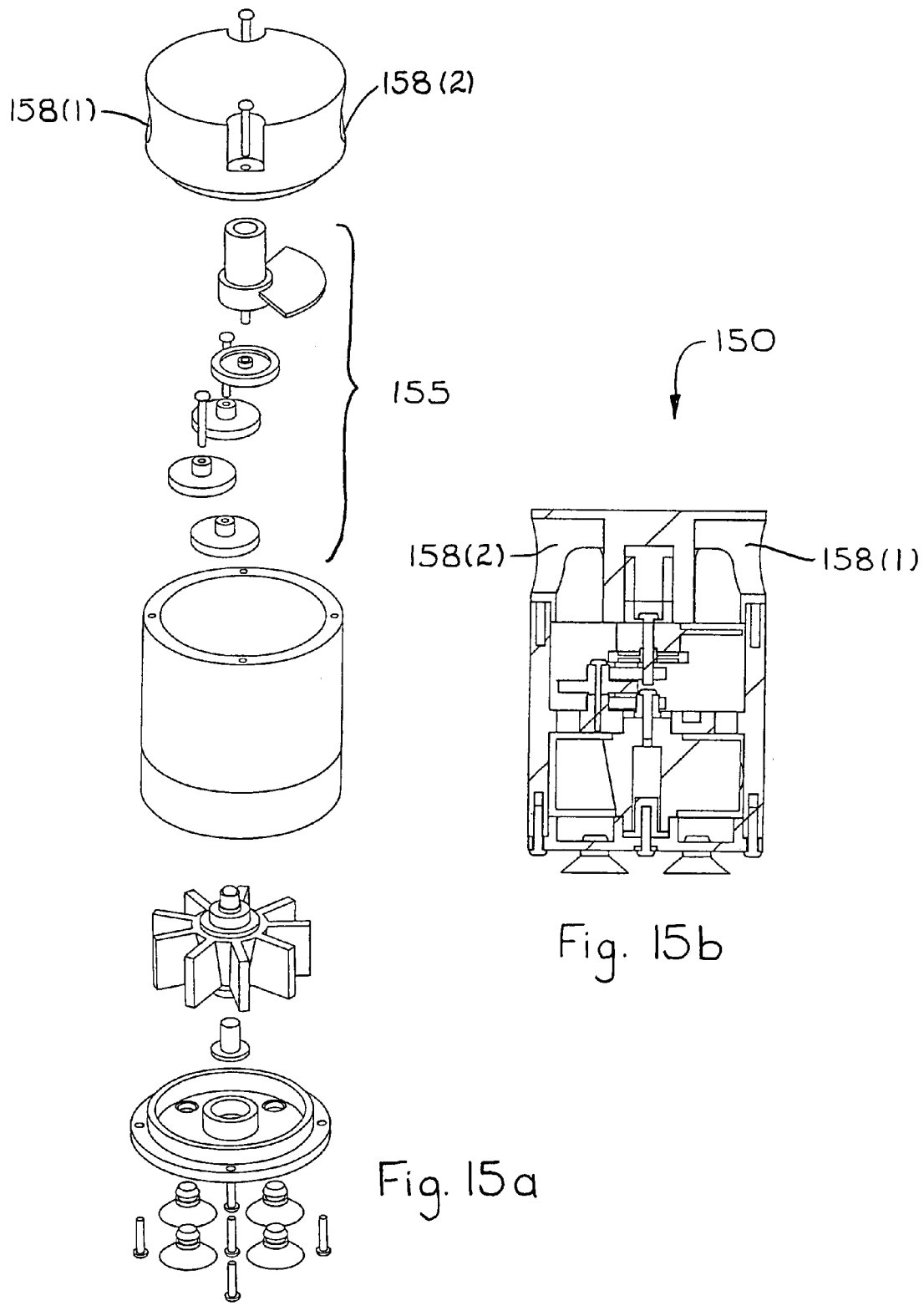
FIG. 15a is an exploded perspective view of a gear driven two port pulser in accordance with the invention.
FIG. 15b is a sectional view of the assembly thereof, as taken through a vertical plane of symmetry.

FIG. 15a shows a gear-reduced version of a two-port pulser 150 in accordance with the invention. This is similar to the direct-drive two-port pulser 1040 shown by FIGS. 4a/4b, except incorporating a gear-reduction drive train 155. The dual ports 158(1) and 158(2) have opposite ebb and flow timing.

FIG. 16a shows a shows an alternate version of a gear-reduced, two-port pulser 160 in accordance with the invention. This is similar to gear-reduced, two-port pulser 150 shown by the immediately preceding FIGS. 15a/15b, except incorporating a gear drive train 165 configured with a linearly traversing blocker door 165(1) in accordance with the invention. The dual ports 168(1) and 168(2) have opposite ebb and flow timing.

FIG. 17a shows a gear-reduced version of an omni pulser 170 in accordance with the invention. This is similar to the direct-drive omni pulser 1040 shown by FIGS. 5a/5b, except incorporating a gear-reduction drive train 175. The pulsing discharge issuing through the ports 178(1), 178(2) et seq. pulse their respective streams in a sequencing ebb and flow cycle timed on a 360° cycle of the spinning of the turbine 174.

Figures 18A, 18B:
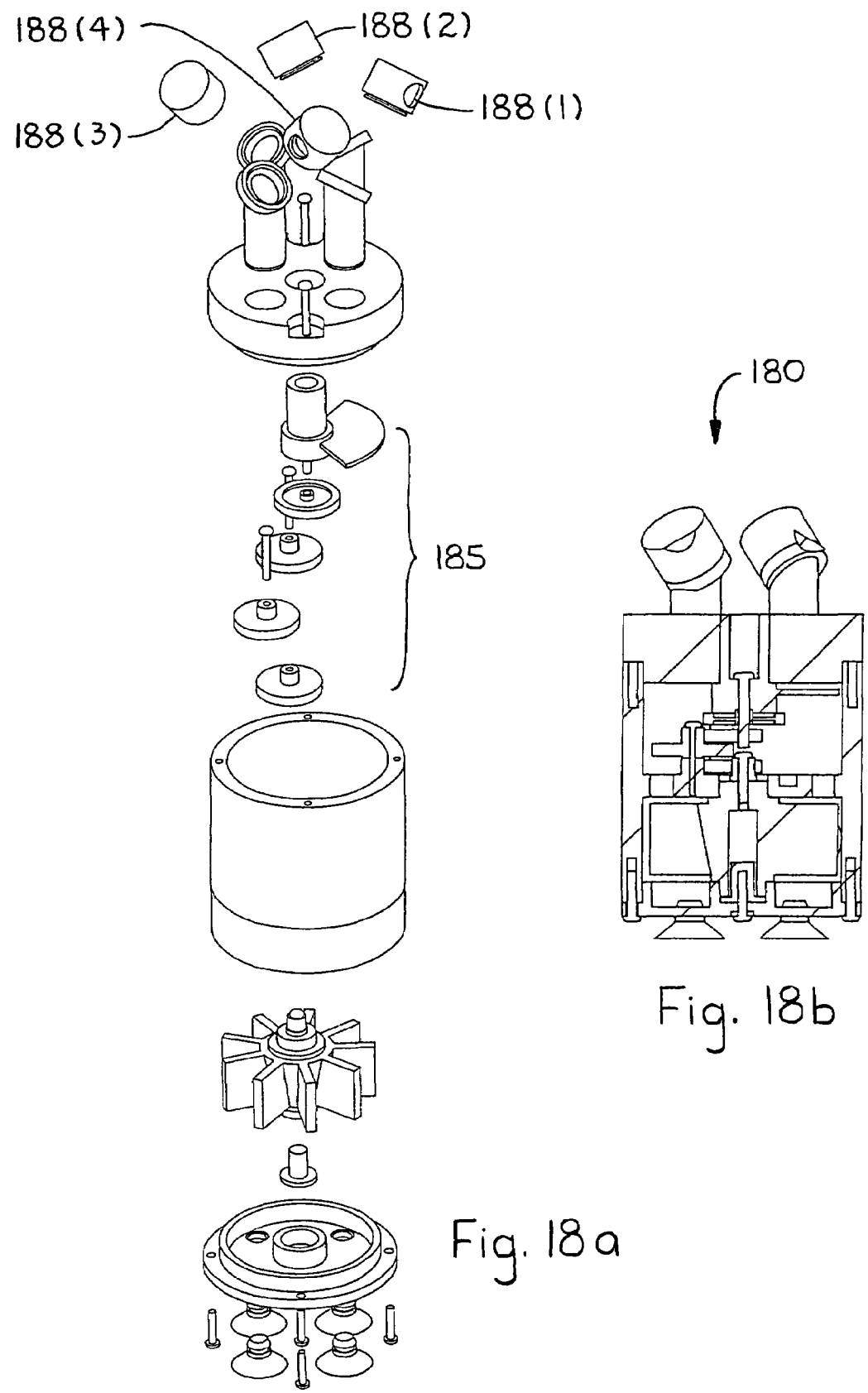
FIG. 18a is an exploded perspective view of an alternate embodiment of a gear driven omni pulser in accordance with the invention.
FIG. 18b is a sectional view of the assembly thereof, as taken through a vertical plane of symmetry.

FIG. 18a shows a gear-reduced version of a omni pulser 180 having four stationary and directionalized ports 188(1), 188(2), 188(3) and 188(4). This is similar to the direct-drive quad-port omni pulser 70 shown by FIGS. 7a/7b, except incorporating a gear-reduction drive train 185.

Figure 19A:
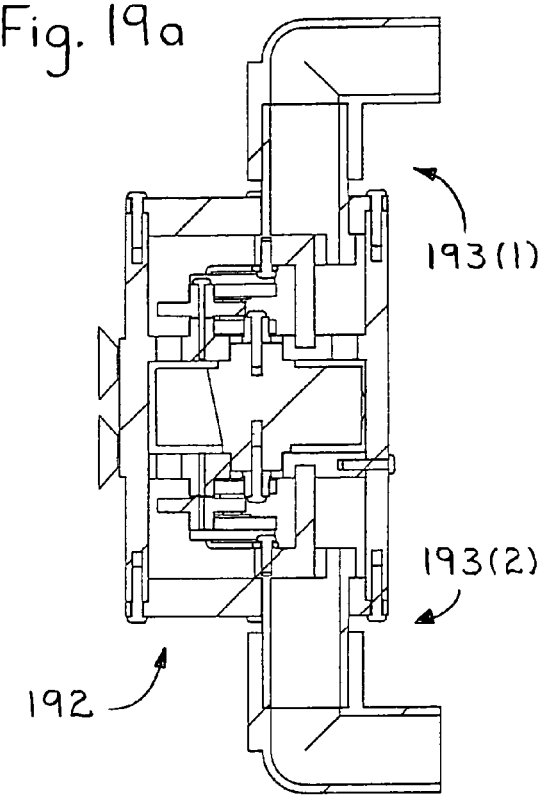
FIG. 19a is a sectional view of a double-ended gear driven oscillator in accordance with the invention, as taken through a vertical plane of symmetry.

FIG. 19a shows a dual oscillator 192 in accordance with the invention presenting in a sandwich configuration of dual oscillators 193(1) and 193(2) providing oscillating (but steady) discharge streams.

Figure 19B:
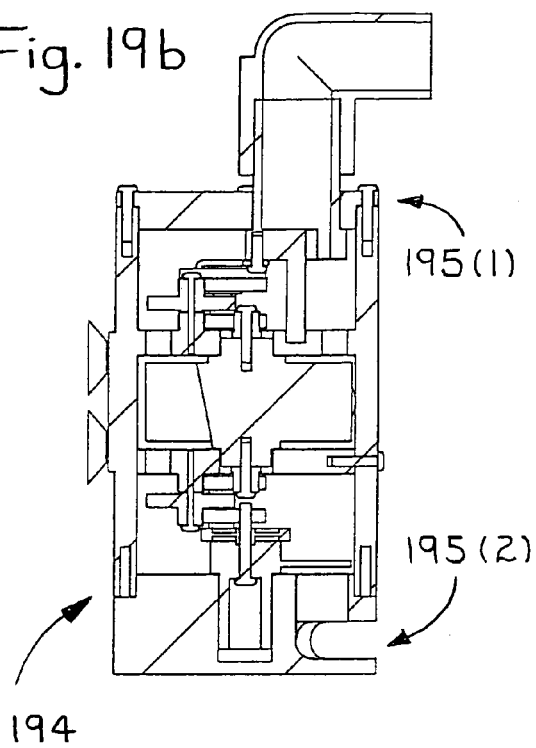
FIG. 19b is a sectional view of a gear driven pulser and oscillator in accordance with the invention, as taken through a vertical plane of symmetry.

FIG. 19b shows a combination 194 of an oscillator 195(1) and gear-reduced pulser 195(2) in accordance with the invention, and arranged in a sandwich configuration.

Figure 19C:
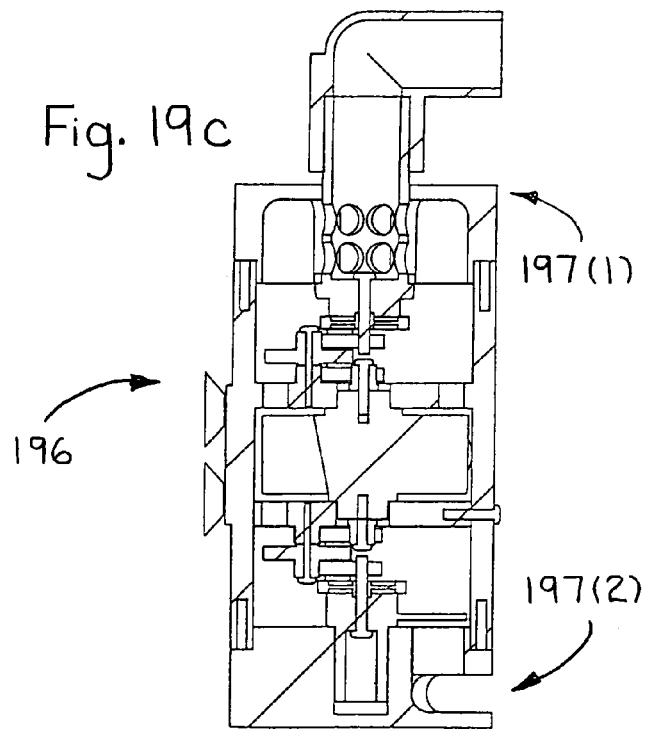
FIG. 19c is a sectional view of a gear driven pulser and rotator in accordance with the invention, as taken through a vertical plane of symmetry.

FIG. 19c shows a combination 196 of a gear-reduced rotator 197(1) and gear-reduced pulser 197(2) in accordance with the invention, and arranged in a sandwich configuration.

FIG. 20a shows a quad-oscillator arrangement 200 in accordance with the invention. The quadruple gear-driven oscillating discharge ports 208 provide steady discharge streams that oscillate back and forth among four separate quadrants of a circle. The gear drive 205 includes oscillated lever-wheels 205(3) driven by a hub 205(1) (or, alternatively, "master drag link") and spoke 205(2) linkage (or, alternatively, "articulated drag links") configuration.

Figure 21A:
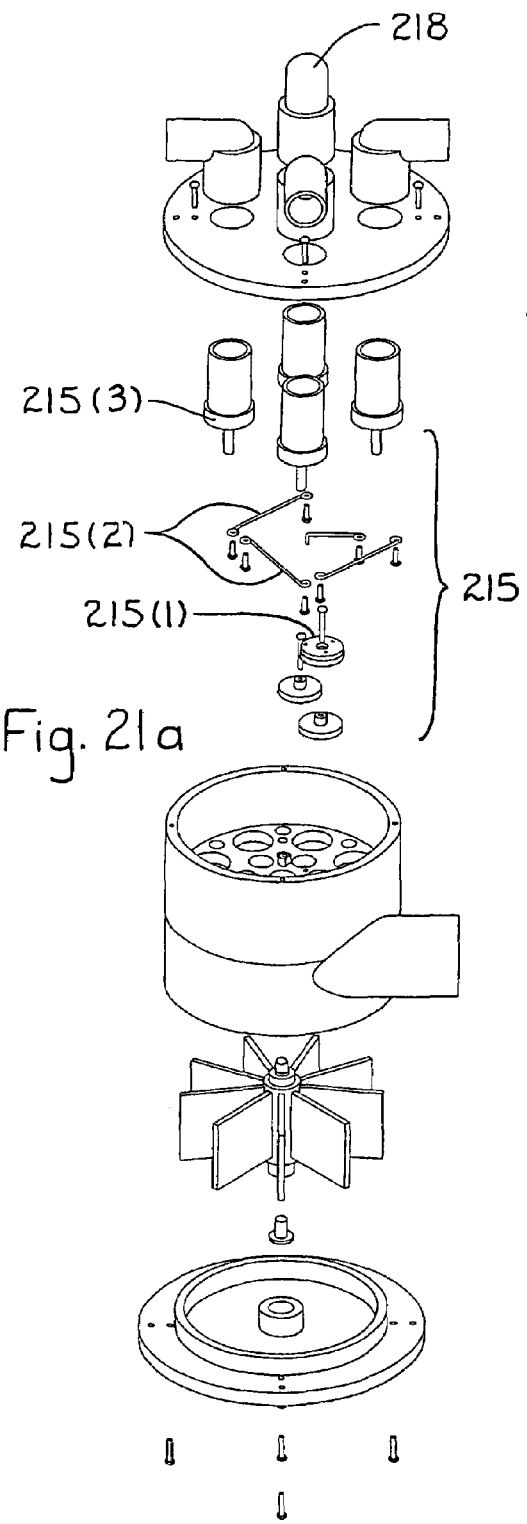
FIG. 21a is an exploded perspective view of an alternate embodiment of a gear driven four-oscillator arrangement in accordance with the invention.
Figure 21D:
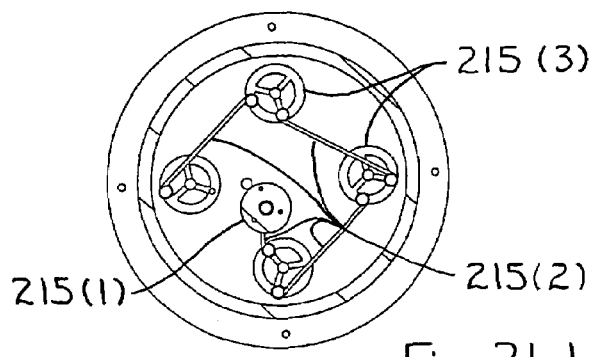
FIG. 21d is a sectional view taken through line 21d—21d in FIG. 21b.
Figure 21C:
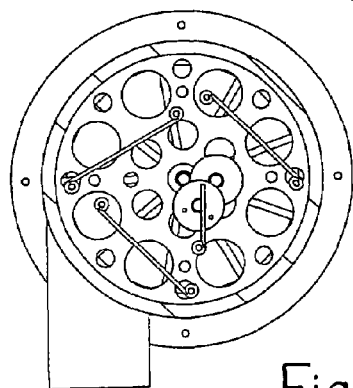
FIG. 21c is a sectional view taken through line 21c—21c in FIG. 21b.
Figure 21B:
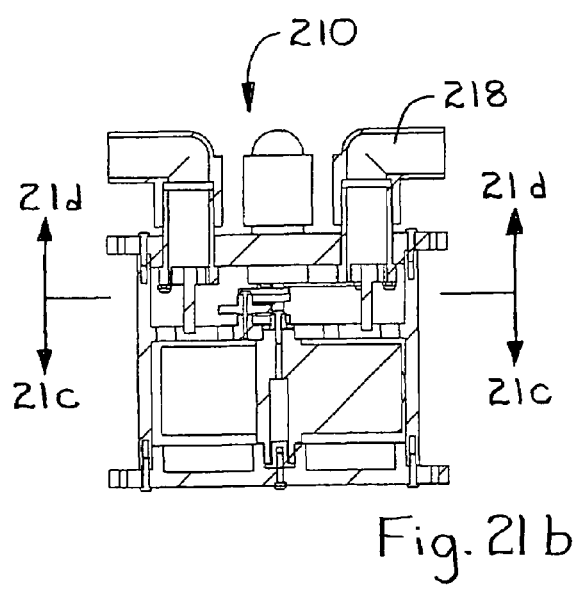
FIG. 21b is a sectional view of the assembly thereof, as taken through a vertical plane of symmetry.

FIG. 21a shows a shows a quad-oscillator arrangement 210 in accordance with the invention. The quadruple gear-driven oscillating discharge ports 218 provide steady discharge streams that oscillate back and forth among four separate quadrants of a circle. The gear drive 215 includes oscillated lever-wheels 205(3) driven by a crank 205(1) and serial link 205(2) configuration.

FIG. 22a shows a combination 220 of gear-reduced version of a rotator 221 with a gear-reduced version of a pulser 222.

FIG. 23a shows a modular manifold 230 in accordance with the invention, having a sandwich of opposite rotators 231, one pulser 232, and a stacked rotator-pulser 233, and an oscillator 236, all driven by a gear-and-belt drive 235 off the turbine 234.

FIGS. 24 through 26 show typical agitator devices as shown by any one of the previous views, now combined with a magnetically-driven turbine. Such a mag-drive unit is basically submersible in a tank because the actual motor unit therefor can reside outside the tank, the drive coupling therebetween being completed by a magnetic couple.

FIG. 24 shows a combination 240 comprising submersible mag-drive unit 241 which has its own built-in pumping turbine 242. There is also a driven turbine 243 which is more characteristic the agitator devices as shown by any one of the previous views. The driven turbine 243 operates a rotator 244 in accordance with the invention (eg., compare FIGS. 1a/1b).

Figure 25A:
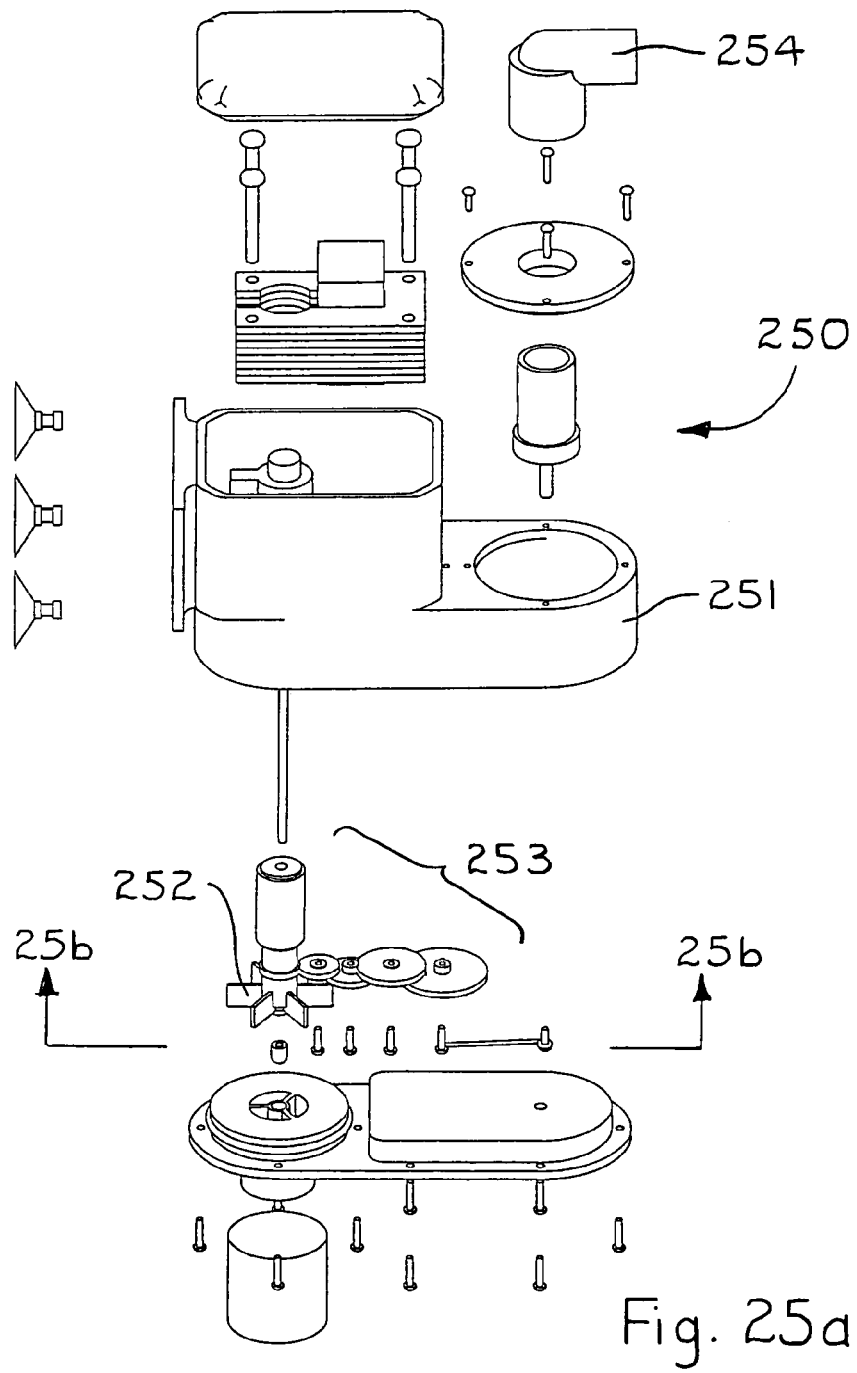
FIG. 25a is an exploded perspective view of a submersible magnetic-drive pump with a built-in gear-driven oscillator in accordance with the invention.
Figure 26:
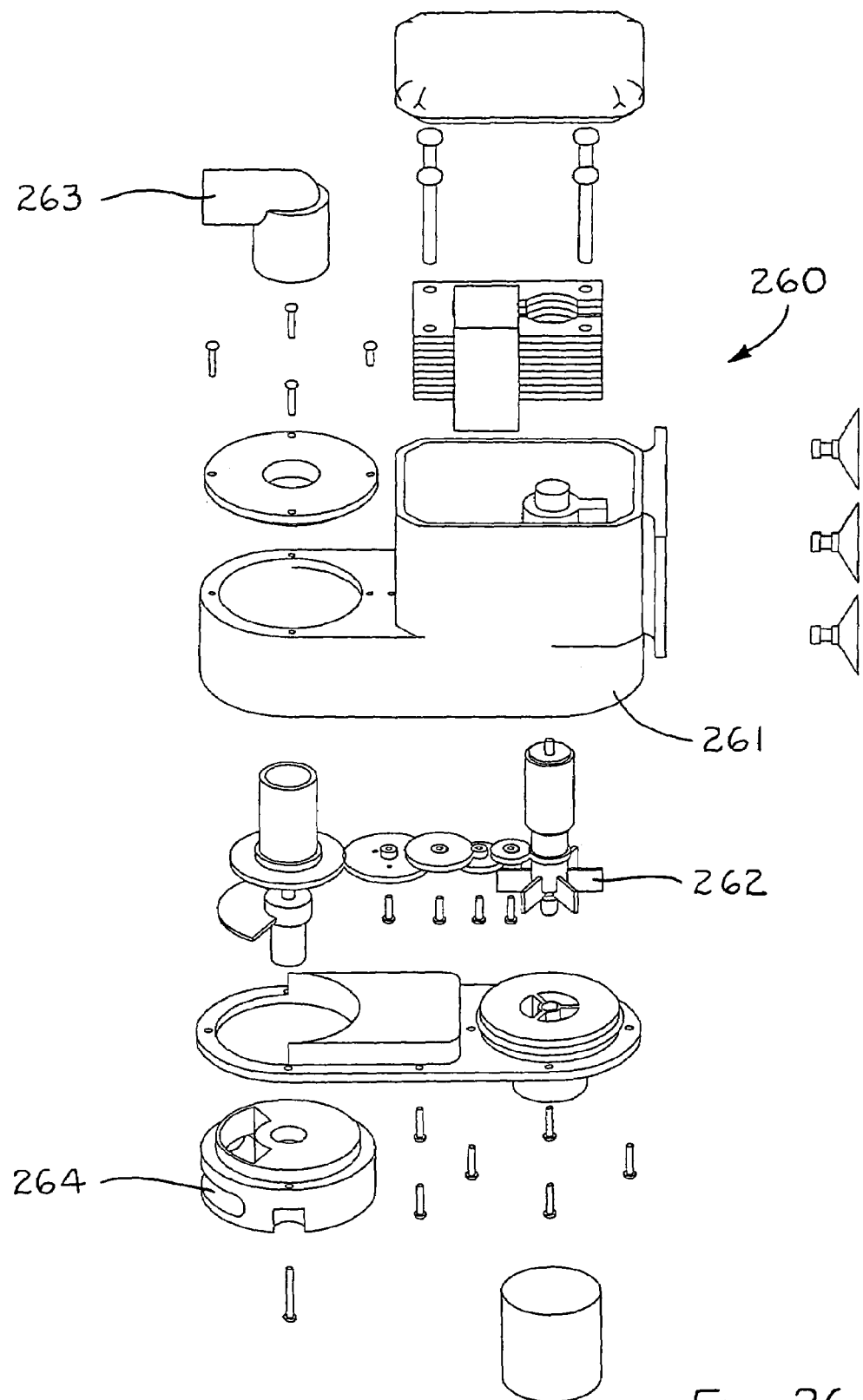
FIG. 26 is an exploded perspective view of a submersible magnetic-drive pump with one built-in rotator and one built-in pulser in accordance with the invention.

FIGS. 25a/25b show a combination 250 comprising submersible mag-drive unit 251 which has its own built-in pumping turbine 252. The pumping turbine 252 also powers a gear train 253 which operates an oscillator 254 in accordance with the invention (eg., compare FIGS. 11a/11b).

FIG. 26 shows a combination 260 of a submersible mag-drive unit 261 that has a pumping turbine 262 both ○ mechanically driving a gear train 263 that operates a rotator 264 (single port, steady discharge stream) and a pulser 265 (static discharge port, pulsing discharge stream, as well as ○ pumping the discharge flow. The rotator 264 and pulser 265 are in a sandwich configuration.

Figures 27A, 27B:
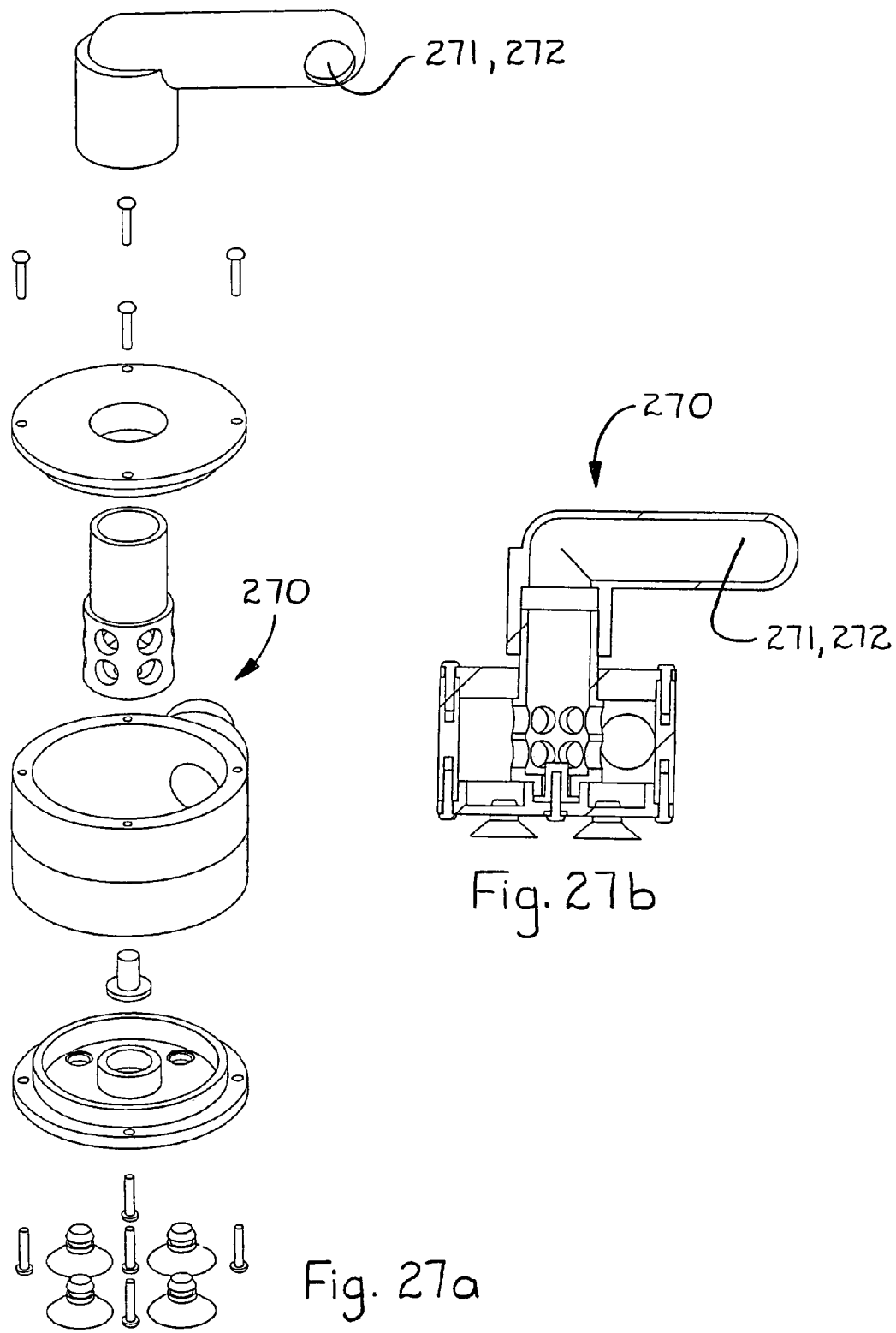
FIG. 27a is an exploded perspective view of a reactor turbine arrangement used as a rotator in accordance with the invention.
FIG. 27b is a sectional view of the assembly thereof, as taken through a vertical plane of symmetry.

FIGS. 27a/27b and 28a/28b show how the rotator's in accordance with the invention can be configured to operate not so much off turbines but reactor turbines.

Figures 28A, 28B:
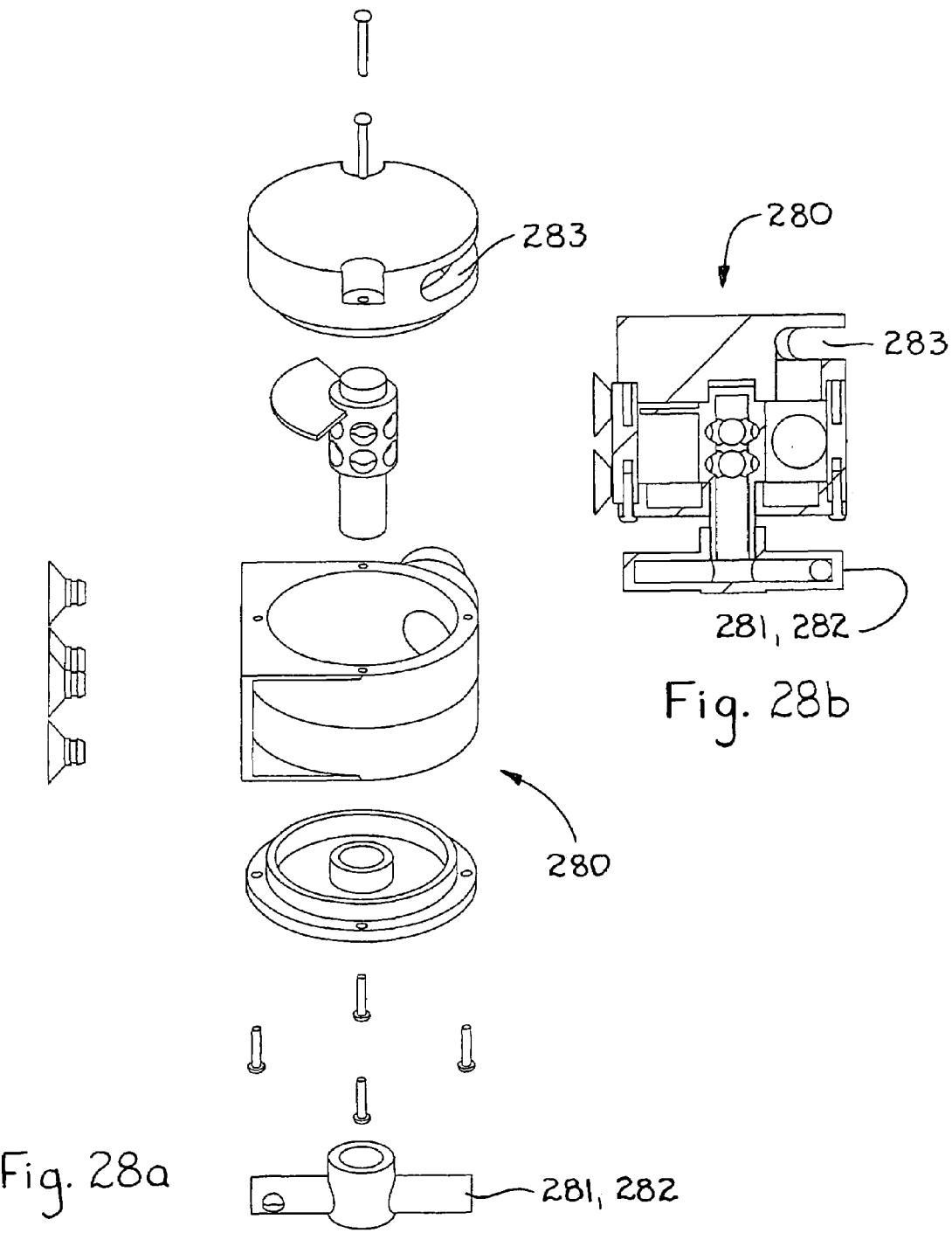
FIG. 28a is an exploded perspective view of a pulser and reaction turbine arrangement in accordance with the invention.
FIG. 28b is a sectional view of the assembly thereof, as taken through a vertical plane of symmetry.

FIG. 27a shows an example 270 of a reactor turbine 271, providing rotating discharge port 272 (single port), having a steady discharge stream. FIG. 28a shows a combination 280 of a reactor turbine 281 ○ driving a rotating discharge port 282 (dual ports, having a steady discharge stream), and ○ pulsing a static pulser port 283 (single port, providing a pulsing discharge stream). The ports 282 and 283 are in sandwich configuration.

FIGS. 29a through 39b comprise a series which disclose controls (and/or control devices) for the discharge port(s) of the typical agitator devices as shown by any one of the previous views in FIGS. 1a through 23a. In general FIG. 29a shows a rotator-pulser arrangement 291 in accordance with the invention, having an adjustable base 292, a riser 293 for the rotator nozzle 331, and a apertured ring 290 allowing adjustability of the pulser's outlet port(s) 298. Such a riser 293 or "extension" can be added to various ones of the inventive rotator or rotating pulser wave-making/mixing rotor to allow the rotating exit port to operate away from the turbine/pulsing housing. While this has its advantages for wave-making/mixing there are practical limits to how high the extension 293 can get. The extension 293 reduces flow to the rotating exit port (pipe friction), increases wear on the bearing and requires more torque from the turbine or motor.

As FIG. 29a also shows, one or more injection ports for a second infeed of fluid can be added to the body or housing of not only the depicted wave-maker/mixer 291 but likely every one of the others in accordance with the invention, in order to allow for the injection of (eg.) a second chemical, gas or air. This injection port can be fed fluid from another pump (e.g., a mixing or dosing pump), compressed gas, air from a compressor and so on. If the additional, injection port is placed near the fluid discharge, it can take advantage of the venturi effect and naturally draw air or fluid into the stream for mixing. The foregoing aside, many inventive aspects are associated with the apertured ring 290 in FIGS. 29a and 29b.

Figure 29B:
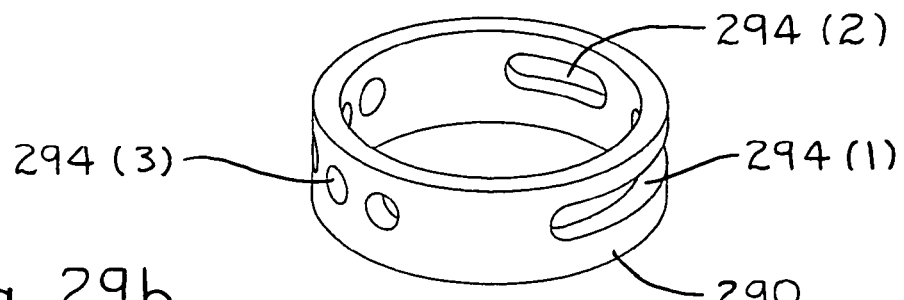
FIG. 29b is a perspective view of the ring in isolation, which ring allows adjustability of the pulser's outlet port(s)
Figure 29A:
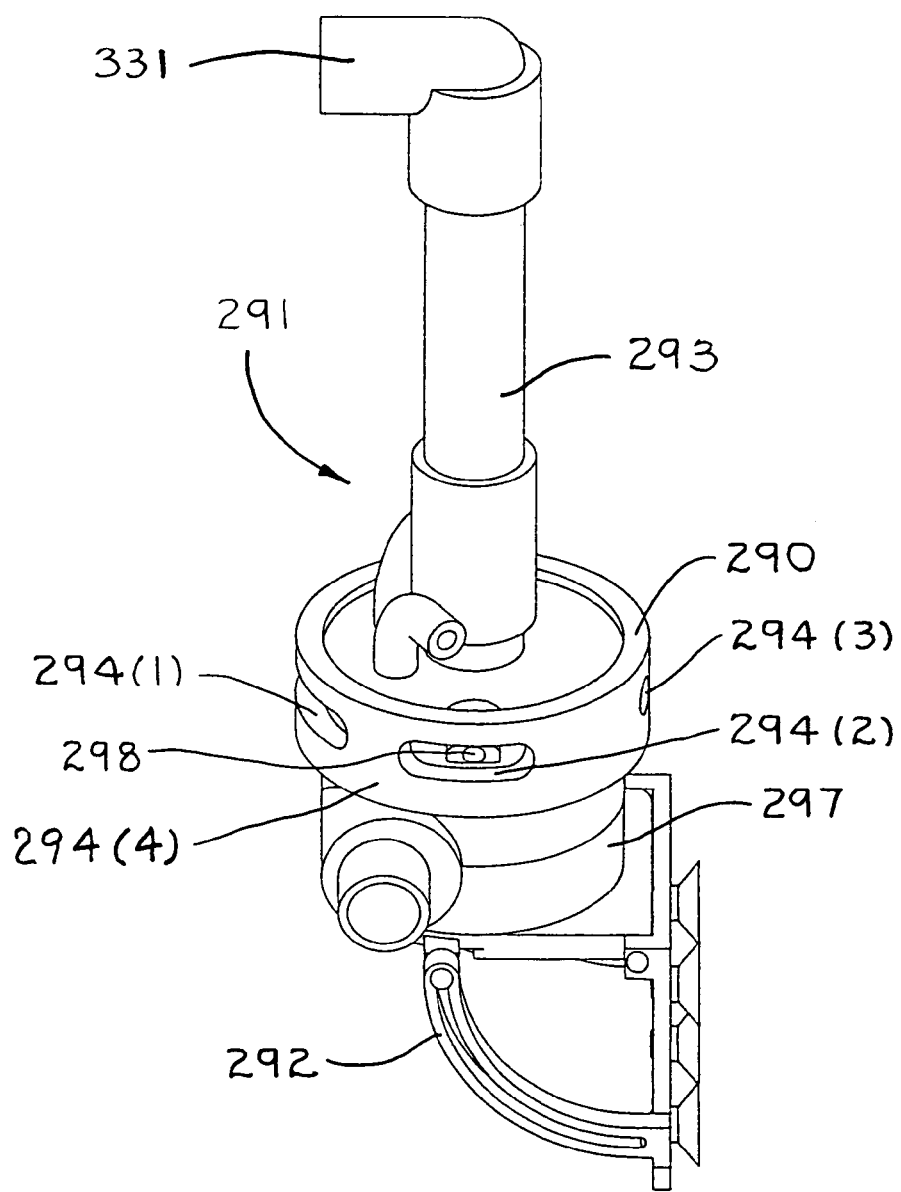
FIG. 29a is a perspective view of a rotator pulser arrangement in accordance with the invention, having an adjustable base, a riser for the rotator nozzle, two injection ports, and a ring allowing adjustability of the pulser's outlet port(s)

The apertured ring 290 is shown in isolation in FIG. 29b as disconnected from the upper housing sidewall 297 in which are formed the pulser exit ports 298. This apertured ring 290 has multiple ports in it in multiple styles including a wide arc slot 294(1), a relatively narrower arc slot 294(2), and a series of circular holes 294(3). The pulser ports 298 presumably correspond closely to the apertured ring 290 port configuration. The apertured ring 290 controls the shape and size of the discharge stream through any and all of such ports 298. The apertured ring 290 slides around the upper housing 297 and can be aligned in about any alignment. For convenience sake, consider the alignment when all the openings in the apertured ring 290 are lined up to match their corresponding ports 298 in the upper housing sidewall 297 (this is not shown). From that alignment, the apertured ring 290 can be slightly rotated such that the wide slot 294(1) is effectively narrowed. The solid span 294(4) between the narrow slot 294(2) and wide slot 294(1) in the apertured ring 290 can be used to split the wide-slot outlet port of the housing 297 to cause discharge into two discrete streams. The apertured ring 290 can be slipped axially to decrease the height of any discharge port 298 and hence increase the exit velocity of the water. The apertured ring 290 can be flipped over and the stream can be split into the two legs of a "V-shape," and so on.

Figures 30A, 30B:
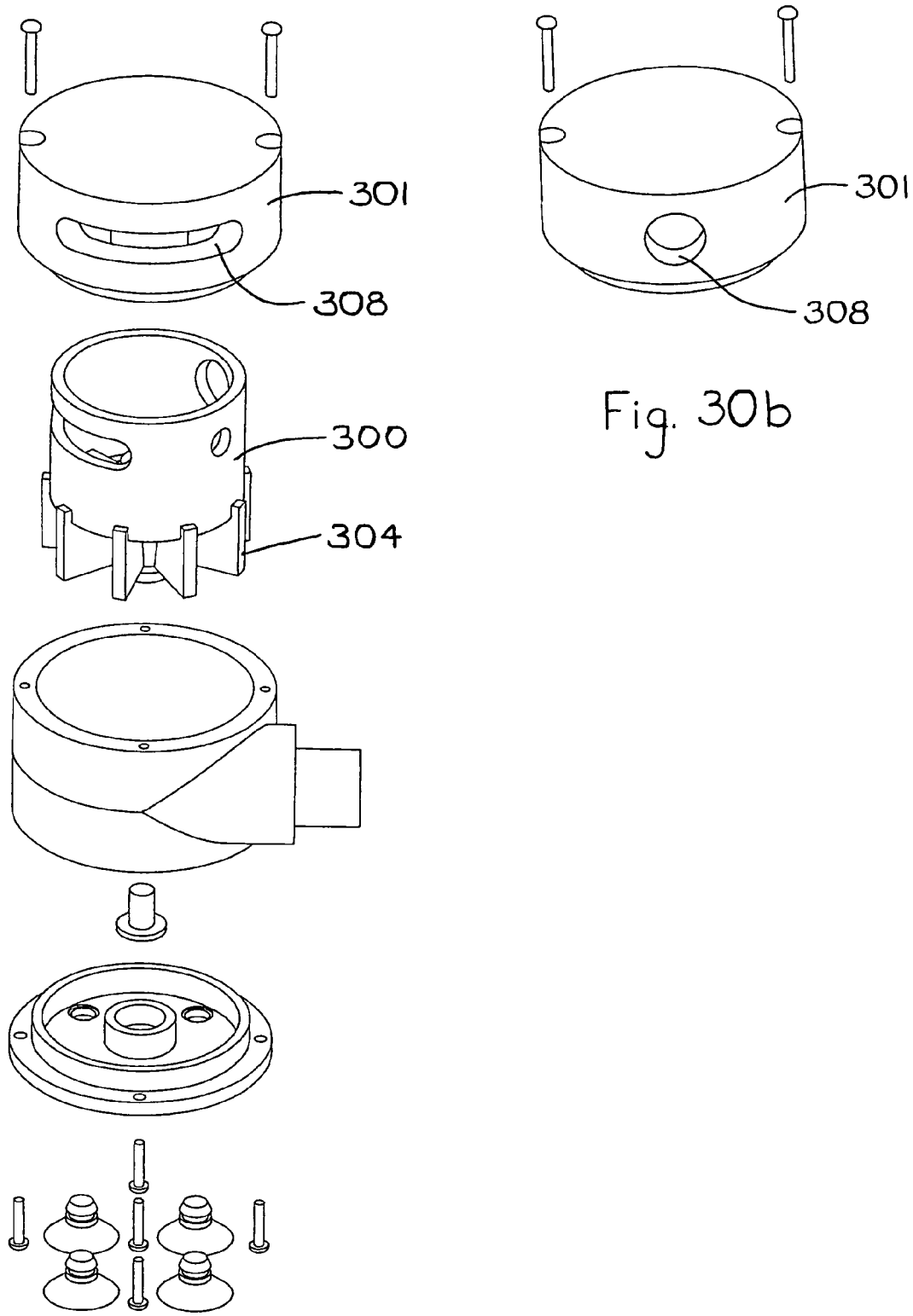

FIG. 30a shows an apertured barrel 300 attached for direct drive by the turbine 304 allowing a diverse blocking pattern as the apertures in the apertured barrel 300 spin past the series of discharge ports 308 in the stationary upper housing 301.

Figures 31A, 31B:
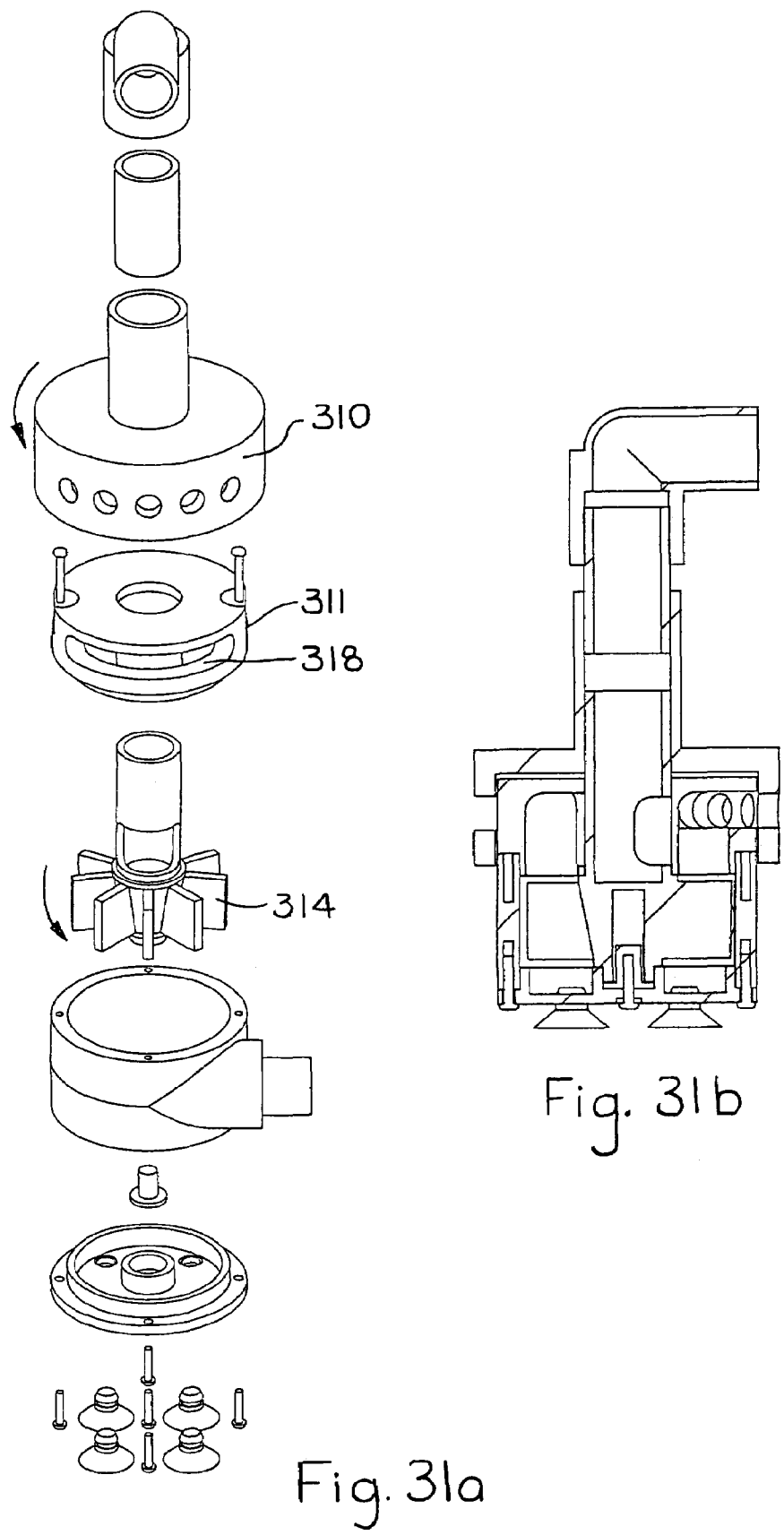
FIG. 31a is an exploded perspective view of a rotating pulser with an external ring used as a radial blocker door in accordance with the invention.
FIG. 31b is a sectional view of the assembly thereof, as taken through a vertical plane of symmetry.

FIG. 31a shows an apertured cap 310 attached for direct drive by the turbine 314 allowing a diverse blocking pattern as the apertures in the apertured cap 310 spin past the series of discharge ports 318 in the stationary upper housing 311.

FIG. 32a shows an apertured cap 320 which—though it does not spin—is coupled to a spinning barrel cam 321 which is spun by the spinning turbine 324. The barrel cam 321 hence drives or reciprocates the apertured cap 320 in extension and retraction (again, without spinning) for alternately widening-narrowing multiple static discharge ports 328 (eg., slits) to accomplish pulses of flowing and quiescent discharge streams timed in unison.

Figure 33A:
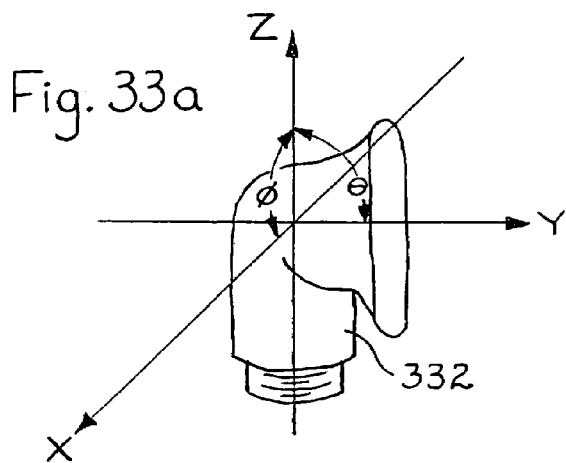
FIG. 33a is a perspective view of a 90° fan-shaped nozzle in accordance with the invention, wherein alternate embodiments of this nozzle can be obtained by varying the orientation of the fan-shaped formation in the θ and/or Φ angular directions, examples of which are shown by FIGS. 33b through 33d hereof.
Figure 33B:
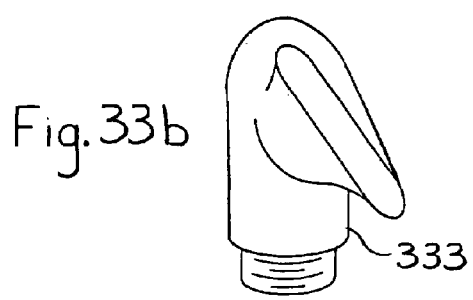
FIG. 33b is a perspective view of an alternate embodiment of the 90° fan-shaped nozzle in FIG. 33a, wherein the port is given a 45° counterclockwise twist.
Figure 33E:
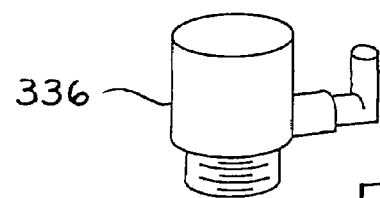
FIG. 33e is a perspective view of a bubble-making nozzle in accordance with the invention.
Figure 33C:
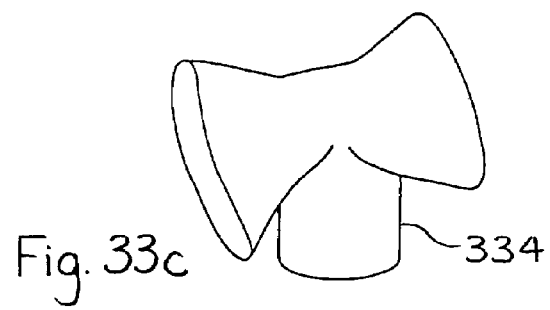
FIG. 33c is a perspective view of a dual-90° port fan-shaped nozzle comparable to the embodiment of FIG. 33a, wherein one port is given a 45° counterclockwise twist and the other a 45° clockwise twist.
Figure 33F:
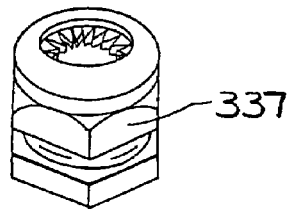
FIG. 33f is a perspective view of an adjustable-orifice nozzle in accordance with the invention.
Figure 33D:
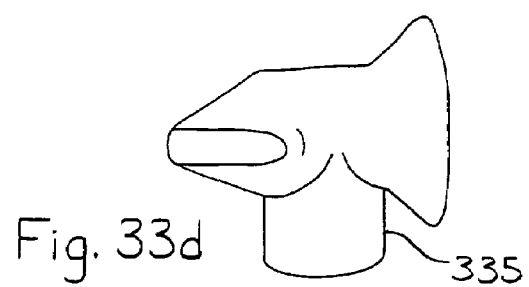
FIG. 33d is a perspective view of a dual-90° port fan-shaped nozzle comparable to the embodiment of FIG. 33a, wherein one port is given a 90° twist.

FIGS. 33a–33f have been addressed previously in connection with FIGS. 1a/1b, and reference may be had to there. FIG. 33a shows a 90° fan-shaped nozzle in accordance with the invention. Alternate embodiments of this nozzle are obtained by varying the orientation of the fan-shaped formation in the θ and/or Φ angular directions, examples of which are shown by FIGS. 33b through 33d, wherein:— FIG. 33b shows a 90° fan-shaped nozzle in which the port is given a 45° counterclockwise twist, FIG. 33c shows a dual-90° port fan-shaped nozzle in which one port is given a 45° counterclockwise twist and the other a 45° clockwise twist, and, FIG. 33d shows a dual-90° port fan-shaped nozzle in which one port is given a 90° twist.

Figures 34A, 34B:
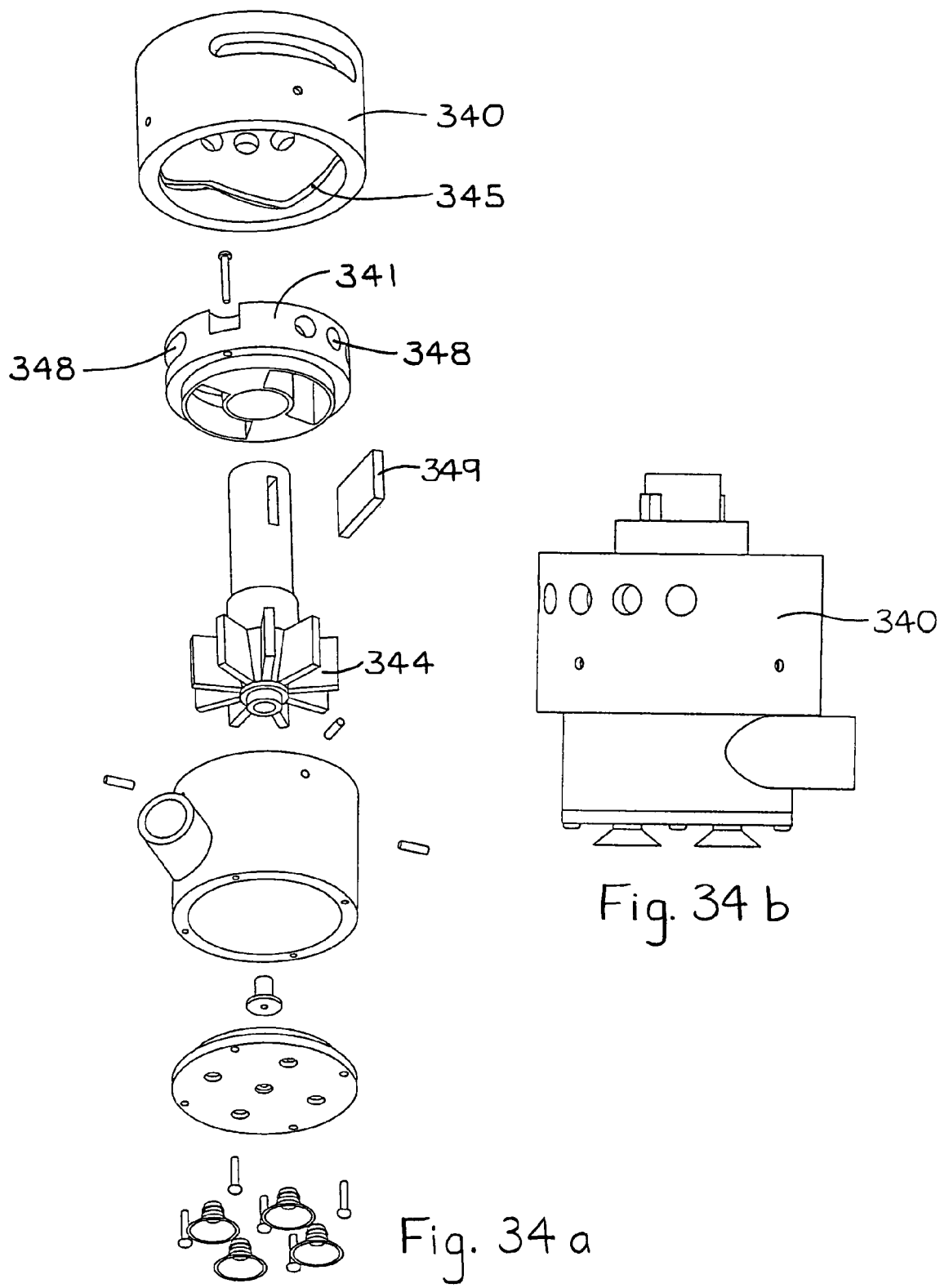
FIG. 34a is an exploded perspective view of a multi-port pulser in accordance with the invention, having a rotating and axially-moving external ring used as a blocker-door.
FIG. 34b is a perspective view of the assembly thereof.

FIG. 34a shows and alternate embodiment of FIGS. 31a/31b. Here, FIGS. 34a/34b show an apertured cap 340 attached for direct drive by the turbine 344 allowing a diverse blocking pattern as the apertures in the apertured cap 340 spin past the series of discharge ports 348 in the stationary upper housing 341. The apertured cap 340 also incorporates a barrel cam 345 for reciprocating the apertured cap 340 at the same time it spins, making further complex the pulsing pattern the apertured cap 340 gives to the discharge stream. This apertured cap 340, spinning and reciprocating at the same time, takes on the kind of motion of a merry-go-round ride. The apertured cap 340 is keyed to a shaft of the turbine 344 by a sliding key 349. The sliding key 349 forces the apertured cap 340 to spin but otherwise allows the apertured cap 340 to reciprocate in extension and retraction.

Figures 35A, 35B:
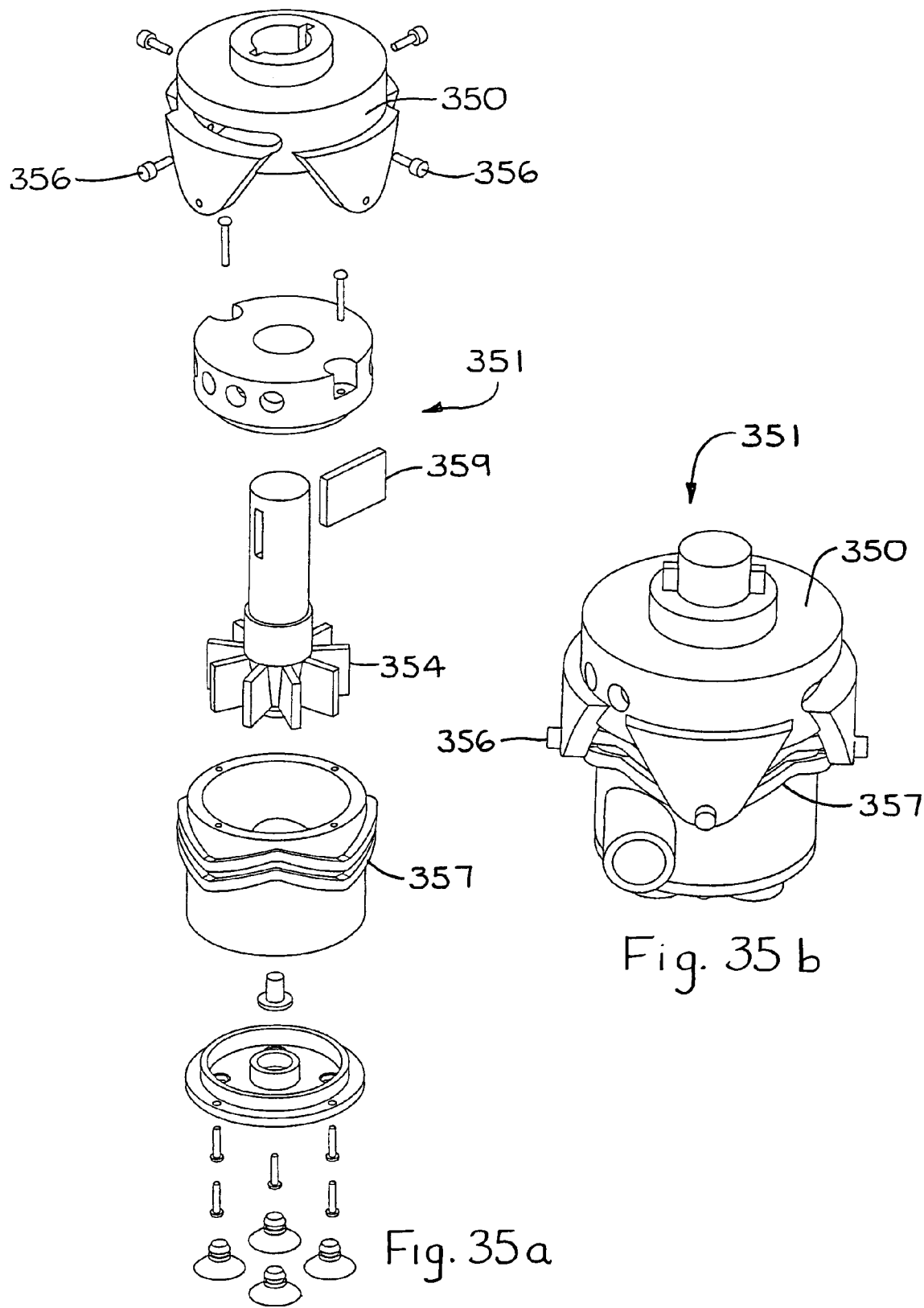
FIG. 35a is an exploded perspective view of an alternate embodiment of a multi-port pulser in accordance with the invention, having a rotating and axially-moving external ring used as a blocker-door.
FIG. 35b is a perspective view of the assembly thereof.

FIG. 35a shows an alternate embodiment of a multi-port pulser 351. It has an apertured cap 350 using the spinning of the turbine 354 to both ○ spin a set of cam-followers 356 riding in a barrel cam 357 as well as ○ directly spin the cap 350 for causing in combination both reciprocation as well as spinning opening-and-closing of multiple static discharge ports to accomplish pulsing discharge streams in diverse ebb and flow patterns. The apertured cap 350 is keyed to a shaft of the turbine 354 by a sliding key 359. The sliding key 359 forces the apertured cap 350 to spin but otherwise allows the apertured cap 350 to reciprocate in extension and retraction.

Figures 36A, 36B:
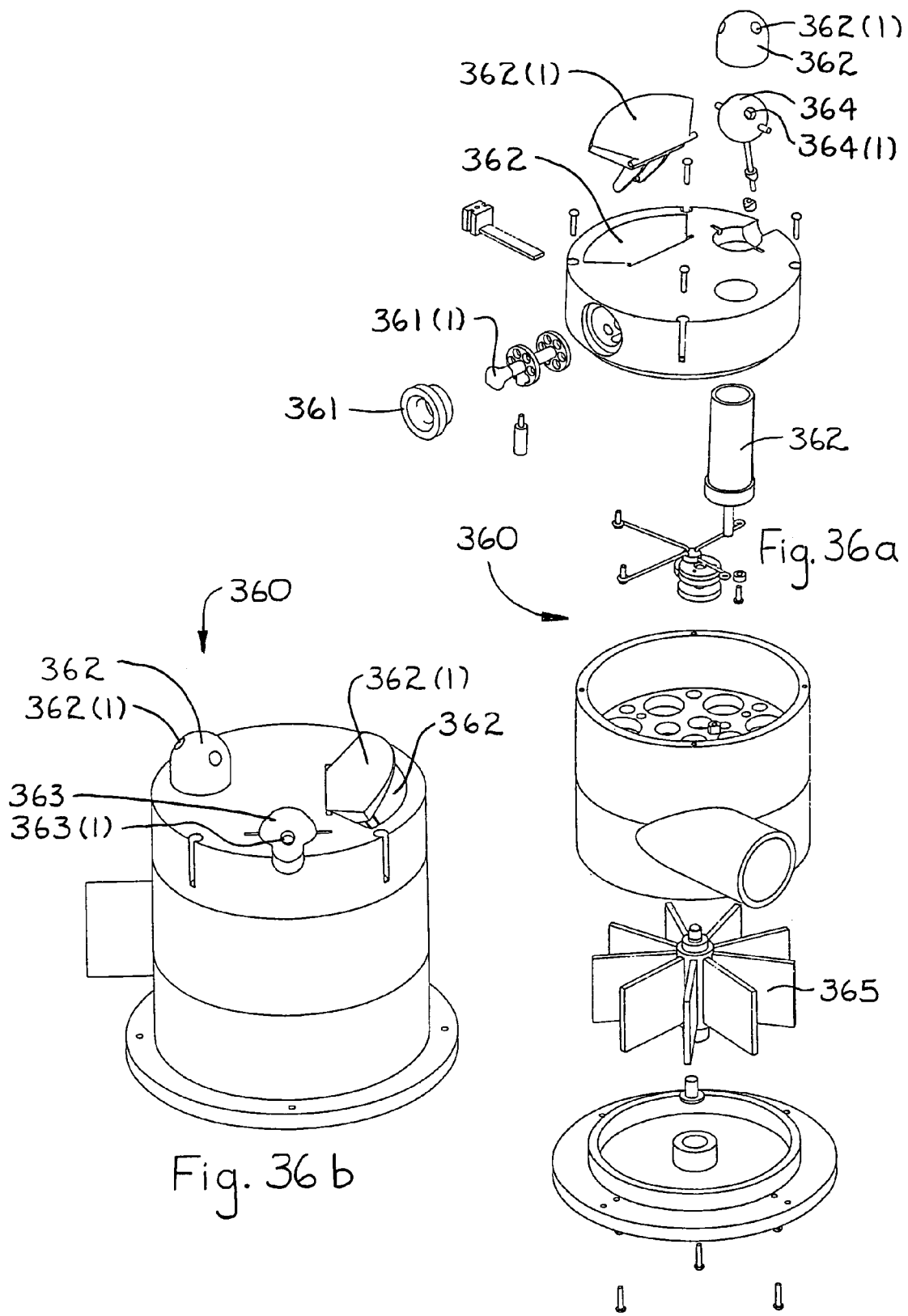
FIG. 36a is an exploded perspective view of an agitator in accordance with the invention, using the oscillating output from the rotor to manipulate four different exit ports.
FIG. 36b is a perspective view of the assembly thereof.

FIG. 36a shows an agitator 360 in accordance with the invention, using the spinning output from a turbine 365 to manipulate four different exit ports as follows. One, to reciprocate a needle 361(1) of a needle valve 361, which pulses the discharge stream of that stationary port 361. Two, to spin an apertured cap 362, from which steady discharge streams issue from the spinning ports 362(1) therein. Three, to rock the rocking flap 363(1) that covers and uncovers a stationary port 363, which thus pulses the discharge stream issuing therefrom. And four, to rock an apertured ball 364, from which steady discharge streams issue from the rocking ports 364(1) therein.

FIG. 37a shows an agitator 370 in accordance with the invention, using a spinning face cam 375 to manipulate three different exit ports as follows. One, to reciprocate a needle 371(1) of a needle valve 371, which pulses the discharge stream of that stationary port 361. Two, to rock the rocking flap 372(1) that covers and uncovers a stationary port 372, which thus pulses the discharge stream issuing therefrom. And three, to rock an apertured ball 373, from which steady discharge streams issue from the rocking ports 373(1) therein.

FIG. 38a shows an agitator 380 in accordance with the invention. The spinning turbine 385 spins a barrel cam 386, which reciprocates as well as spins. A series of reciprocating cam followers harness the reciprocation (but not the spinning) of the barrel cam 386 to separately manipulate three different discharge ports as follows. One, to reciprocate a louver 381, the discharge slits 381(1) in which are uncovered on the up-stroke and so pulse the discharge stream(s) therefrom. Two, to rock a flap 382(1) covering and uncovering a stationary port 382 and so pulse the discharge stream issuing therefrom. And three, to open and close a pair of shutters 383 and so pulse the discharge stream issuing from a port 383(1) which those shutters 383 choke off.

Figures 39A, 39B:
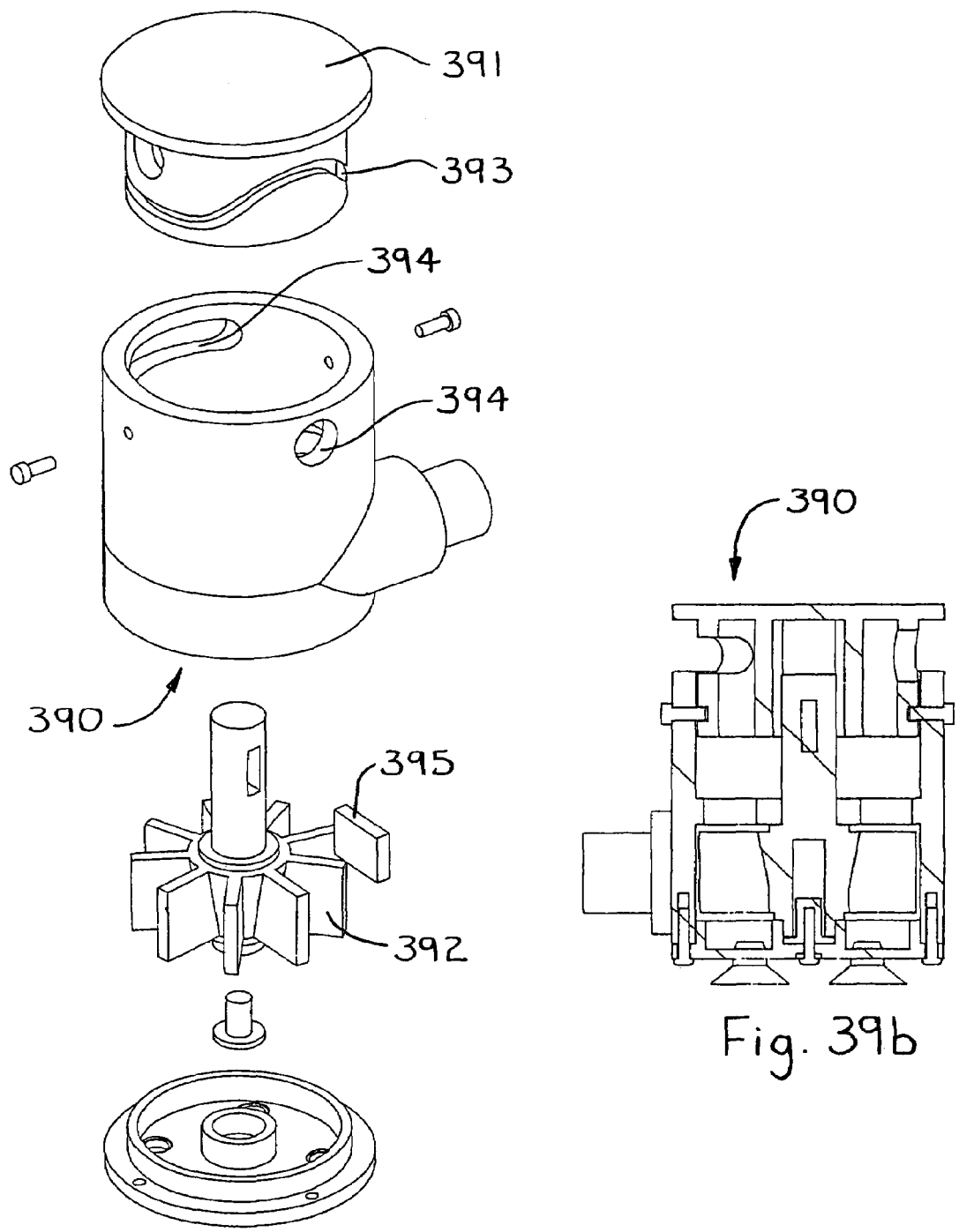
FIG. 39a is an exploded perspective view of a multi-port pulser in accordance with the invention, having a rotating and axially-moving internal cylinder used a blocker-door.
FIG. 39b is a sectional view of the assembly thereof, as taken through a vertical plane of symmetry.

FIG. 39a shows a multi-port pulser 390 in accordance with the invention, having an apertured crown-plug 391 using the spinning output of the turbine 392 to spin a barrel cam 393 which hence reciprocates and spins such apertured crown-plug 391 for opening-closing of multiple static discharge ports 394 to accomplish pulsing discharge streams. As was true in connection with several of the previous versions of caps and barrel cams (eg., see at least FIGS. 34a/34b and 35a/35b), the apertured crown-plug 391 is keyed to a shaft of the turbine 392 by a sliding key 395. The sliding key 395 causes the apertured crown-plug 391 to spin but otherwise allows the apertured crown-plug 391 to reciprocate in extension and retraction.

Figure 40:
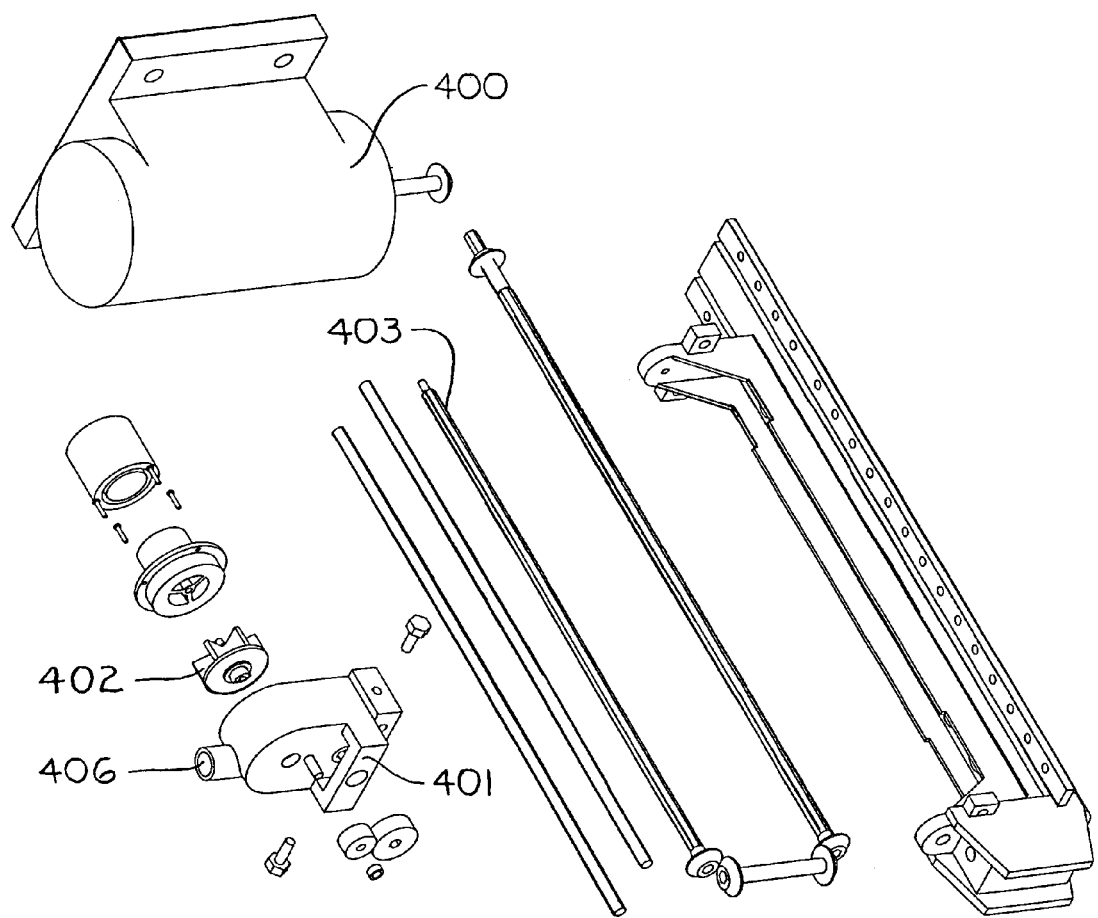
FIG. 40 is an exploded perspective view of an adjustable-height, submersed pump head in accordance with the invention, with the motor hidden under the tank to limit noise, heat transfer, and risk of shock and increase efficiency.

FIG. 40 shows a direct drive submersible pump head (e.g., 401) featuring a track-mounted traversing head 401 to allow adjusting depth of submersion. The motor 400 is positioned as hidden under the tank (tank not shown) to limit noise, heat transfer, and risk of shock and increase efficiency. Track-mounted traversing head 401 has a pumping impeller 402 driven by a splined drive shaft 403 and allowing manual position setting to change the position (e.g., elevation) of the traversing head 401 and hence the depth of its associated discharge port 406. More particularly, the motor 400 drives the drive train through shafts (including splined shaft 403) and bevel gears. The drive train's output culminates in the splined shaft 403. The drive train's output (e.g., the turning drive shaft 403) is the drive input supplied to the track-mounted traversing pump head 401 to drive its impeller 402. The track-mounted traversing pump head 401 is adjustable for depth of submersion by removing its locking bolts and then manually sliding the pump head 401 up or down in the tank (again, tank not shown) on the pump head 401's two parallel track slides (eg., rods). The parallel tracks provide the pump head 401 with angular stability to oppose the torque of the turning drive shaft 403. The parallel tracks also allow the pump head 401 to be locked at any elevation thereon by tightening the locking bolts. The drive pinion in the pump head 401 is free to slide up and down the splined drive shaft 403 while the pump head 401's depth of submersion is adjusted without operatively disengaging the drive shaft.

Figure 41A:
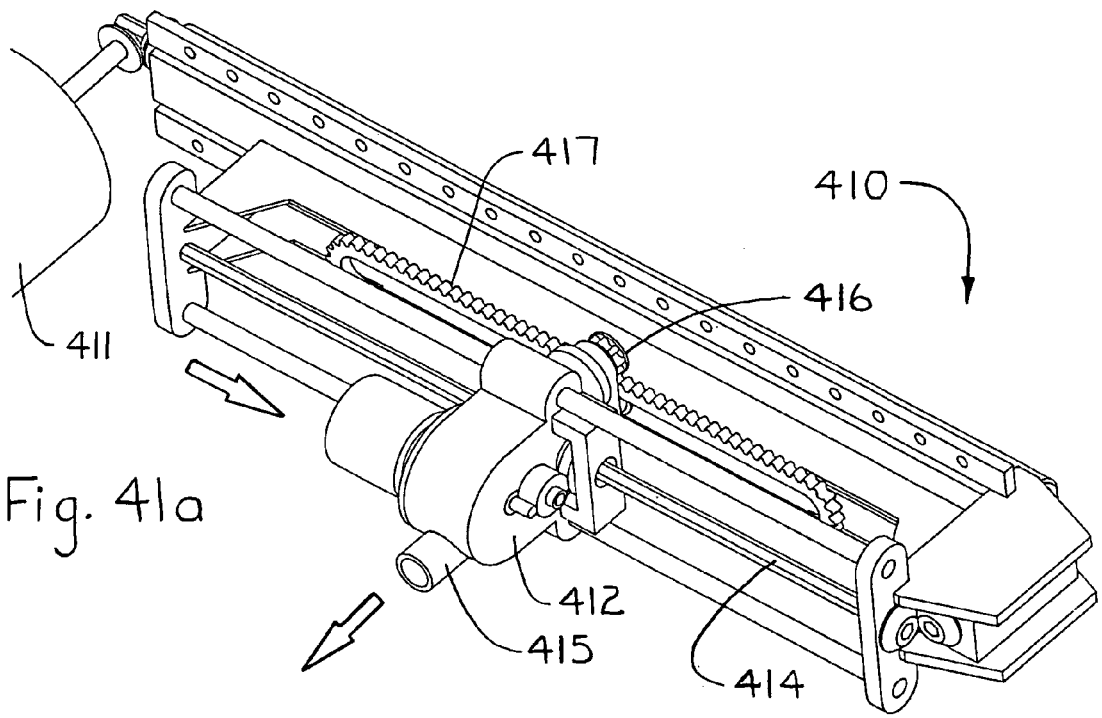
FIG. 41a is a perspective view of a linear-sweeping wave-maker in accordance with the invention, using a track-mounted pump head with drive gear and an impeller driven off a motor which is hidden under the tank.
Figure 41B:
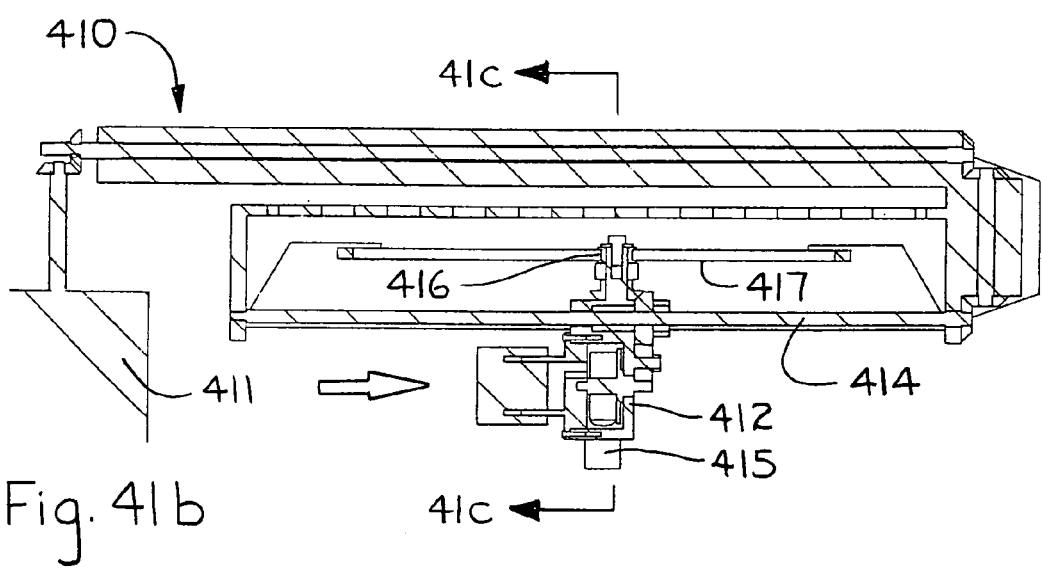
FIG. 41b is a sectional view of the assembly thereof, as taken through a horizontal cutting plane.
Figure 41C:
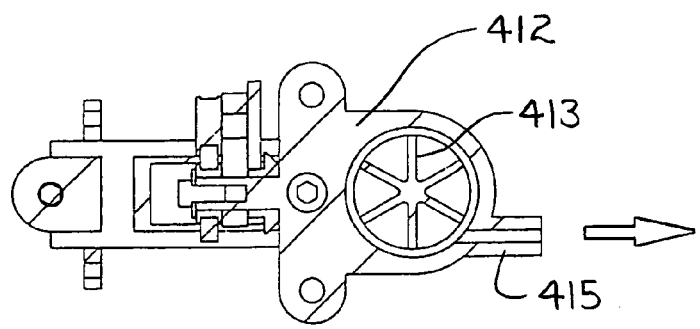
FIG. 41c is a sectional view taken through line 41c—41c in FIG. 41b.

FIG. 41a shows a linear-sweeping wave-maker 410 in accordance with the invention. It has a comparable motor (eg., denoted by 411 here) and track-mounted traversing head (eg., denoted by 412 here) as shown by FIG. 40. However, the traversing head 412 linearly sweeps between opposite extremes (eg., if oriented vertically, then high and low extremes). Again, the motor 411 is preferably disposed hidden under the tank (tank not shown) to limit noise, heat transfer, and risk of shock and increase efficiency. The track-mounted linear-sweeping traversing head 412 has a pumping impeller 413 driven off a splined drive shaft 414 to allow pumping discharge out the discharge port 415 (eg., the pumping turbine 413 draws suction locally and expels the intake forcefully out the port 415). The same gear train that drives the pumping impeller 413 also drives a pinion 416 that is meshed on a "race-track" shaped rack 417 to cause the back and forth traversing of the traversing head 412. The pinion gear 416 is mounted to an arm off the head 412 which pivots around a peg protruding from the read of the pump head 412. The rotating arm allows the pinion 416 to tractor in the teeth of the "race-track" shaped rack 417. As the pinion 416 transits around the rack 417, the pump head 412 traverses up and down its stabilizing slide tracks.

Figures 42A, 42B:
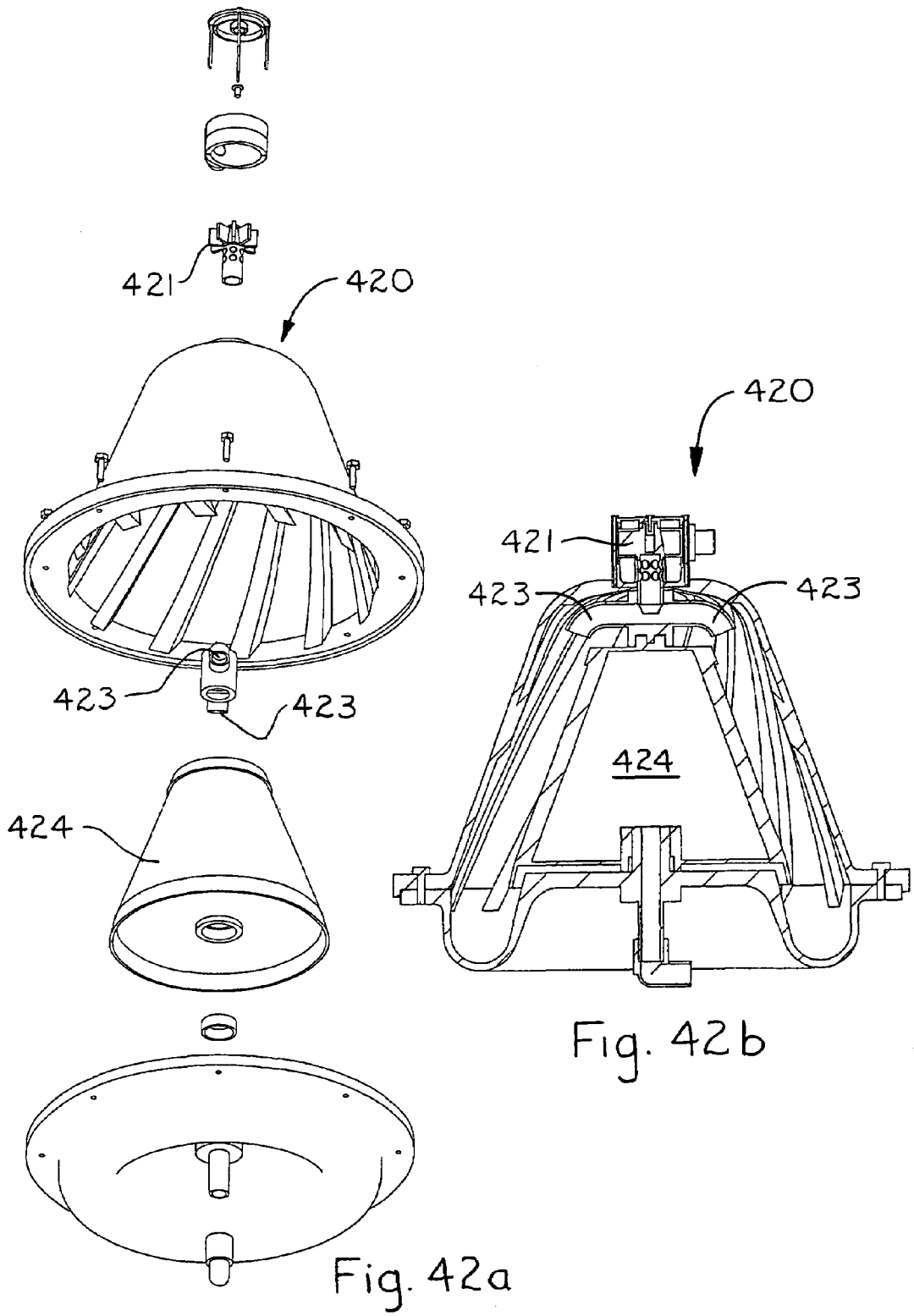
FIG. 42a is an exploded perspective view of a filter in accordance with the invention, in which spinning the filter drives particles to serrations in the upper housing, and in which the discharge of fluid from the rotator drives particles down to gutter.
FIG. 42b is a sectional view of the assembly thereof, as taken through a vertical plane of symmetry.

FIG. 42a shows a filter 420 in accordance with the invention, having a turbine 421 on the feedwater intake port 422. The turbine 421 is driven by the inflow into the filter housing of the feedwater. The turbine 421 drives or spins a pair of spaced sprinkler arms 423 over the outside of the bell-shaped filter matrix 424. The filter matrix 424 is coupled to the hub of the sprinkler arms 423 to spin too. Infeed fluid enters at inlet 422 and spins the turbine 421 which in turn spins radial nozzles 423 and cone-shaped filter 424. However, the filter 424 can take on other shapes including without limitation cylinder, cone, inverted cone and so on. Particles are centrifugally motivated to the bell-shaped housing wall and washed down the wall in a gutter by fluid exiting the radial nozzles 423. Spiraled flights in the housing wall guide particles down to the gutter. Fluid from the radial nozzles 423 that transit the pores of the filter 424 exit out of a fitting in the center of a lower bearing-block for the filter 424.

Figure 43:
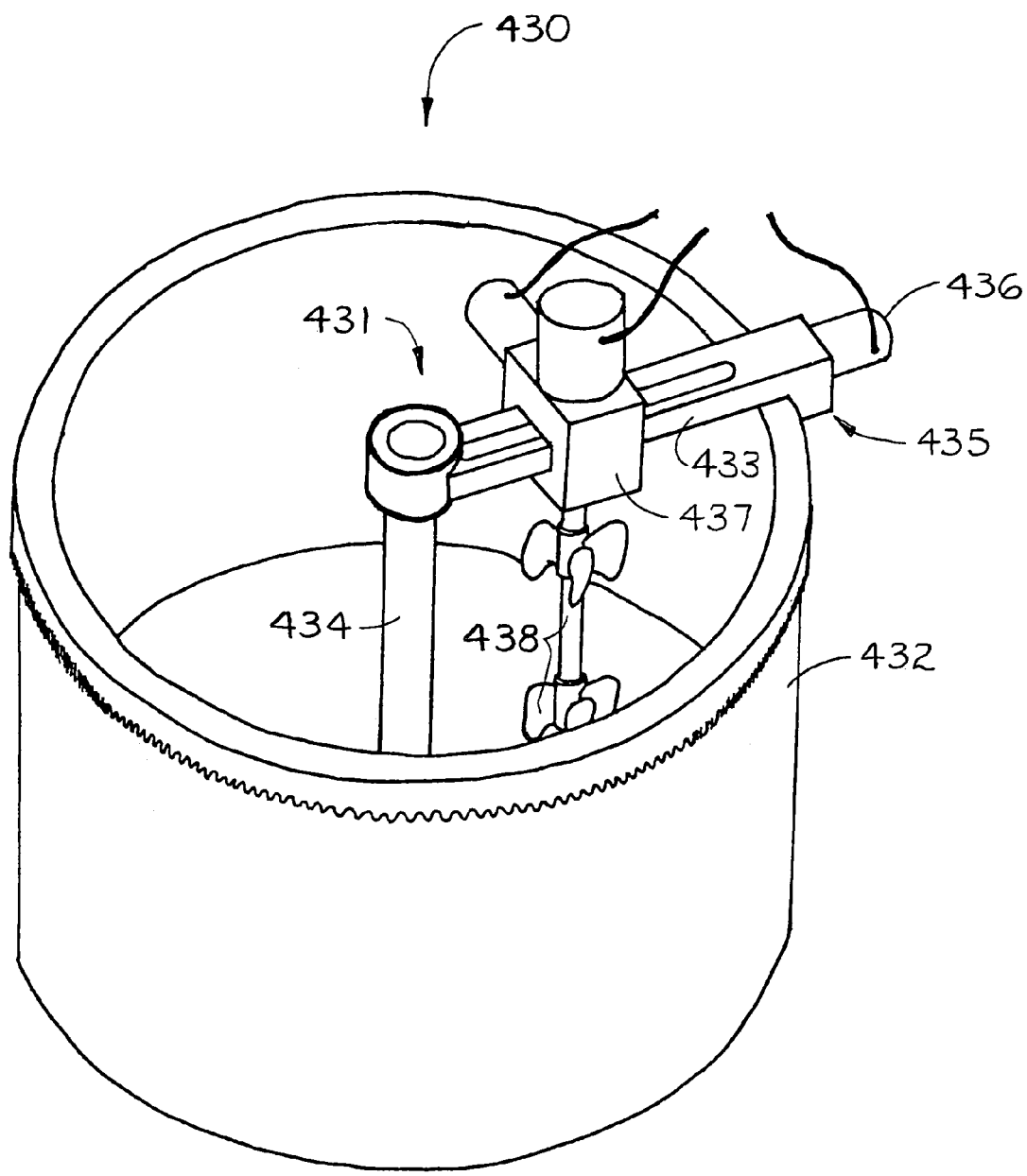
FIG. 43 is a perspective view of a multiple-axis mixer in accordance with the invention, having a rack and pinion drive, and multiple impellers on a single shaft in a cylindrical arrangement.

FIG. 43 shows a combination 430 multiple-axis impeller drive 431 and drum mixer 432 in accordance with the invention. The combination 430 has a rotating gantry 433 pivoted about a central mast 434 in the drum 432 and driven by a rack and pinion drive 435 about the gantry's sweep end 436. The gantry 433 carries a motorized traversing head 437 from which is suspended a driven-impeller shaft and impeller 438. The drive speed(s) of any of the coordinate axes and impeller can be optionally left to operate at constant speed (selected manually) or else varied with respect to time by use of a controller.

Figure 44:
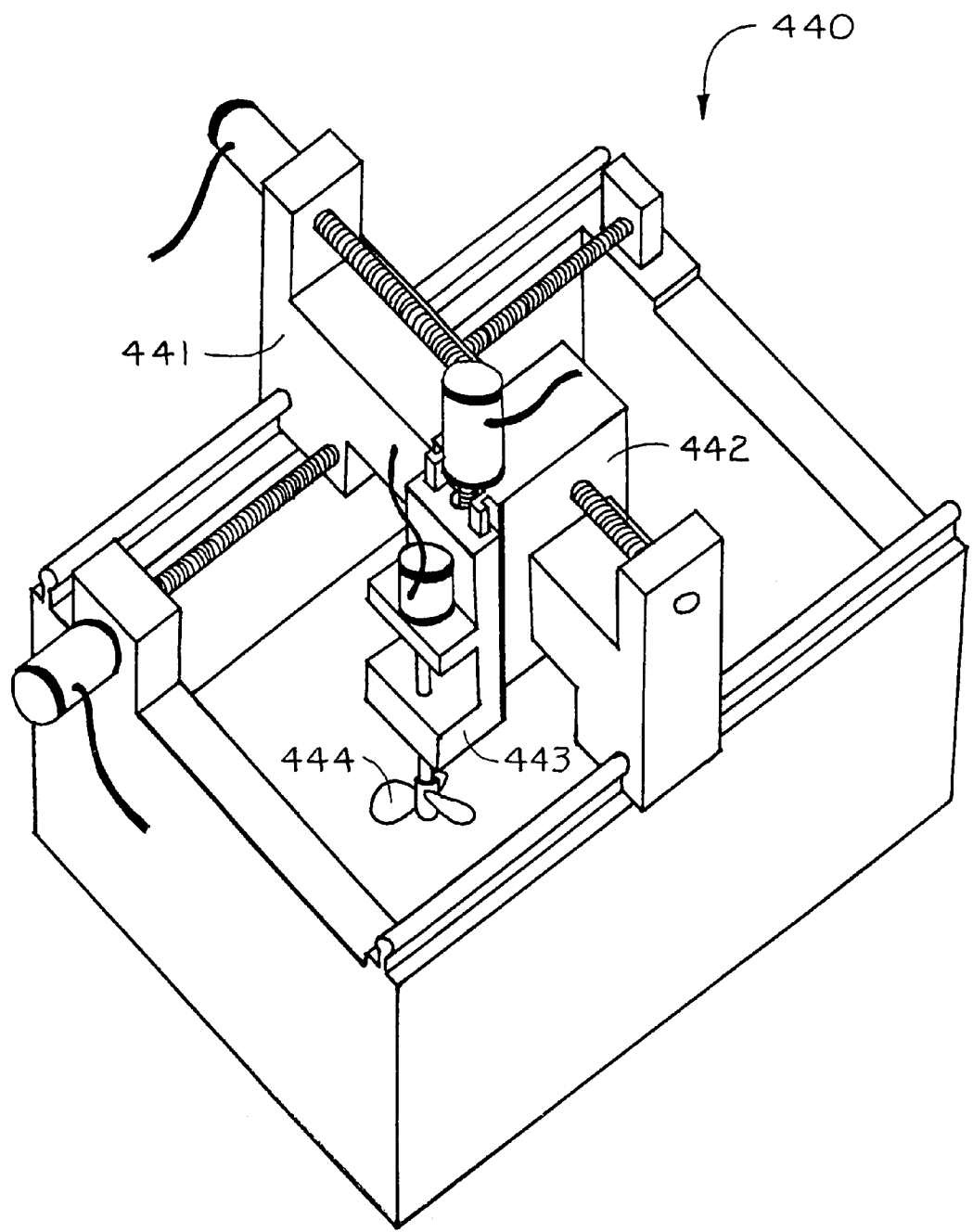
FIG. 44 is a perspective view of a multiple-axis mixer in accordance with the invention, having motor-driven screws; and, FIG. 45 is a perspective view of a multiple-axis mixer in accordance with the invention, having a rotatable turntable.

FIG. 44 shows a mixing tank and multiple-axis impeller drive 440 in accordance with the invention. The multiple-axis impeller drive 440 is mounted to the tank by means of a screw-driven gantry 441 traversing in a given x-direction, the gantry 441 carrying a screw-driven traversing head 442 and capable of driving the traversing head 442 in a given y-direction, the traversing head 442 carrying a screw-driven elevator 443 and capable of driving the elevator car 443 in a given z-direction, the elevator car 443 having suspended from it the driven-impeller shaft and impeller 444. The drive speed(s) of any of the coordinate axes and impeller can be optionally left to operate at constant speed (selected manually) or else varied with respect to time by use of a controller.

Figure 45:
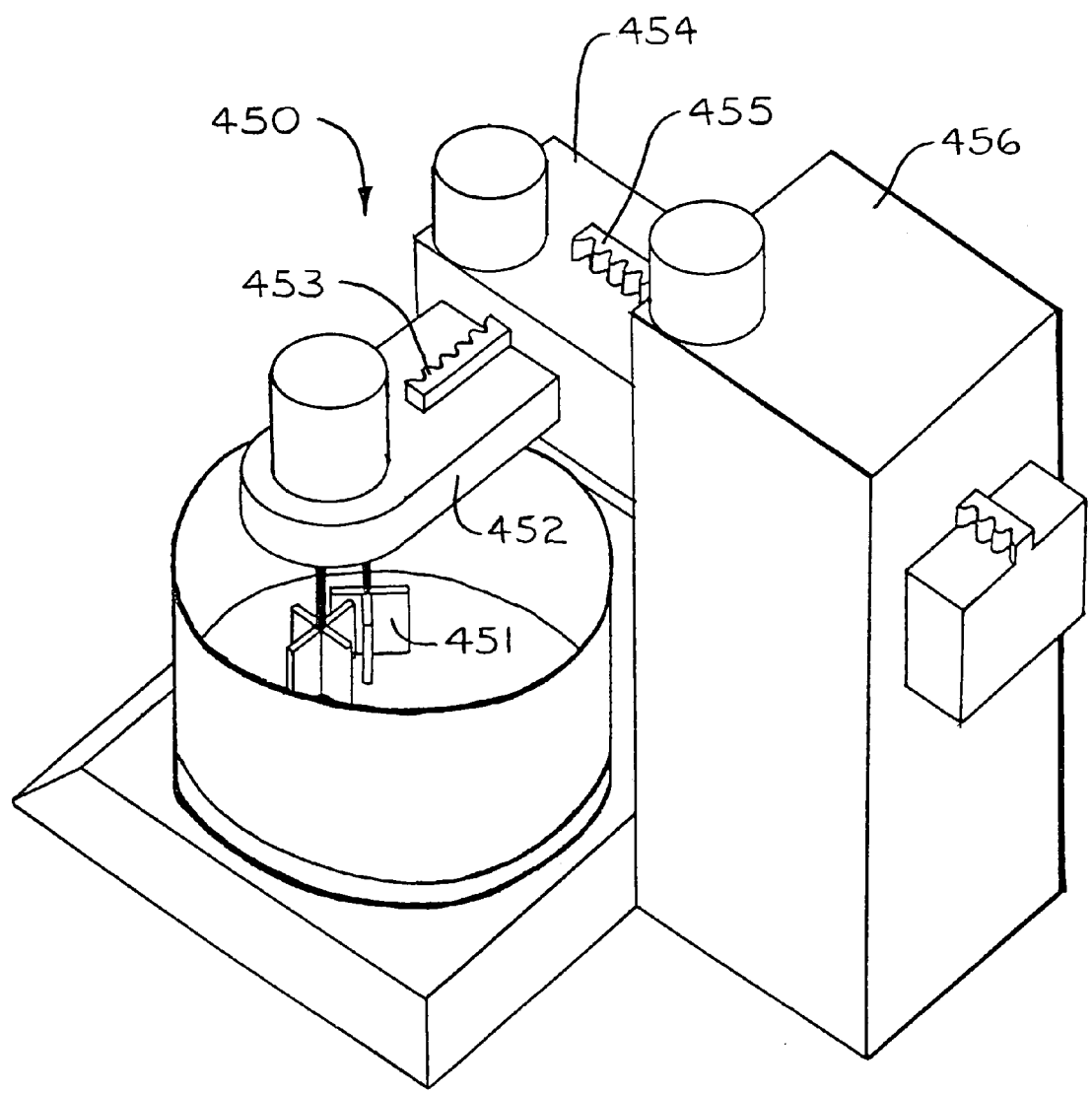

FIG. 45 shows a mixing drum and multiple-axis impeller drive 450 in accordance with the invention. The drum spins on a turntable during mixing. Dual counter-rotating gear-impellers 451 are carried by separate drive shafts from a given y-direction boom 452 that is driven by a rack and pinion drive 453 to reciprocate relative to a given x-direction boom 454 that is driven by a like rack and pinion drive 455 to reciprocate relative to a stanchion 456. The drive speed(s) of any of the coordinate axes and impeller can be optionally left to operate at constant speed (selected manually) or else varied with respect to time by use of a controller.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A tank agitator for connecting onto the terminus of a generally steady flow, low head feedwater line and causing agitation in the tank by the discharge of the feedwater in part through a rotating discharge port and in other part through a pulse discharge port, comprising:

a housing having an inlet for connection to the feedwater line, a turbine mounted in the housing and driven to spin by inflow of the feedwater, a nozzle operatively connected to the spinning turbine such that the nozzle rotates with respect to a given rotation axis, and, the nozzle defining a rotating discharge port for discharging a stream in various directions, not all of which are continuously coincident with the given rotation axis during a complete rotation of the nozzle, a pulser arrangement for enhancing the agitation in the tank by means of the discharge of a fractional amount of the feedwater inflow through a pulse-discharge port which is distinct from said rotating discharge port and in which the discharge stream pulses between alternating phases of flow and quiescence, the pulser arrangement comprising:

providing the housing with an pulse-discharge port in the housing to the outside; and, a blocker door coupled to and driven by the spinning turbine to cycle between blocking the fractional amount of feedwater inflow thereto and unblocking such, such that a discharge stream issues from the pulse-discharge port pulses between alternating phases of flow and quiescence.

2. The tank agitator of claim 1 wherein the turbine comprises a series of angularly spaced radial vanes.

3. The tank agitator of claim 1 further comprising a drive train interconnecting the spinning turbine with the nozzle.

4. The tank agitator of claim 1 further comprising a drive train interconnecting the spinning turbine with the blocker door.

5. The tank agitator of claim 4 further comprising a drive train interconnecting the spinning turbine with the rotating nozzle.

6. The tank agitator of claim 5 further wherein the drive train is arranged to slow the speed ratio between the relatively more rapid cyclic rate of the spinning turbine and the, in consequence, relatively slower cyclic rates of the blocker door as well as the rotating nozzle.

7. A method of agitating a tank by a tank agitator for connecting onto the terminus of a generally steady flow, low head feedwater line—and which tank agitator generally causes agitation in the tank by the discharge of the feedwater in part through a rotating discharge port and in other part through a pulse discharge port—by more particularly locating the tank agitator within a given proximity of a sidewall or corner of the tank for achieving a given effect, comprising the steps of:

providing the tank agitator with a housing having an inlet for connection to the feedwater line, a turbine mounted in the housing and driven to spin by inflow of the feedwater, a nozzle operatively connected to the spinning turbine such that the nozzle rotates with respect to a given rotation axis such that the nozzle defines a rotating discharge port for discharging a stream in various directions, not all of which are continuously coincident with the given rotation axis during a complete rotation of the nozzle, and, a pulser arrangement for enhancing the agitation in the tank by means of the discharge of a fractional amount of the feedwater inflow through a pulse-discharge port which is distinct from said rotating discharge port and in which the discharge stream pulses between alternating phases of flow and quiescence, the pulser arrangement comprising: providing the housing with an pulse-discharge port in the housing to the outside; and, a blocker door coupled to and driven by the spinning turbine to cycle between blocking the fractional amount of feedwater inflow thereto and unblocking such, such that a discharge stream issues from the pulse-discharge port pulses between alternating phases of flow and quiescence;

providing a drive train to interconnect the spinning turbine with the rotating nozzle in order to slow the speed ratio from the relatively more rapid cyclic rate of the spinning turbine to a given, in consequence, relatively slower cyclic rate of the rotating nozzle; and locating the tank agitator vertically relative a sidewall or corner of the tank, with the rotating discharge port near the surface interface and the pulse-discharge port more deeply submerged, such that the combination of the chosen proximity of the rotating discharge port to the sidewall or corner with the given cyclic rate of the rotating discharge port causes about a half cycle of loading against the sidewall or corner and another about half cycle of discharging in coordination with the unloading of the load against the sidewall or corner, whereby the given effect comprises enhanced surface wave agitation.

8. The method of claim 7 further including providing another drive train to interconnect the spinning turbine with the blocker door in order to slow the speed ratio from the relatively more rapid cyclic rate of the spinning turbine to a different, in consequence, relatively slower cyclic rate of the pulse-discharge port.

9. A method of agitating a tank by a tank agitator for connecting onto the terminus of a generally steady flow, low head feedwater line—and which tank agitator generally causes agitation in the tank by the discharge of the feedwater through a rotating discharge port—by more particularly locating the tank agitator within a given proximity of a sidewall or corner of the tank for achieving a given effect, comprising the steps of:

providing the tank agitator with a housing having an inlet for connection to the feedwater line, a turbine mounted in the housing and driven to spin by inflow of the feedwater, and, a nozzle operatively connected to the spinning turbine such that the nozzle rotates with respect to a given rotation axis such that the nozzle defines a rotating discharge port for discharging a stream in various directions, not all of which are continuously coincident with the given rotation axis during a complete rotation of the nozzle;

providing a drive train to interconnect the spinning turbine with the rotating nozzle in order to slow the speed ratio from the relatively more rapid cyclic rate of the spinning turbine to a given, in consequence, relatively slower cyclic rate of the rotating nozzle; and with the spin axis of the rotating axis relatively vertical, locating the tank agitator relatively near a sidewall or corner of the tank such that the combination of the chosen proximity of the rotating discharge port to the sidewall or corner with the given cyclic rate of the rotating discharge port causes about a half cycle of loading against the sidewall or corner and another about half cycle of discharging in coordination with the unloading of the load against the sidewall or corner, whereby the given effect comprises enhanced surface wave agitation.

* * * * *